United States Patent
Morvan et al.

(10) Patent No.: US 6,894,992 B1
(45) Date of Patent: May 17, 2005

(54) SWITCHING COMMUNICATION MODES IN A NETWORK

(75) Inventors: Isabelle Morvan, Rennes (FR); Alain Caillerie, Rennes (FR); Lionel Tocze, St. Domineuc (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/357,813

(22) Filed: Jul. 20, 1999

(30) Foreign Application Priority Data

| Jul. 28, 1998 | (FR) | 98 09626 |
|---|---|---|
| Jul. 28, 1998 | (FR) | 98 09628 |
| Jul. 28, 1998 | (FR) | 98 09630 |
| Jul. 28, 1998 | (FR) | 98 09624 |

(51) Int. Cl.⁷ .............................................. H04Q 7/00
(52) U.S. Cl. ................... 370/329; 370/437; 455/450
(58) Field of Search .................. 370/337, 278, 370/329, 437, 316, 280, 338, 442, 226; 455/423, 7, 434, 435, 450, 414, 417, 463, 502, 426, 442, 553, 432, 9, 11.1, 561, 427; 379/60, 88

(56) References Cited

U.S. PATENT DOCUMENTS

| 4,284,848 A | | 8/1981 | Frost | 179/2 |
|---|---|---|---|---|
| 4,594,591 A | * | 6/1986 | Burke | 340/3.9 |
| 4,935,927 A | | 6/1990 | Kaewell | 370/105 |
| 5,040,205 A | | 8/1991 | Kunihiro | 379/61 |
| 5,212,684 A | * | 5/1993 | MacNamee et al. | 370/280 |
| 5,577,022 A | | 11/1996 | Padovani et al. | 370/13 |
| 5,606,560 A | | 2/1997 | Malek et al. | 370/347 |
| 5,691,980 A | * | 11/1997 | Welles, II et al. | 370/316 |
| 5,696,903 A | | 12/1997 | Mahany | 395/200 |
| 5,873,033 A | * | 2/1999 | Hjern et al. | 455/417 |
| 5,995,500 A | * | 11/1999 | Ma et al. | 370/337 |
| 6,047,178 A | * | 4/2000 | Frlan | 455/423 |
| 6,141,531 A | * | 10/2000 | Williams et al. | 455/7 |
| 6,195,545 B1 | * | 2/2001 | Baker et al. | 455/414 |
| 6,574,452 B1 | | 6/2003 | Morvan et al. | 455/11.1 |

FOREIGN PATENT DOCUMENTS

| EP | 0 711 057 A2 | 5/1996 |
|---|---|---|
| EP | 0 748 085 A1 | 12/1996 |
| WO | WO 94 05101 | 3/1994 |
| WO | WO 96 07288 | 3/1996 |
| WO | WO 96 22001 | 7/1996 |
| WO | WO 97 45994 | 12/1997 |
| WO | WO 98/26625 | 6/1998 |

* cited by examiner

*Primary Examiner*—John Pezzlo
(74) *Attorney, Agent, or Firm*—Fitzpatrick, Cella, Harper & Scinto

(57) ABSTRACT

The communication method of the invention applies to communication stations adapted to communicate with each other when at least one of said communication stations supplies a control signal, said station then functioning in "base station" mode and the stations not supplying a control signal then functioning in "mobile station" mode.

The method of the invention includes, for at least one communication between two communication stations functioning in mobile station mode, in connection with a first base station:

- an operation of determining a second station, during which a communication station functioning in mobile station mode able to function in base station mode is determined,
- a switching request operation during which a message representing a request to switch into base station mode is sent to the second station determined during the determination operation.

14 Claims, 33 Drawing Sheets

Figure 1:
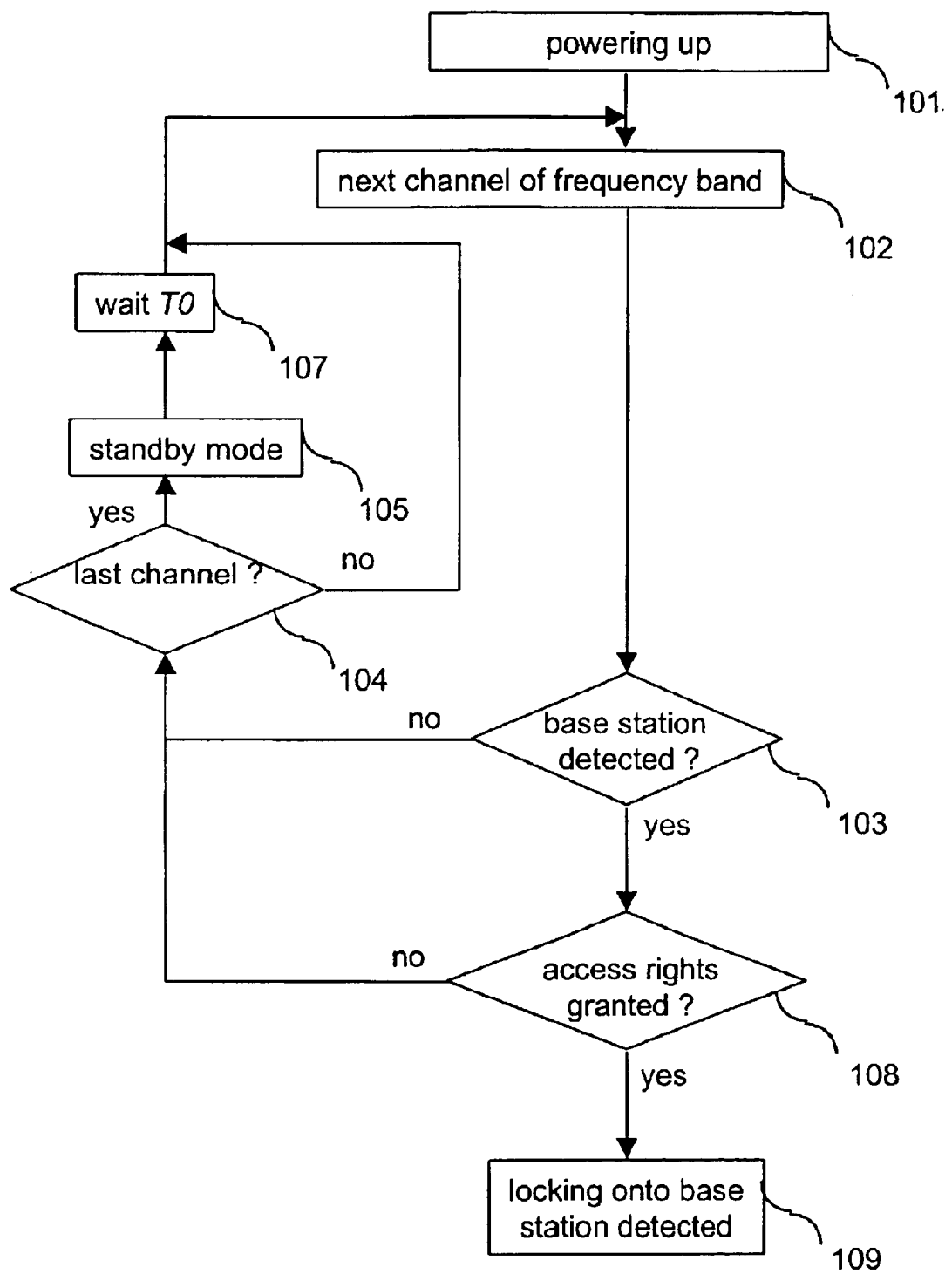

Fig. 1 : State of the art

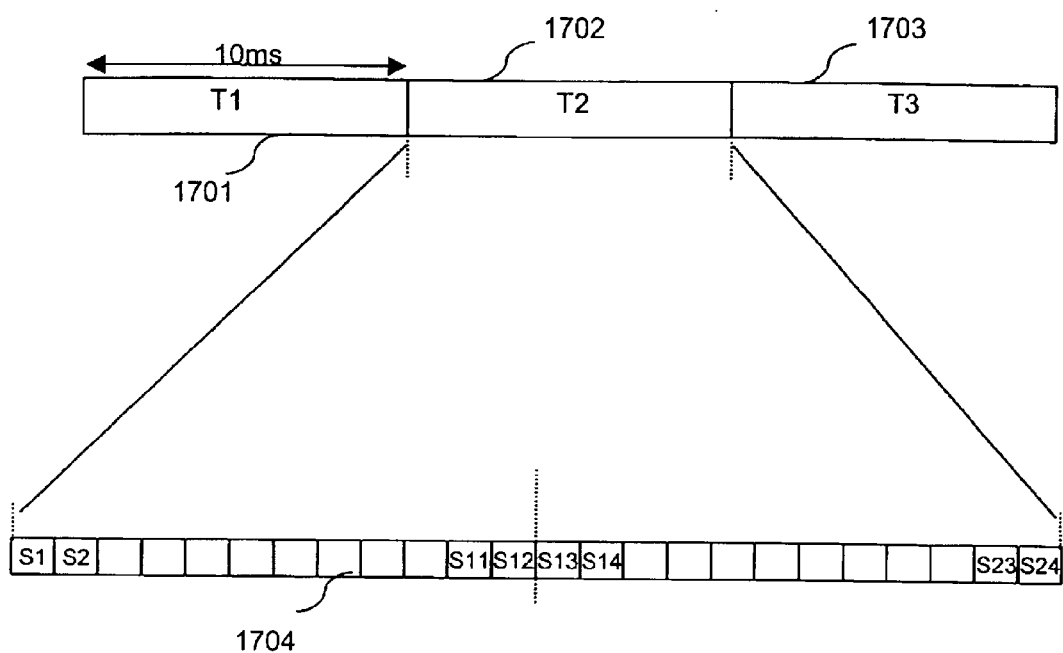
Fig. 17 : State of the art

SWITCHING COMMUNICATION MODES IN A NETWORK

The present invention concerns a method and device for communicating on a network. It applies in particular to local wireless networks with centralised architecture, for which each communication is organised between a so-called base communication station, also referred to as the "fixed part", and a mobile communication station, also referred to as the "portable part".

An example of such a communication network is given by the telephones using the European DECT standard (initials of the English words "Digital Enhanced Cordless Telecommunication").

In such a local network, a base station supplies a synchronisation signal to all the mobile stations in the network. The set of stations (the base station and one or more mobile stations) which thus synchronise themselves with each other, constitutes a cell.

The communication capacity of a cell is fixed by the DECT standard. When this capacity becomes too low, it is known that a base station can be added, manually, so that a second cell is added to the first. However, in this case, the stations in different cells cannot communication with each other and the cells are fixed.

According to the DECT standard, a cell cannot automatically break itself down into several cells in order to increase the total communication capacity of all the stations.

When two mobile stations have to communicate with each other, they must each communicate with a base station, which doubles the passband requirement for the communication concerned.

The present invention sets out to remedy these drawbacks.

To this end, the present invention aims to allow the automatic breakdown of a cell into several cells by providing, on the one hand, that at least one mobile station is capable of functioning as a base station and on the other hand providing mechanisms enabling the initial base station to control the constitution of the new cell.

Thus, according to a first aspect, the present invention relates to a method of communication between communication stations adapted to communicate with each other when at least one of said communication stations supplies a control signal, said station then functioning in "base station" mode and the stations not supplying a control signal then functioning in "mobile station" mode, characterised in that it includes, for at least one communication between two communication stations functioning in mobile station mode, in connection with a first base station:

an operation of determining a second station, during which a communication station functioning in mobile station mode able to function in base station mode is determined, a switching request operation during which a message representing a request to switch into base station mode is sent to the second station determined during the determination operation.

By virtue of these provisions, for the communication, a new base station will be sought. It should be noted here that the new base station can be one of the stations which is to communicate or a third station which has the capability of functioning as a base station.

According to particular characteristics, the second communication station performs, following reception of said message:

an operation of determining agreement, or not, to function in base station mode, and an operation of replying to the base station, during which the communication station transmits a message representing agreement, or not, to function in base station mode.

By virtue of these provisions, the communication station envisaged as the future base station can itself determine whether it accepts this role. Thus, when the initial base station is too partially or badly informed of the actual capability of the second communication station of operating in base station mode for the communication, an error can be avoided since it is the best informed communication station, the one which is intended to be the future base station, which finally decides.

According to particular characteristics, when at least one of the communication stations intended to communicate with each other is capable of functioning in base station mode, during the operation of determining the second station, one of the communication stations intended to communicate with each other and capable of functioning in base station mode is determined as the second station.

By virtue of these provisions, the cell can consist solely of two stations which are to communicate with each other, which simplifies the functioning of the network and makes it possible for the entire passband of the new cell to serve, without having to duplicate the transmitted information, as is the case when a communication between two mobile stations passes through a base station.

According to particular characteristics, when, following the switching request operation, the second station has switched into base station mode, said second station performs an operation of switching into mobile station mode, when the communication is terminated.

By virtue of these provisions, as soon as the communication is terminated, the cell in which this communication took place merges into the cell from which it came. Different mobile stations can then once again communicate with each other.

According to particular characteristics, when the passband necessary for a communication between two communication stations functioning in mobile station mode in connection with a first base station is greater than a predetermined value, there are performed, for said communication:

the operation of determining a second station, and the switching request operation.

According to other particular characteristics, when the passband necessary for a communication between two communication stations functioning in mobile station mode in connection with a first base station is not available for the first base station, there are performed, for said communication:

the operation of determining a second station, and the switching request operation.

By virtue of each of these provisions, the decision to create a new cell is dependant upon a passband criterion and resolves any passband problem which could arise for the communication itself or for a future communication request.

According to a second aspect, the present invention relates to a device for communication between communication stations adapted to communicate with each other when at least one of said communication stations supplies a control signal, said station then functioning in "base station" mode and the stations not supplying a control signal then functioning in "mobile station" mode, characterised in that it has a processing means adapted, for at least one communication between two communication stations functioning in mobile station mode, in connection with a first base station:

to determine a second communication station functioning in mobile station mode able to function in base station mode, and to send, to the second station, a message requesting switching into base station mode.

The invention also relates to a network, a computer, a camera, a facsimile machine, a photographic apparatus, a television receiver, a printer, a scanner and an audio/video player, characterised in that they have a device as briefly disclosed above.

The invention also relates to:

a means of storing information which can be read by a computer or a microprocessor storing instructions of a computer program characterised in that it implements the method of the invention as briefly disclosed above, and a means of storing information which is removable, partially or totally, and which can be read by a computer or a microprocessor storing instructions of a computer program characterised in that it implements the method of the invention as briefly disclosed above.

The preferential or particular characteristics, and the advantages, of said device, said computer, said camera, said facsimile machine, said photographic apparatus, said television receiver, said printer, said scanner, said audio/video player and said information storage means being identical to those of the method as briefly disclosed above, these advantages are not repeated here.

When a station has the capability of behaving either as a base station or as a mobile station, this capability remains an exclusive item of information of said communication station, which prevents its use by the network.

The present invention sets out to remedy these drawbacks.

To this end, the present invention relates, according to a third aspect, to a method of communicating between communication stations adapted to communicate with each other when at least one of said communication stations supplies a control signal, said station then functioning in "base station" mode and the stations not supplying a control signal functioning in "mobile station" mode, characterised in that it includes, performed by at least one communication station capable of functioning according to each of the modes, base station and mobile station, and of switch between these two functioning modes:

an operation of determining the presence of a station functioning in base station mode, and when, during the presence determination operation, it is determined that a station is functioning in base station mode, an operation of putting into communication with said base station and an operation of transmitting, to said base station, an item of information representing a capability of switching from one operating mode to another.

Thus the information concerning the capability of the mobile stations in a cell to become a base station can be used by a base station for:

requesting such a mobile station to become a base station, when the covering base station is going to become inactive, requesting such a mobile station to become a secondary base station in order to assist the initial base station to guarantee all the necessary communications internal to the cell.

More generally, the invention makes it possible to dynamically modify the configuration of the network and of its cell or cells.

According to particular characteristics, during the transmission operation:

said item of information represents a capability of switching automatically between the two communication modes, said information represents a capability of switching manually between the two communication modes, said information includes an item of information representing a message specific to the initial proprietor of the communication system, said information includes an item of information representing a memory capacity of said station, said information includes an item of information representing a degree of filling of the memory of said station, said information includes an item of information representing a processing capacity of a microprocessor of said station, and/or said information includes an item of information representing a maximum data rate.

By virtue of each of these provisions, the knowledge of the capability of the communication station which supplies this information is precise.

According to a fourth aspect, the present invention relates to a device for communicating between communication stations adapted to communicate with each other when at least one of said communication stations supplies a control signal, said station then functioning in "base station" mode and the stations not supplying a control station then functioning in "mobile station" mode, characterised in that it has a processing means adapted:

to function according to each of the modes, base station and mobile station, to switch between these two functioning modes, to determine the possible presence of a station functioning in mobile station mode, and when it has determined that a station is functioning in base station mode, to get into communication with said base station and to transmit to it an item of information representing a capability of switching from one functioning mode to another.

The invention also relates to a network, a computer, a camera, a facsimile machine, a photographic apparatus, a television receiver, a printer, a scanner and an audio/video player, characterised in that they have a device as briefly disclosed above.

The invention also relates to:

a means of storing information which can be read by a computer or a microprocessor storing instructions of a computer program characterised in that it implements the method of the invention as briefly disclosed above, and a means of storing information which is removable, partially or totally, and which can be read by a computer or a microprocessor storing instructions of a computer program characterised in that it implements the method of the invention as briefly disclosed above.

The preferential or particular characteristics, and the advantages, of said device, said computer, said camera, said facsimile machine, said photographic apparatus, said television receiver, said printer, said scanner, said audio/video player and said information storage means being identical to those of the method as briefly disclosed above, these advantages are not repeated here.

In a local wireless network with centralised architecture, for example of the type using the DECT standard, a base station can be switched off or switched automatically into mobile station mode, and a mobile station having the capability of becoming a base station may have to request going into base station mode in place of the current base station.

The document U.S. Pat. No. 5,691,980 discloses how a master node of a network can detect an excessively low battery level and choose a new master node amongst slave nodes. It chooses the slave node having the best battery level. According to this document, it is the initial master node which determines its replacement. This document does not make it possible to take into account a system comprising heterogeneous portable terminals, as in a DECT network. In addition, according to this document, a slave node cannot take the initiative in becoming a master node.

The present invention sets out to remedy these drawbacks.

To this end, the present invention relates, according a fifth aspect, to a method of communicating between communication stations adapted to communicate with each other when at least one of said communication stations supplies a control signal, said station then functioning in "base station" mode, and the stations not supplying a control signal then functioning in "mobile station" mode, characterised in that it includes:

a request operation during which a first communication station transmits to a second communication station a message representing a request to change station functioning in base station mode.

By virtue of these provisions, a communication station functioning as a base station or a communication station functioning at a mobile station can require a change in organisation of the cell in order to improve its functioning or in order themselves to change functioning mode. The network can thus be reconfigured dynamically, taking into account various constraints, and optimise its functioning.

According to particular characteristics, during said request operation, the change request message includes an item of information representing the identity of a mobile station envisaged as a new base station.

By virtue of these provisions, the first station which requires the change in base station can determine and transmit the identity of the station envisaged as the new base station.

According to particular characteristics, the first communication station is the communication station functioning in base station mode, prior to the request operation.

According to other particular characteristics, the second communication station is a communication station envisaged for functioning in base station mode following a request operation.

By virtue of these provisions, the two partners in the communication are the two communication stations which envisage exchanging their role in the cell. This simplifies communication and avoids interfering with the other communication stations.

According to particular characteristics, the request operation is performed by the communication station functioning in base station mode prior to the request operation and the second communication station performs, following the reception of the message representing a request to change station functioning in base station mode:

an operation of determining agreement, or not, to function in base station mode, and an operation of response to the base station, during which the second communication station transmits a message representing the agreement or not to function in base station mode.

By virtue of these provisions, it is the station envisaged as the future base station which determines whether or not it accepts this role. Thus, if the initial base station is only partially informed of the actual capability of the mobile station of taking the role of base station, it cannot impose this change in role on the second communication station.

According to particular characteristics, when a communication station operating in base station mode is switched off, it performs said request operation.

By virtue of these provisions, the communication station which is operating in base station mode causes another communication station to start to function in base station mode before stopping its own functioning.

According to particular characteristics, the first communication station is a communication station envisaged for functioning in base station mode following the request operation.

According to other particular characteristics, the second communication station is the communication station functioning in base station mode prior to the request operation.

By virtue of these provisions, the two partners in the communication are the two communication stations which envisage exchanging their role in the cell. This simplifies communication and avoids interfering with the other communication stations.

According to particular characteristics, in the absence of a response on the part of a second communication station, the first station considers that the envisaged change in base station has failed.

By virtue of these provisions, the method of the invention functions both with devices according to the present invention and with devices known in the state of the art prior to the present invention.

According to particular characteristics, following the request operation, performed by the first communication station:

an operation of determining acceptance of change in station functioning in base station mode, and when it is determined that the envisaged change is not accepted, a new request operation during which a new message representing a request to change base station is addressed to another communication station.

By virtue of these provisions, the station which requires a change in base station may make several successive attempts to achieve this objective.

According to particular characteristics, each request operation includes an operation of selecting the station for which there is intended the message requesting a change in station functioning in base station mode.

According to other particular characteristics:

the selection operation includes an operation of reading a destination station identity in a list of communication stations, the selection operation includes an operation of determining the mobile station having better capabilities of becoming the new base station, and/or the selection operation includes an operation of determining a mobile station having a need to transmit.

By virtue of each of these provisions, the stations which are envisaged for functioning in base station mode can, in a preferential order which depends on the characteristics of the selection operation, be the destination of messages representing a request to change station functioning in base station mode.

According to particular characteristics, the communication method as briefly disclosed above includes, performed by a communication station operating in mobile station mode:

an operation of determining capability of functioning in base station mode, and said request operation, during which said request message represents the capability of the first station of functioning in base station mode.

By virtue of these provisions, a communication station which operates in mobile station functioning mode can determine that it is effective for it to take the role of a base station.

According to particular characteristics, on reception of said request message, the second station performs:

an operation of comparing capability of functioning in base station mode, during which it determines whether or not the first station has a better capability than the second station of functioning in base station mode, and, in the affirmative, an operation of transmitting, to the first communication station, a message representing an acceptance of change in communication station functioning in base station mode.

By virtue of these provisions, the second communication station determines whether it accepts the change in base station requested.

According to a sixth aspect, the present invention relates to a device for communicating between communication stations adapted to communicate with each other when at least one of said communication stations supplies a control signal, said station then functioning in "base station" mode and the station not supplying a control signal then functioning in "mobile station" mode, characterised in that it has, in a first communication station, a processing means adapted to transmit, to a second communication station, a request message representing a request to change station functioning in base station mode.

The invention also relates to a network, a computer, a camera, a facsimile machine, a photographic apparatus, a television receiver, a printer, a scanner and an audio/video player, characterised in that they have a device as briefly disclosed above.

The invention also relates to:

a means of storing information which can be read by a computer or a microprocessor storing instructions of a computer program characterised in that it implements the method of the invention as briefly disclosed above, and a means of storing information which is removable, partially or totally, and which can be read by a computer or a microprocessor storing instructions of a computer program characterised in that it implements the method of the invention as briefly disclosed above.

The preferential or particular characteristics, and the advantages, of said device, said computer, said camera, said facsimile machine, said photographic apparatus, said television receiver, said printer, said scanner, said audio/video player and said information storage means being identical to those of the method as briefly disclosed above, these advantages are not repeated here.

The document U.S. Pat. No. 5,691,980 discloses how a master node in the network can detect an excessively low battery level and choose a new master node amongst slave nodes. It chooses the slave node having the best battery level. According to this document, it is the initial master node which determines its replacement. This document does not make it possible to take into account a system comprising heterogeneous portable terminals, as in a DECT network. In addition, according to this document, a slave node cannot take the initiative in becoming a master node.

When the base station is no longer in a position to correctly fulfil this role or when the quality of the transmission is not sufficient, no prior art is known which allows automatic switching of a mobile station into a base station.

To this end, according to a seventh aspect, the present invention relates to a method of communication between communication stations adapted to communicate with each other when at least one of said communication stations supplies a control signal, said station then functioning in "base station" mode and the stations not supplying a control signal then functioning in "mobile station" mode, characterised in that it includes, performed by a station functioning in base station mode:

an operation of determining the capability of said station functioning in base station mode of continuing this role, and when, during the capability determination operation, it is determined that said capability is reduced, a request operation during which a first communication station transmits, to a second communication station, a message representing a request to change station functioning in base station mode.

By virtue of these provisions, the cell can reconfigure itself automatically when the base station leaves the cell or when a mobile station which could have better capabilities of functioning as a base station than a current base station enters the cell.

According to particular characteristics, during said request operation, the change request message includes an item of information representing the identity of a mobile station envisaged as a new base station.

By virtue of these provisions, the first station, which requires the change of base station, can determine and transmit the identity of the station envisaged as a new base station.

According to particular characteristics, the first communication station is the communication station functioning in base station mode, prior to the request operation.

According to other particular characteristics, the second communication station is a communication station envisaged for functioning in base station mode following the request operation.

By virtue of these provisions, the two partners in the communication are the two communication stations which envisage exchanging their role in the cell. This simplifies communication and avoids disturbing the other communication stations.

According to particular characteristics, the request operation is performed by the communication station functioning in base station mode prior to the request operation and the second communication station performs, following the reception of the message representing a request to change station functioning in base station mode:

an operation of determining agreement, or not, to function in base station mode, and an operation of response to the base station, during which the second communication station transmits a message representing the agreement or not to function in base station mode.

By virtue of these provisions, it is the station envisaged as the future base station which determines whether or not it accepts this role. Thus, if the initial base station is only partially informed of the actual capability of the mobile station of taking the role of base station, it cannot impose this change in role on the second communication station.

According to particular characteristics, the communication station operating in base station mode determines said capability as a function of the quantity of energy which it has available.

According to other particular characteristics, said communication station functioning in base station mode performs an operation switching into mobile station mode when the quantity of energy which it has available is less than a predetermined value.

By virtue of these provisions it reduces its energy consumption by changing from a base station functioning mode, which entails a high energy consumption, to a mobile station functioning mode for which the energy is principally consumed during communication.

According to other particular characteristics, the communication station operating in base station mode determines said capability according to the quality of transmission between it and mobile stations.

By virtue of these provisions, when the initial base station moves away from the other communication stations in the cell, and more generally when it no longer provides sufficient transmission quality, another communication station is called onto take the role of base station.

According to particular characteristics, the first communication station is the communication station functioning prior to the base station mode request operation.

According to other particular characteristics, the second communication station is a communication station envisaged for functioning in base station mode following the request operation.

By virtue of these provisions, the two partners in the communication are the two communication stations which envisage exchanging their role in the cell. This simplifies communication and avoids disturbing the other communication station.

According to particular characteristics, in the absence of a response on the part of a second communication station, the first station considers that the envisaged change in base station has failed.

By virtue of these provisions, the method of the invention functions both with devices according to the present invention and with devices known in the state of the art prior to the present invention.

According to particular characteristics, following the request operation, performed by the first communication station:
  an operation of determining acceptance of change in station functioning in base station mode, and
  when it is determined that the envisaged change is not accepted, a new request operation during which a new message representing a request to change base station is addressed to another communication station.

By virtue of these provisions, the station which requires a change in base station can make several successive attempts to achieve this objective.

According to particular characteristics, each request operation includes an operation of selecting a station for which there is intended the message requesting a change in station functioning in base station mode.

According to other particular characteristics:
  the selection operation includes an operation of reading a destination station identity from a list of communication stations,
  the selection operation includes an operation of determining the mobile station having better capabilities of becoming the new base station,
  the selection operation includes an operation of determining a mobile station having a requirement to transmit,
  the selection operation includes an operation of determining a mobile station which has already operated in base station mode.

By virtue of each of these provisions, the stations which are envisaged for functioning in base station mode can, in a preferential order which depends on the characteristics of the selection operation, be destinations for the messages representing a request to change station functioning in base station mode.

According to an eighth aspect, the present invention relates to a device for communication between communication stations adapted to communicate with each other when at least one of said communication stations supplies a control signal, said station then functioning in "base station" mode and the stations not supplying a control signal then functioning in "mobile station" mode, characterised in that it has a processing means adapted:
  to determine the capability of a communication station functioning in base station mode of continuing this role, and
  when it has determined that the said capability is reduced, to cause a first communication station to transmit to a second communication station a message representing a request to change station functioning in base station mode.

The invention also relates to a network, a computer, a camera, a facsimile machine, a photographic apparatus, a television receiver, a printer, a scanner and an audio/video player, characterised in that they have a device as briefly disclosed above.

The invention also relates to:
  an information storage means which can be read by a computer or a microprocessor storing instructions of a computer program characterised in that it implements the method of the invention as briefly disclosed above, and
  an information storage means which is partially or totally removable and can be read by a computer or microprocessor storing instructions of a computer program characterised in that it implements the method of the invention as briefly disclosed above.

Figure 2:
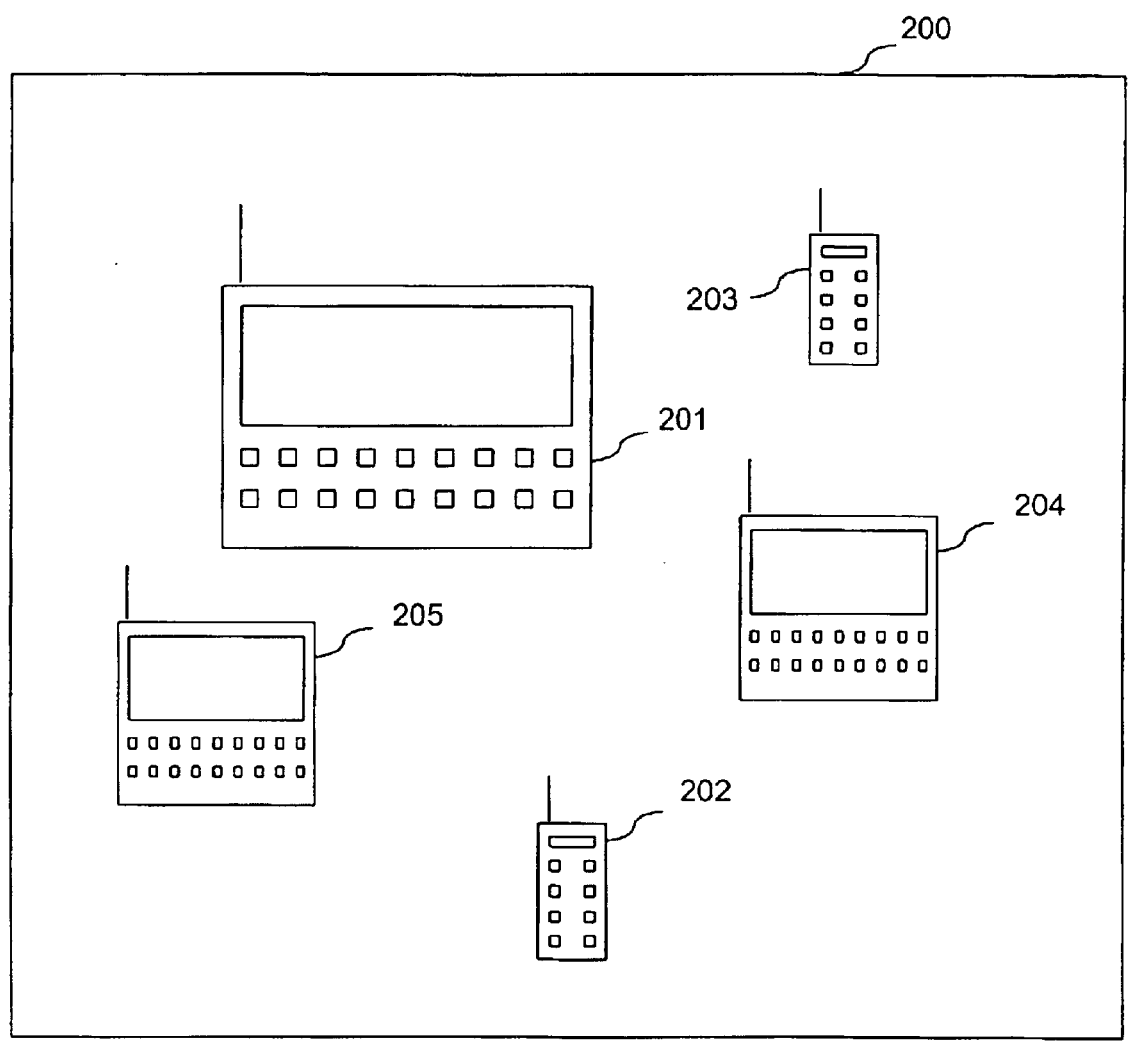
Figure 3A:
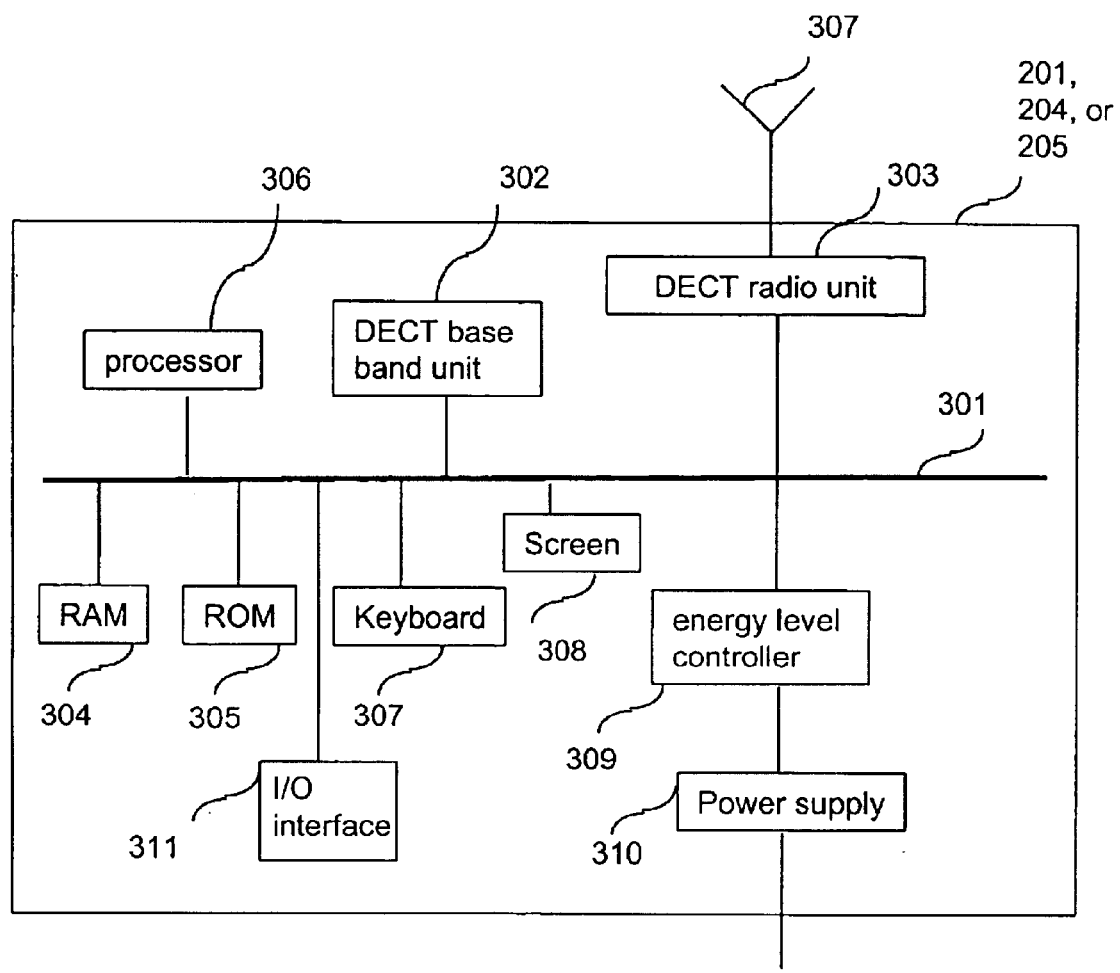
Figure 3B:
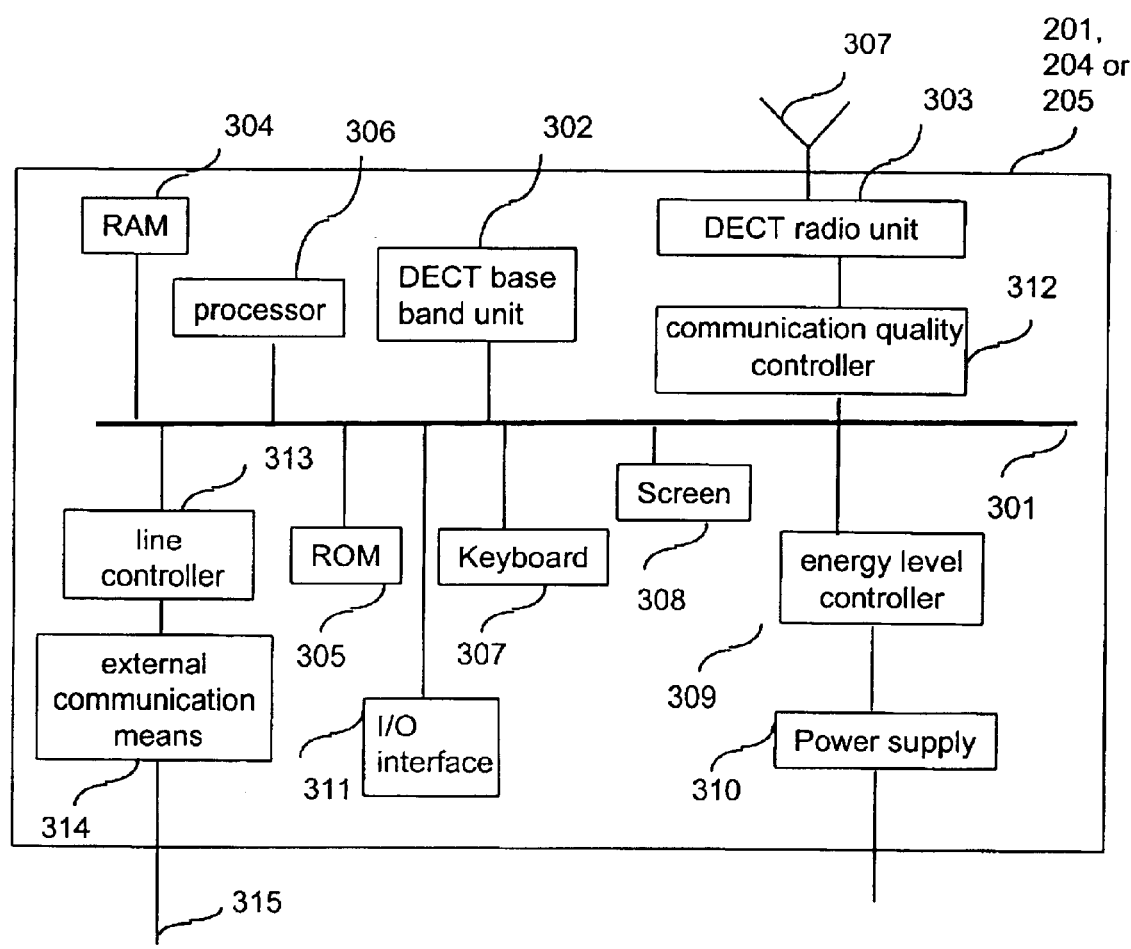
Figure 4:
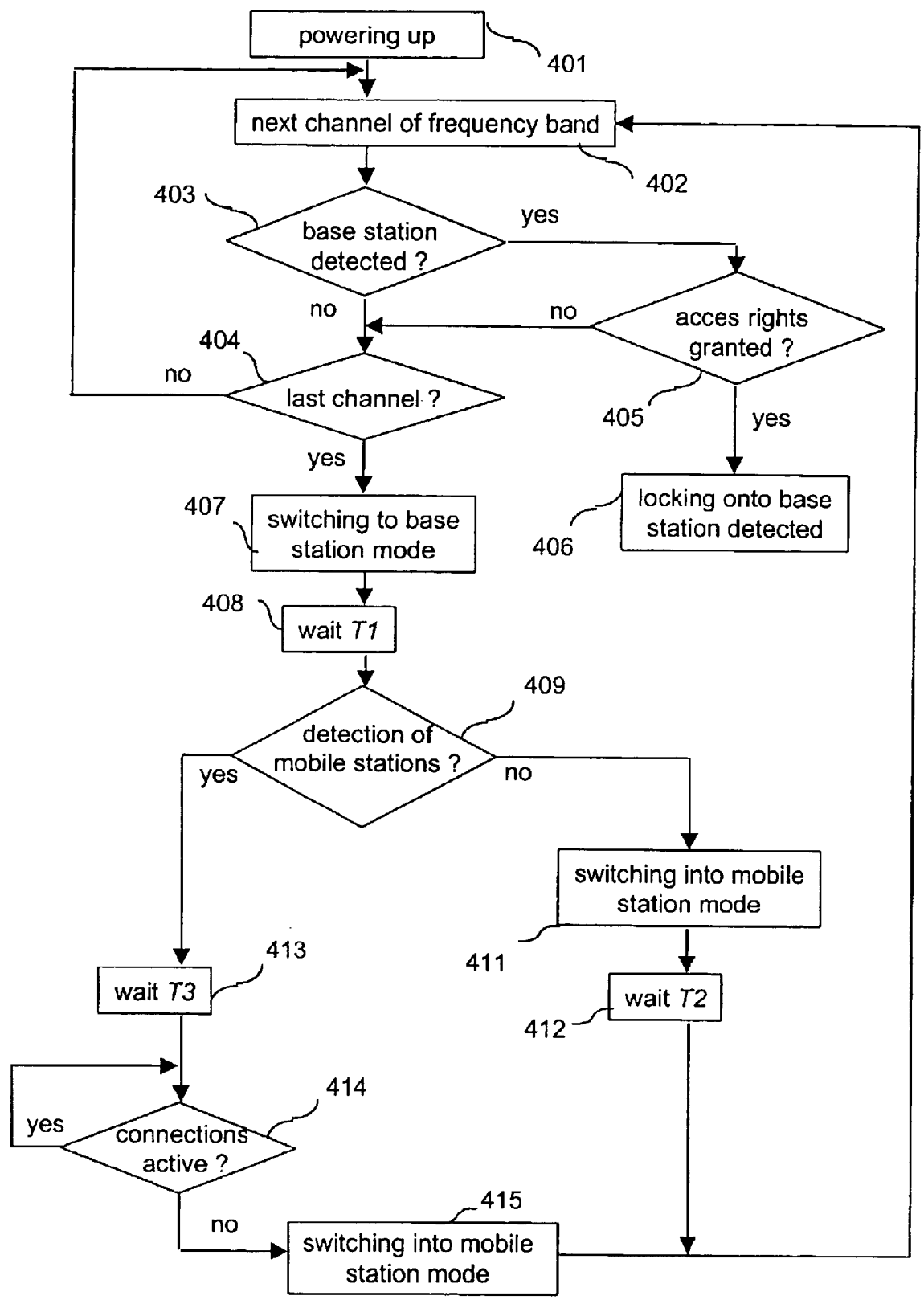
Figure 5:
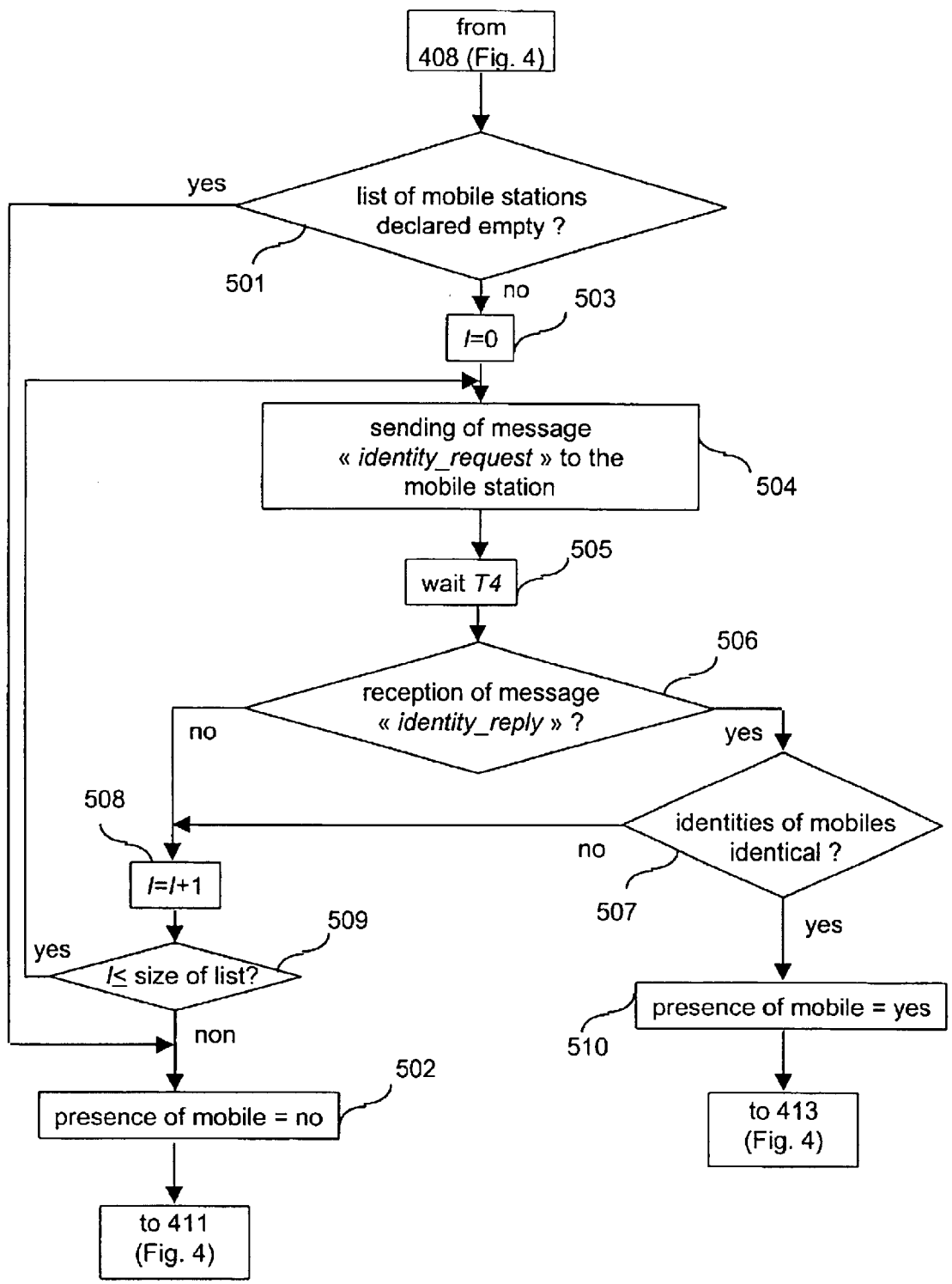
Figure 6A:
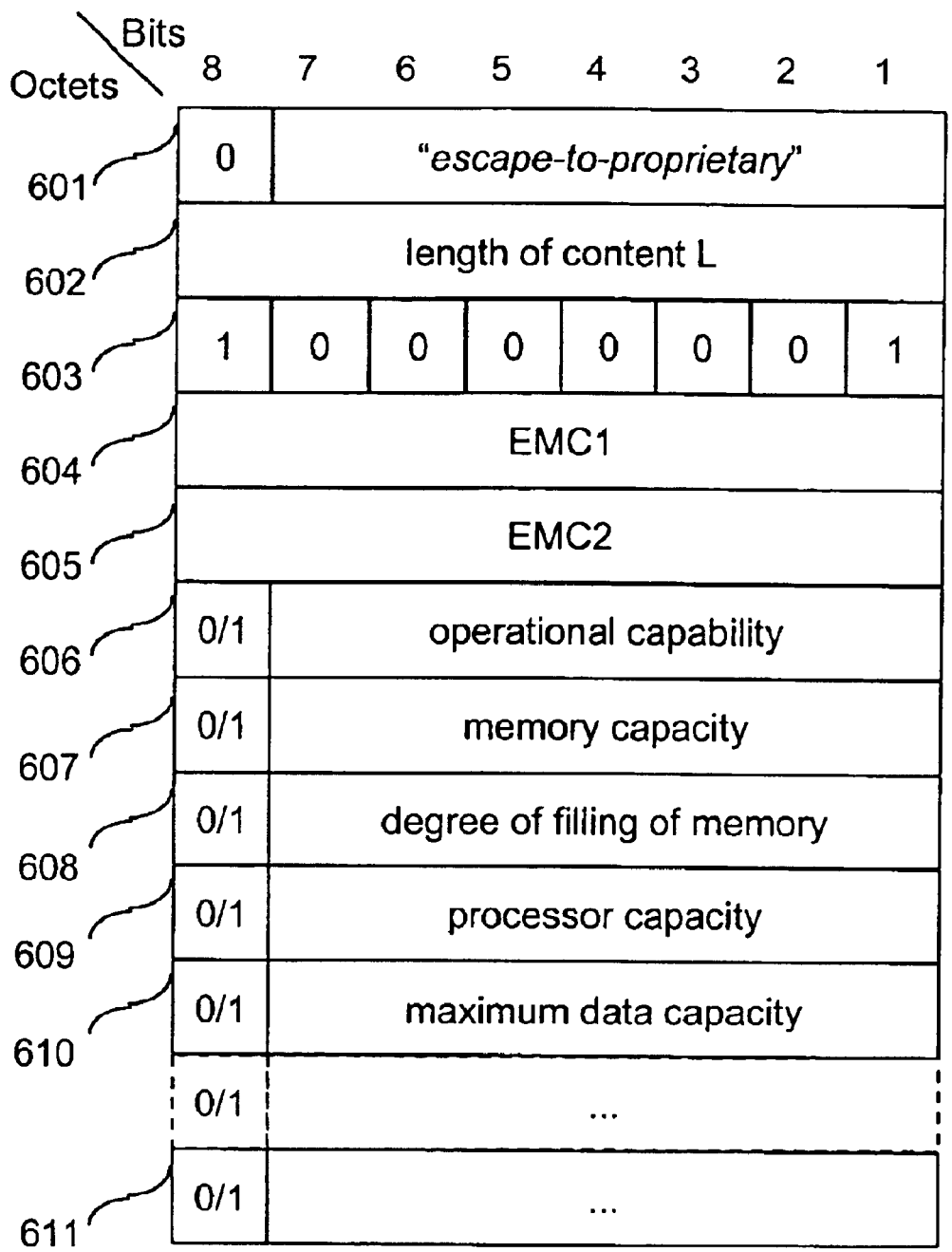
Figure 6B:
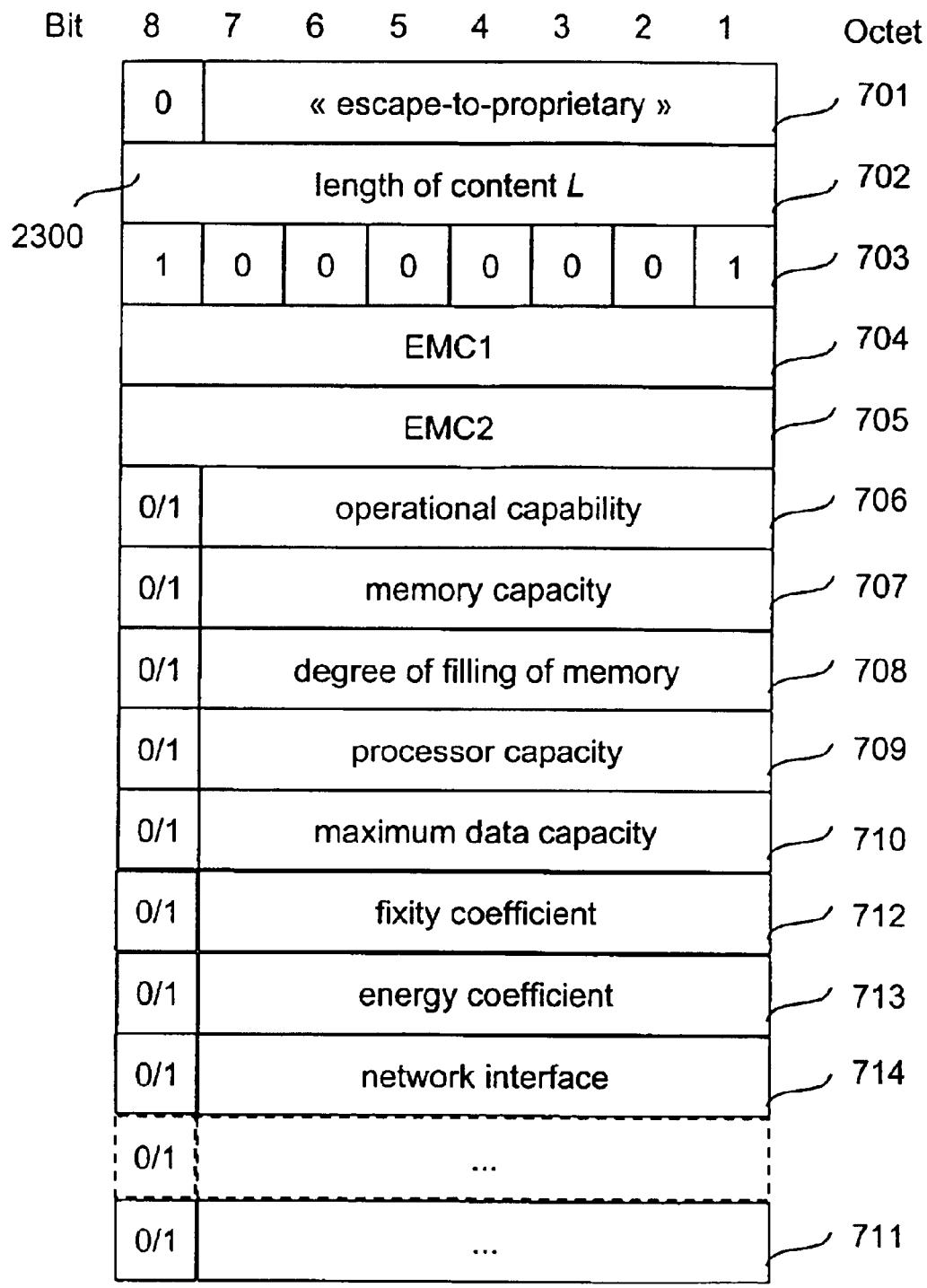
Figure 7:
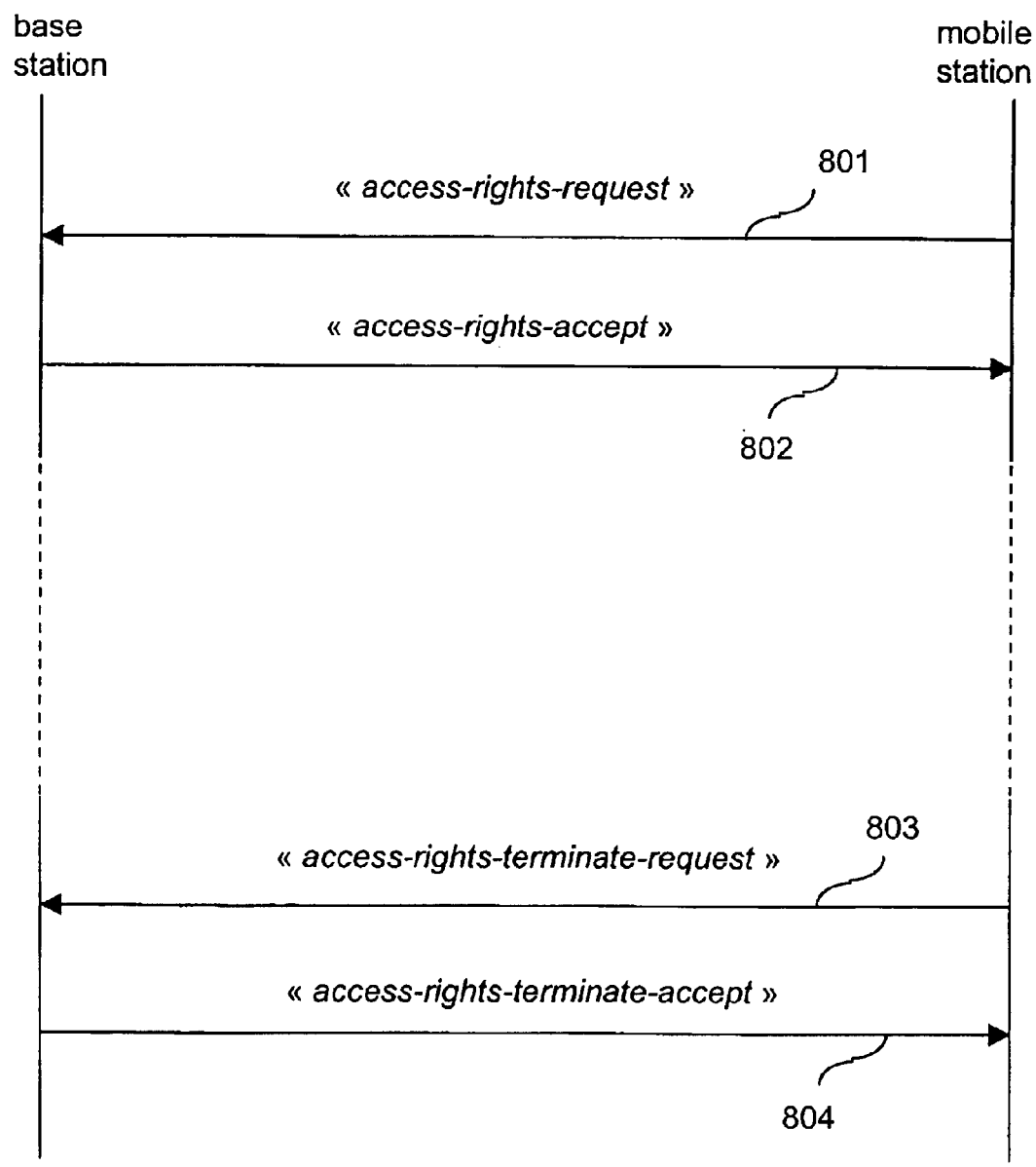
Figure 8A:
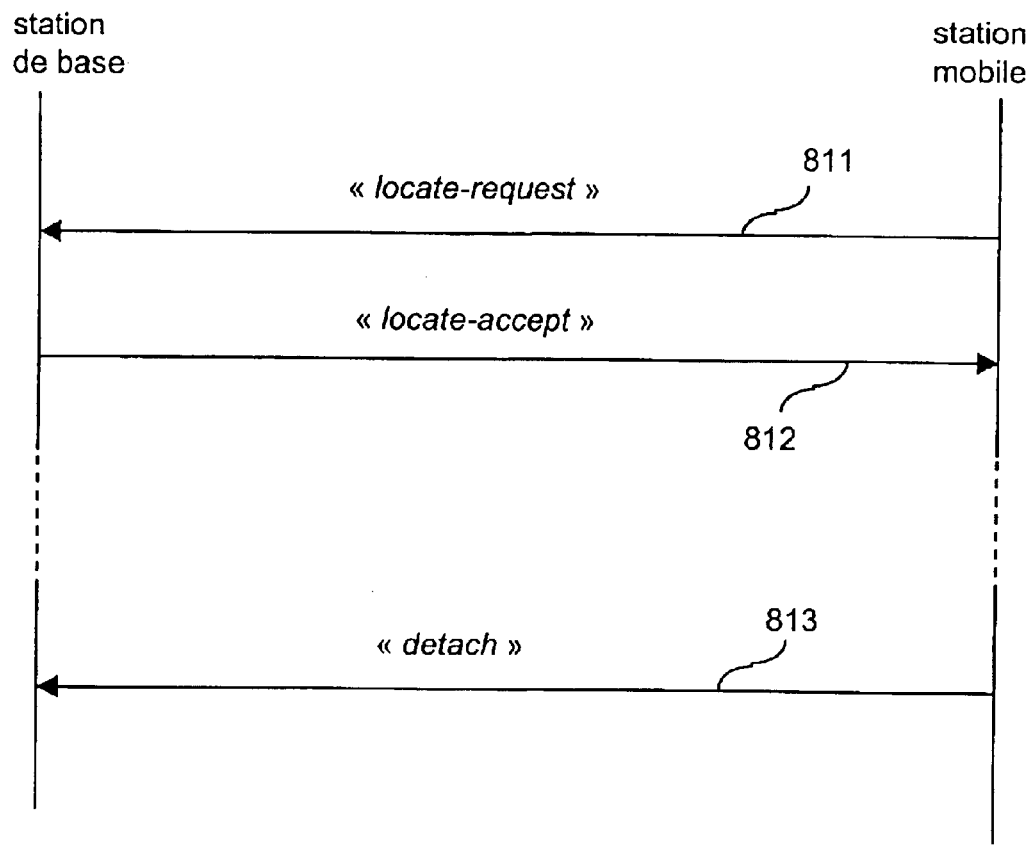
Figure 8B:
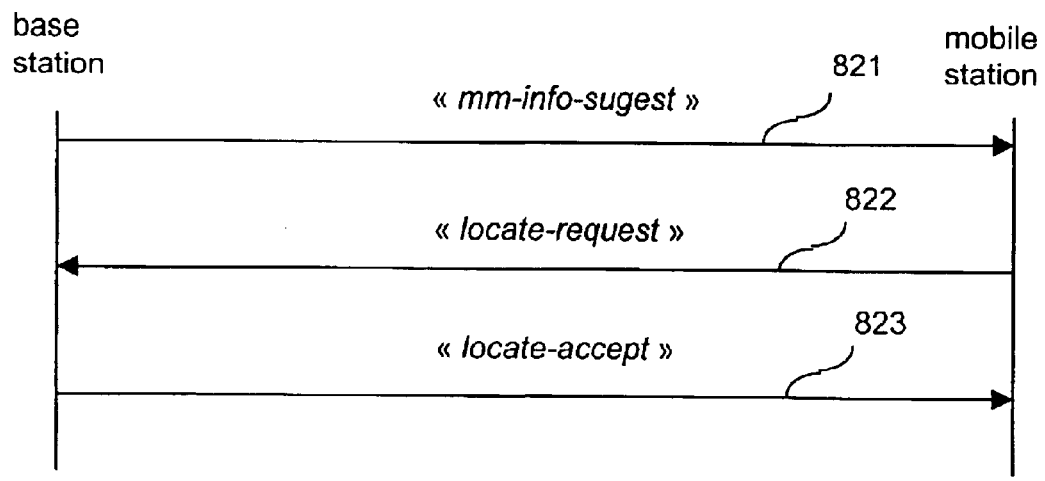
Figure 11:
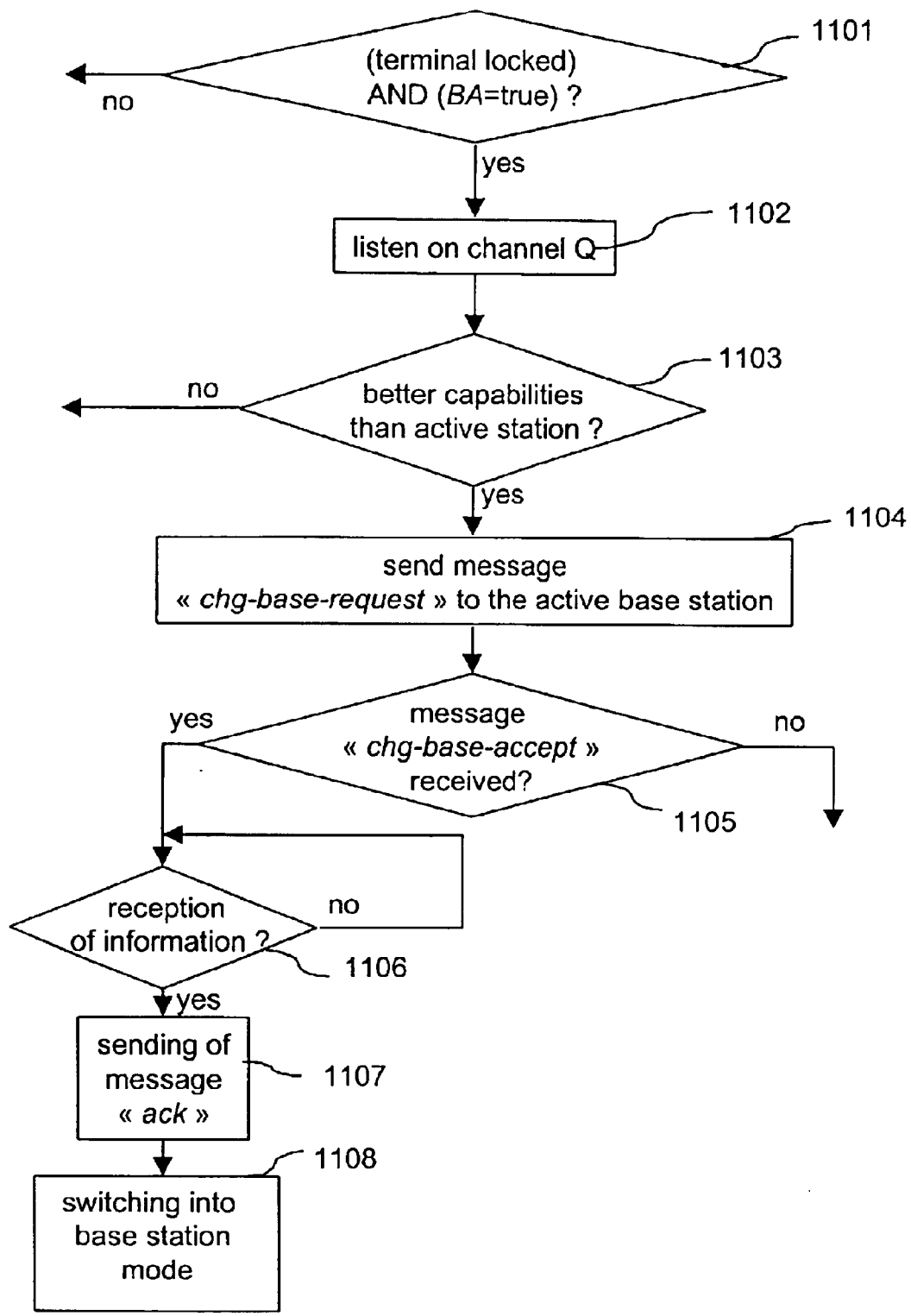
Figure 12:
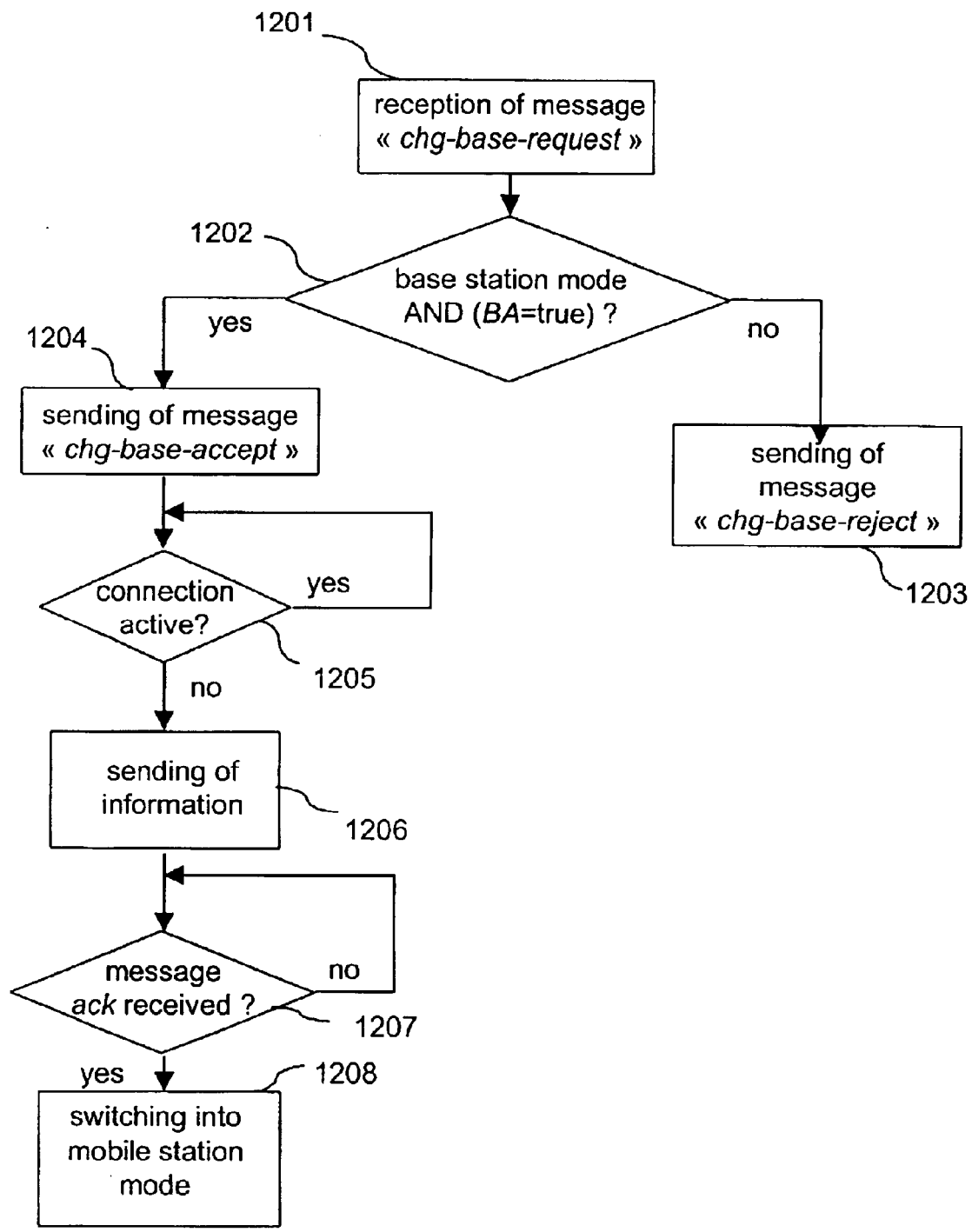
Figure 13:
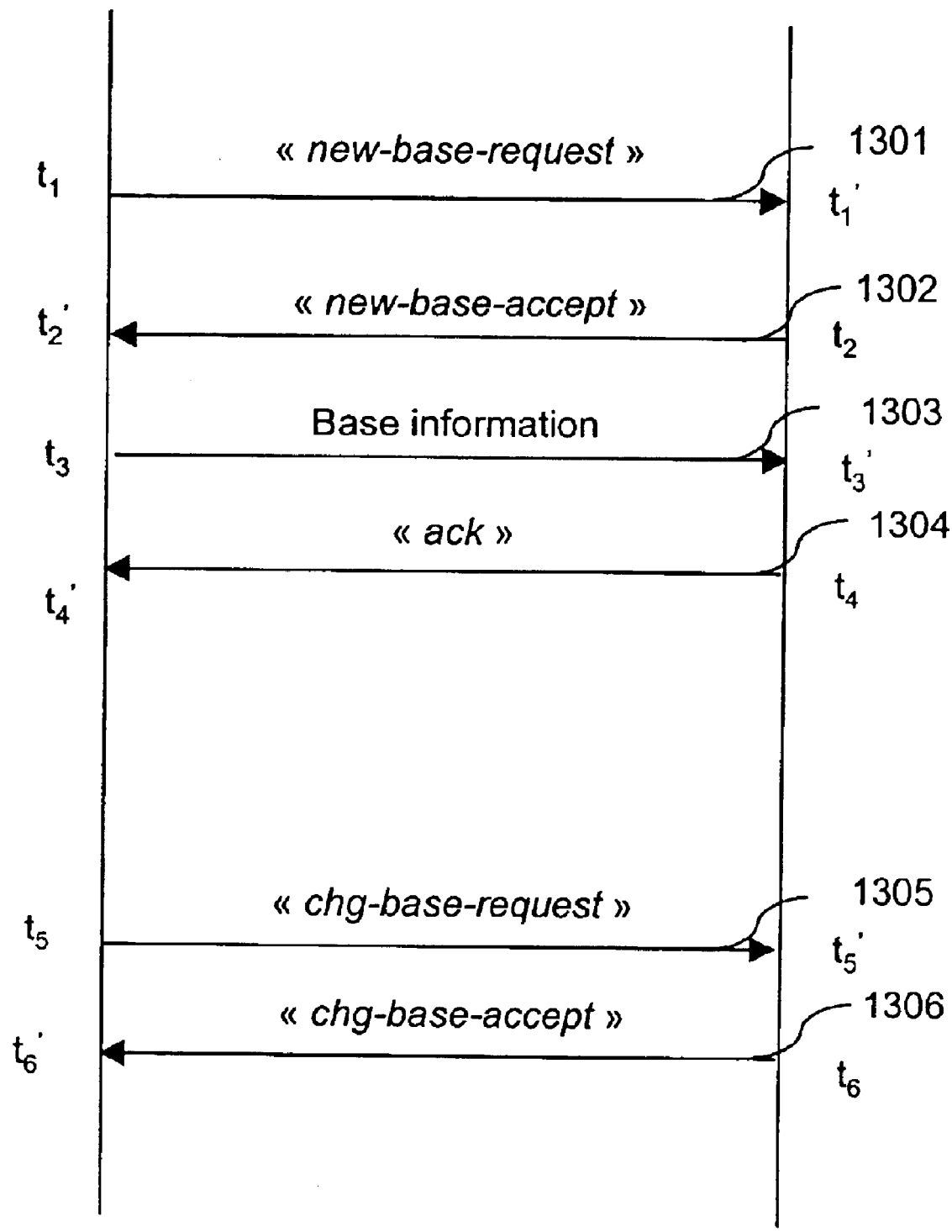
Figure 14A:
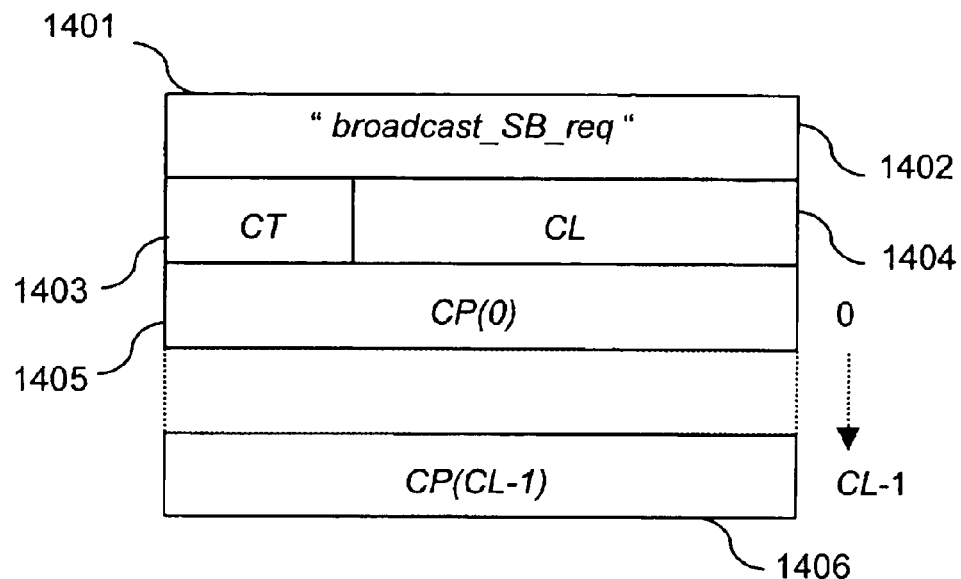
Figure 14B:
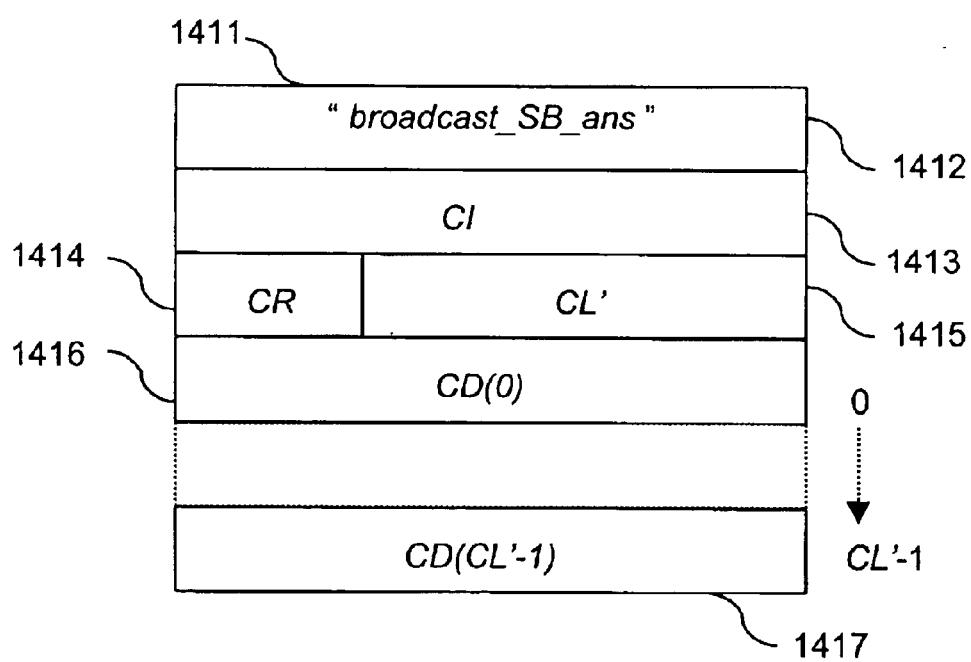
Figure 15:
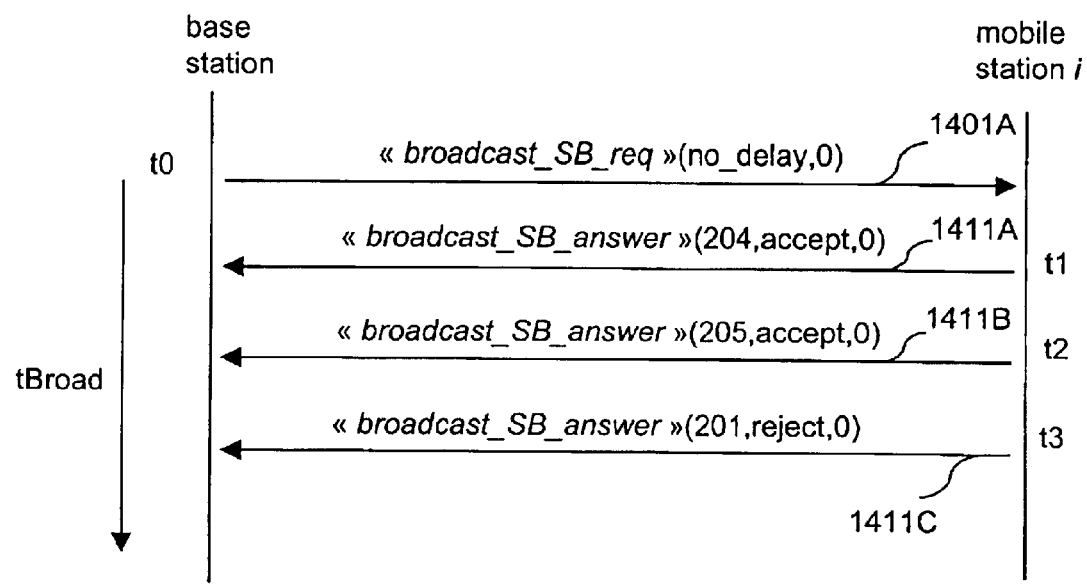
Figure 16:
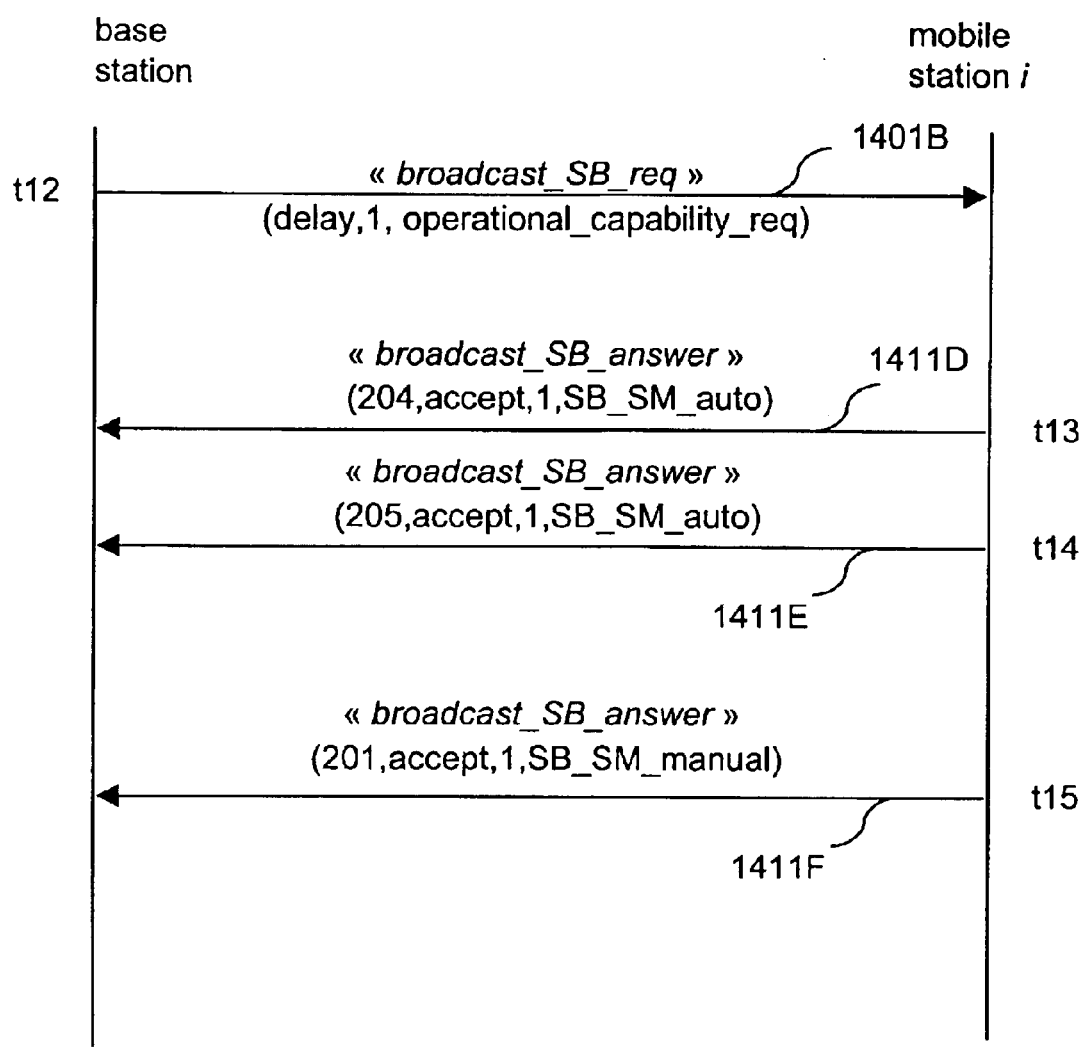
Figure 18A:
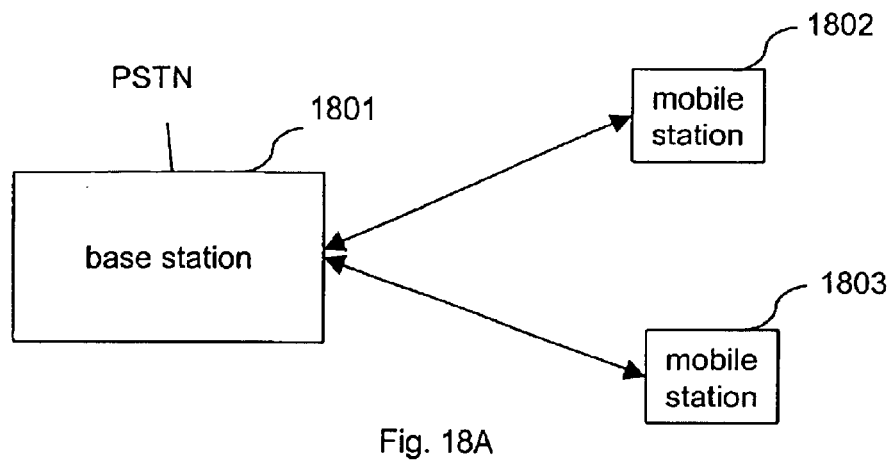
Figure 18B:
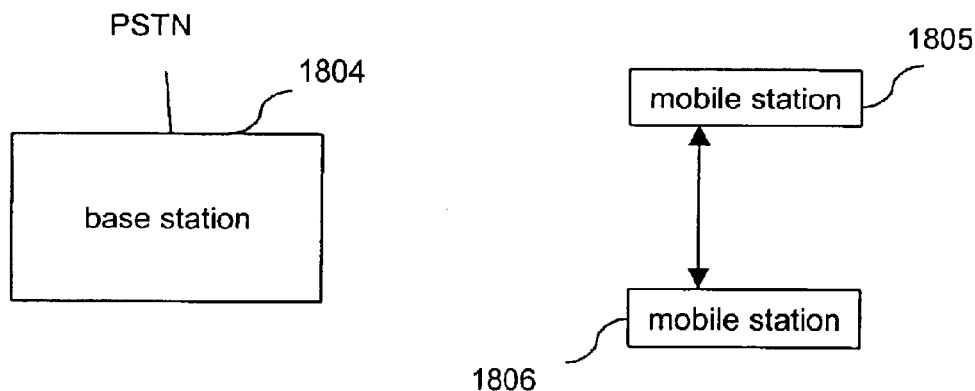
Figure 18C:
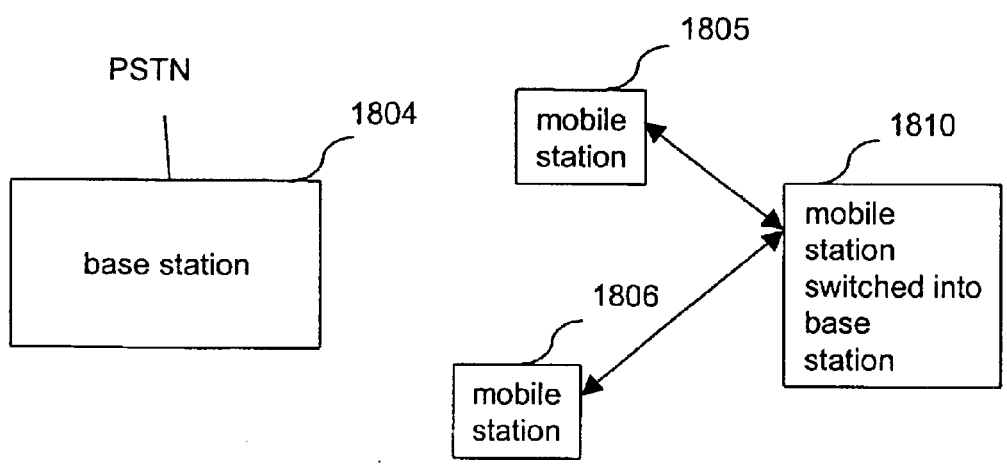
Figure 19:
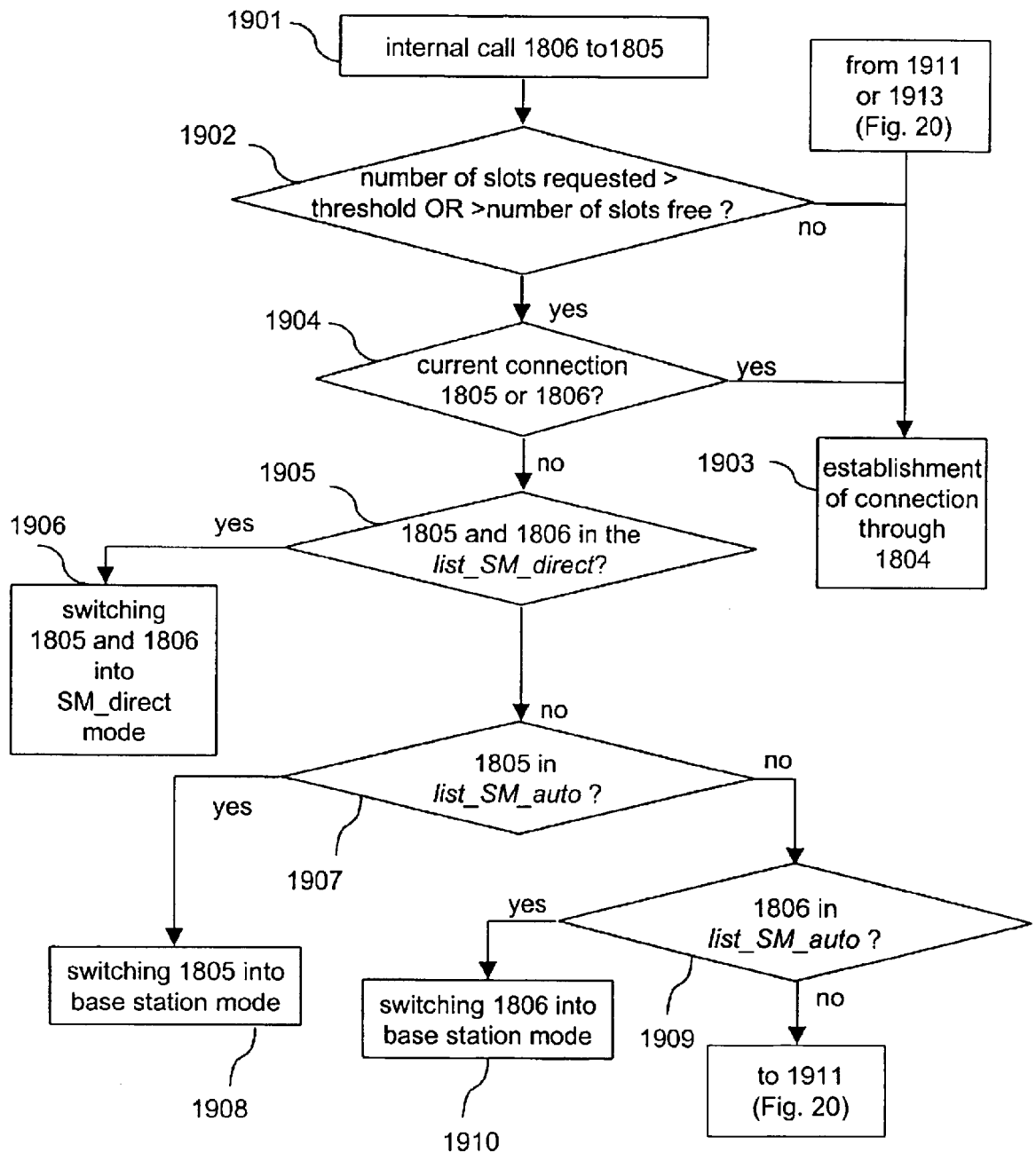
Figure 20:
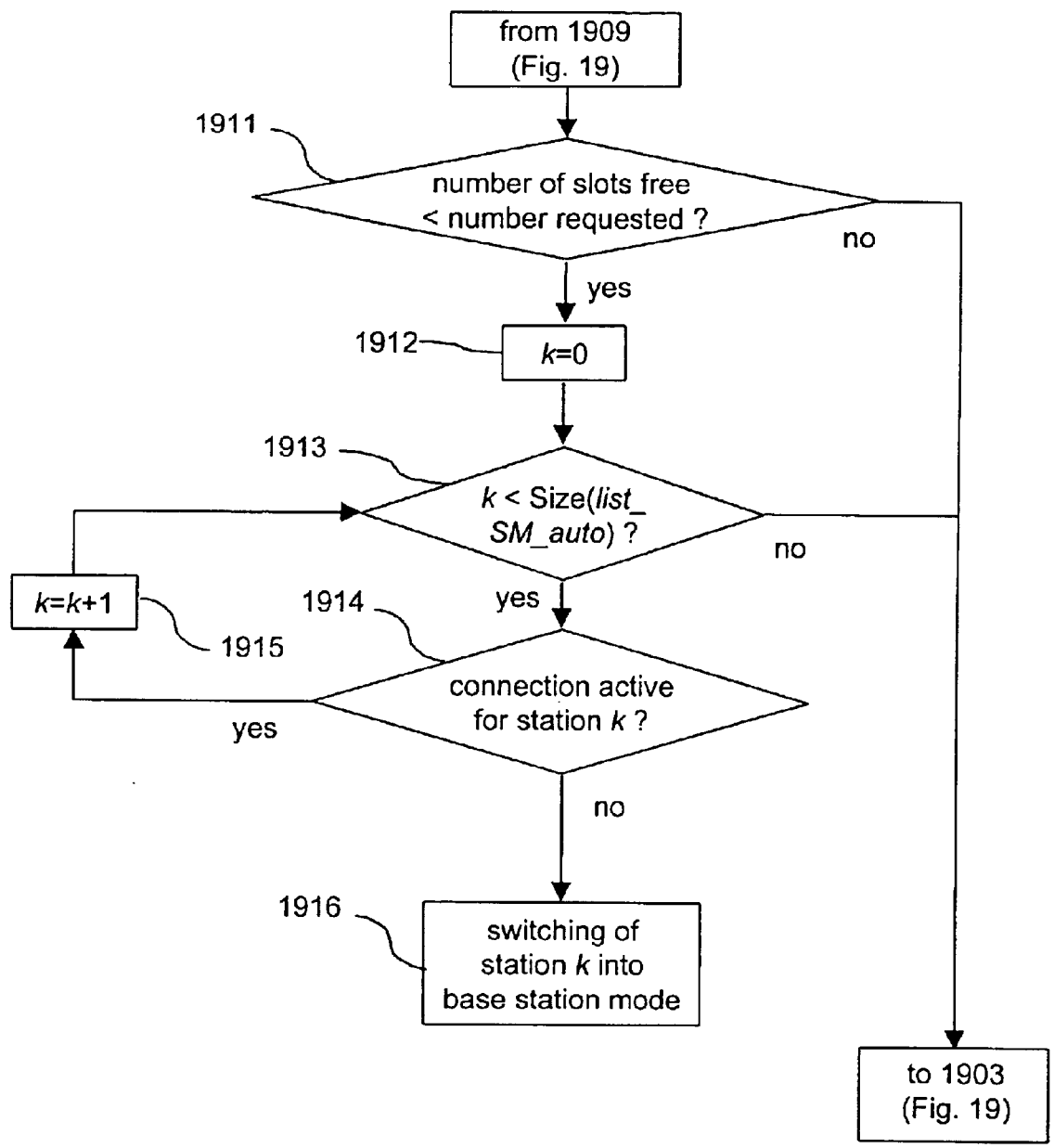
Figure 21A:
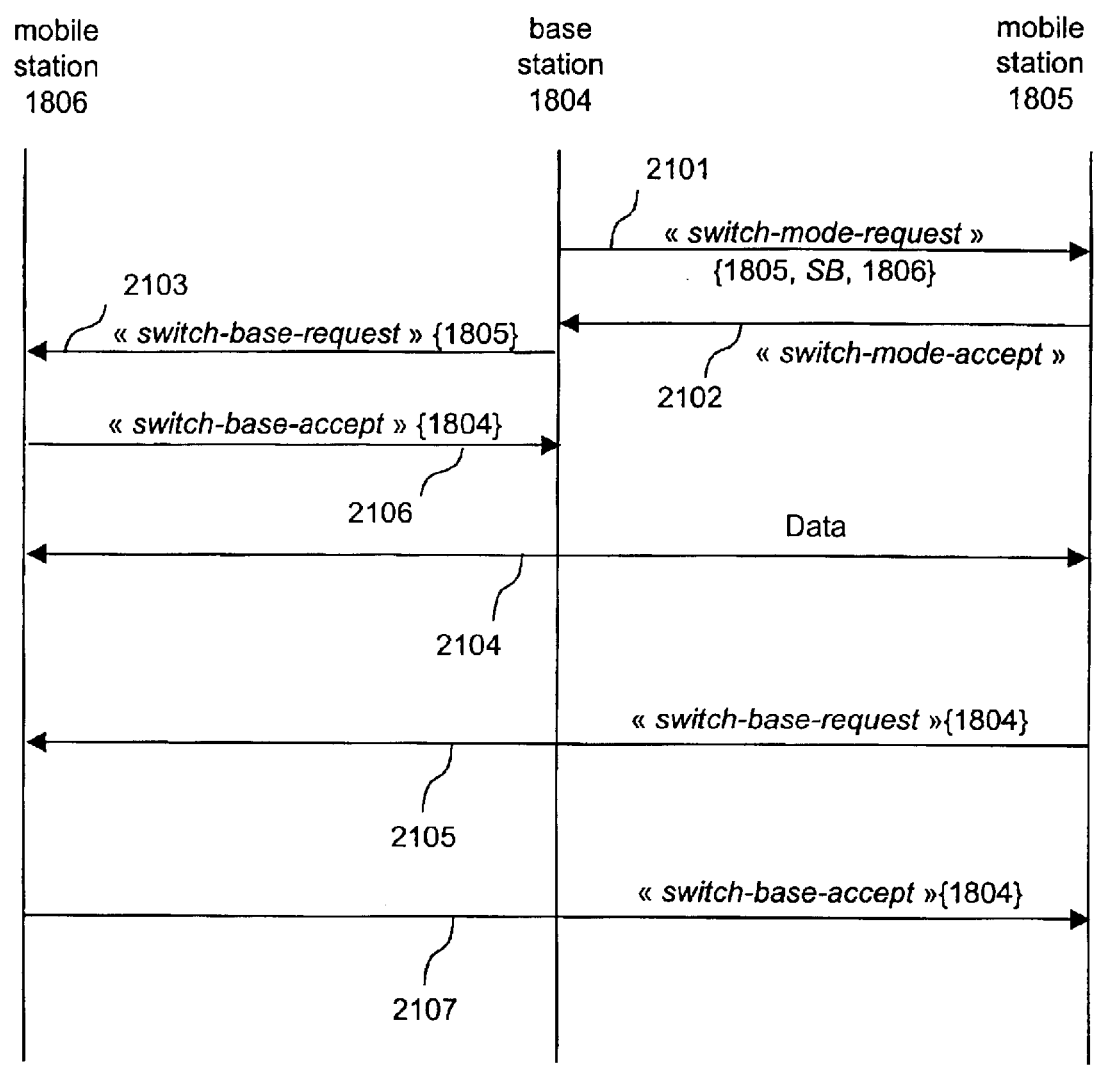
Figure 21B:
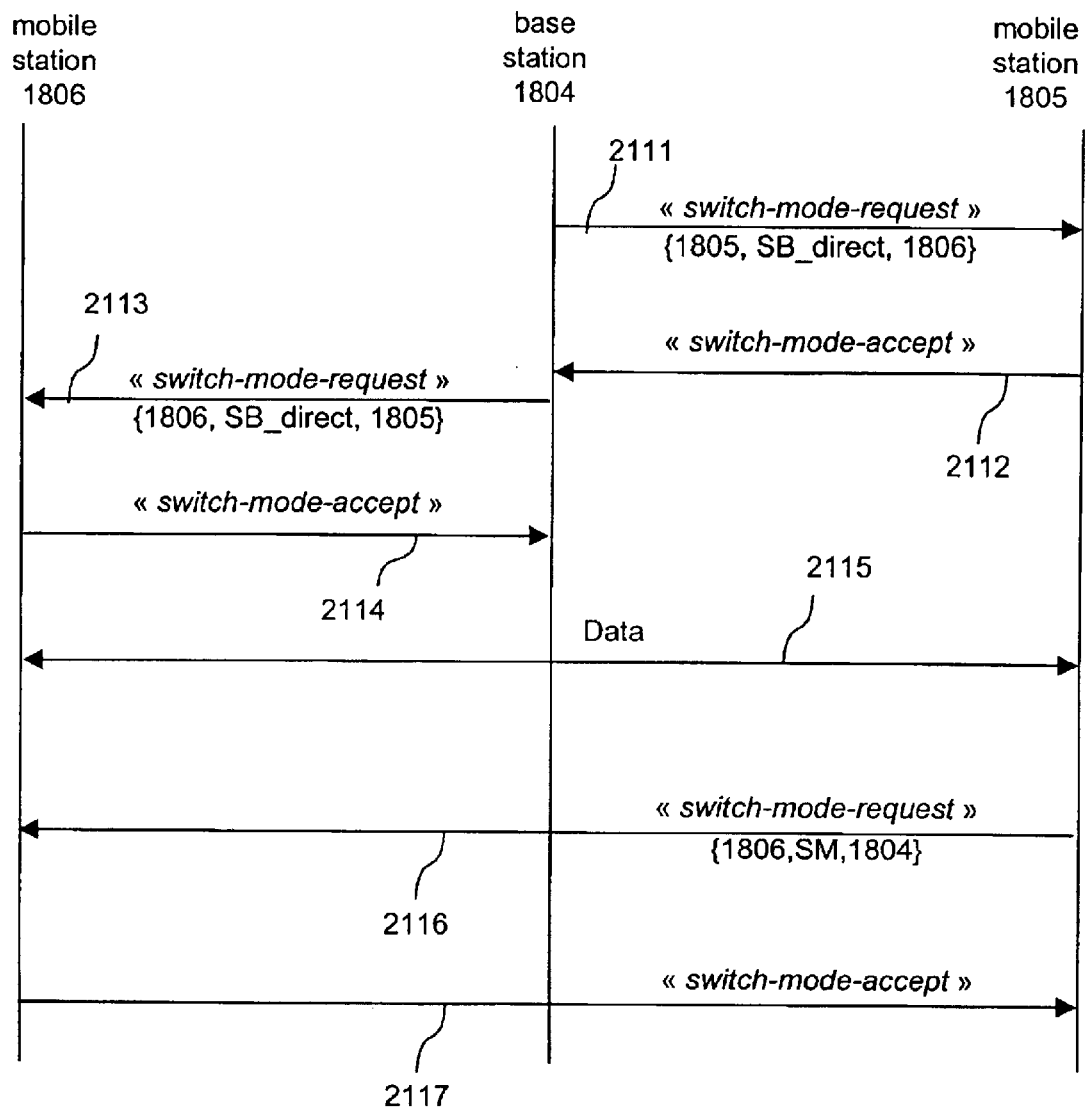
Figure 22:
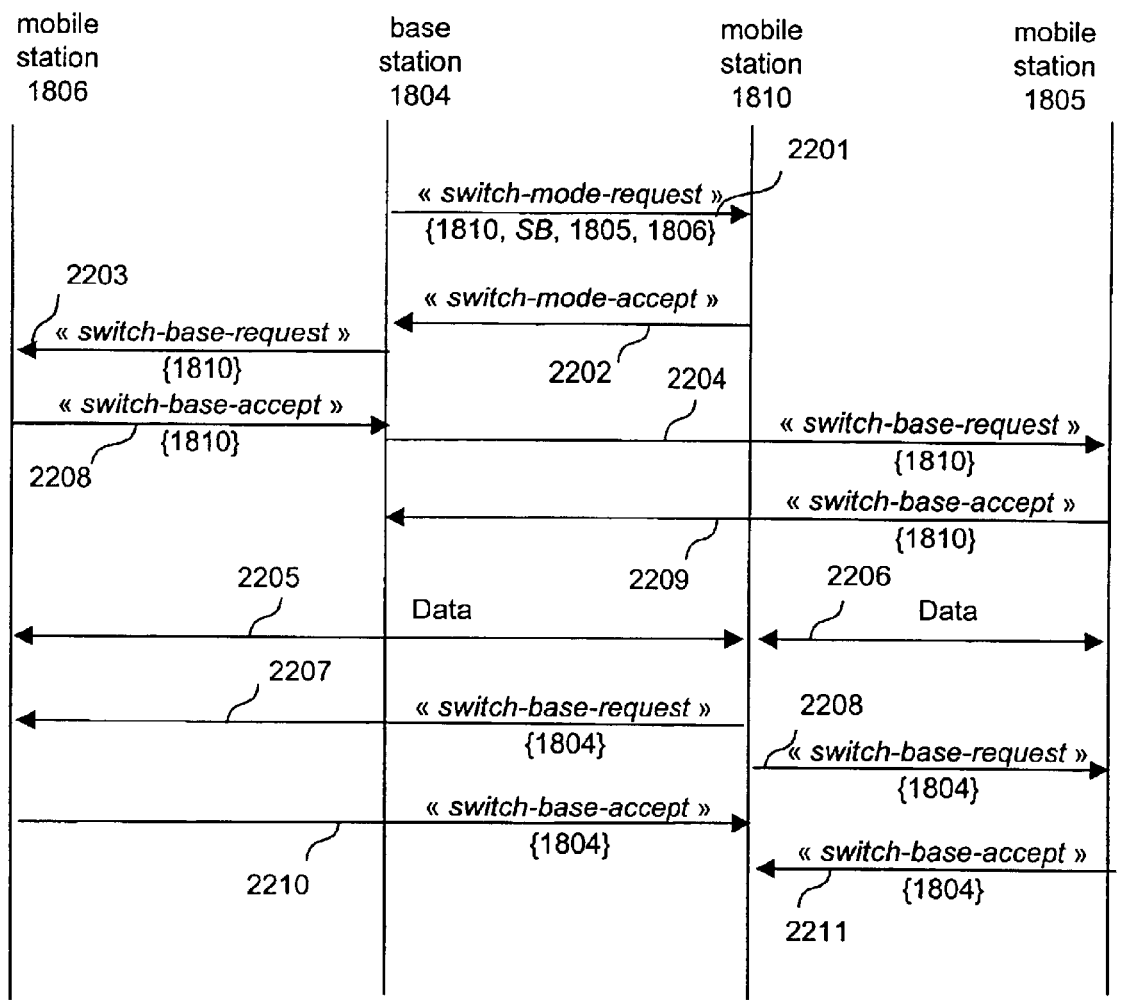
Figure 23:
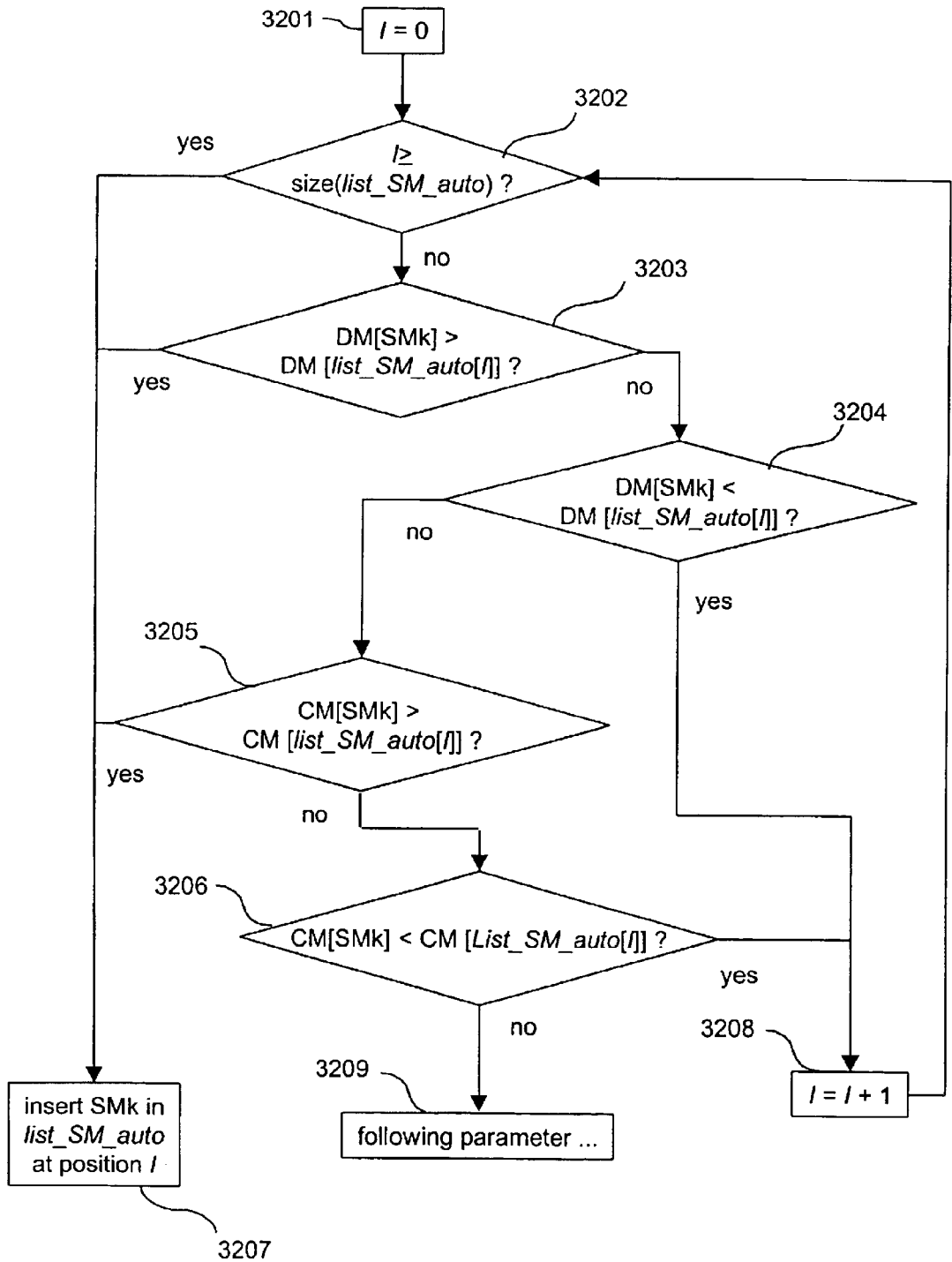
Figure 24:
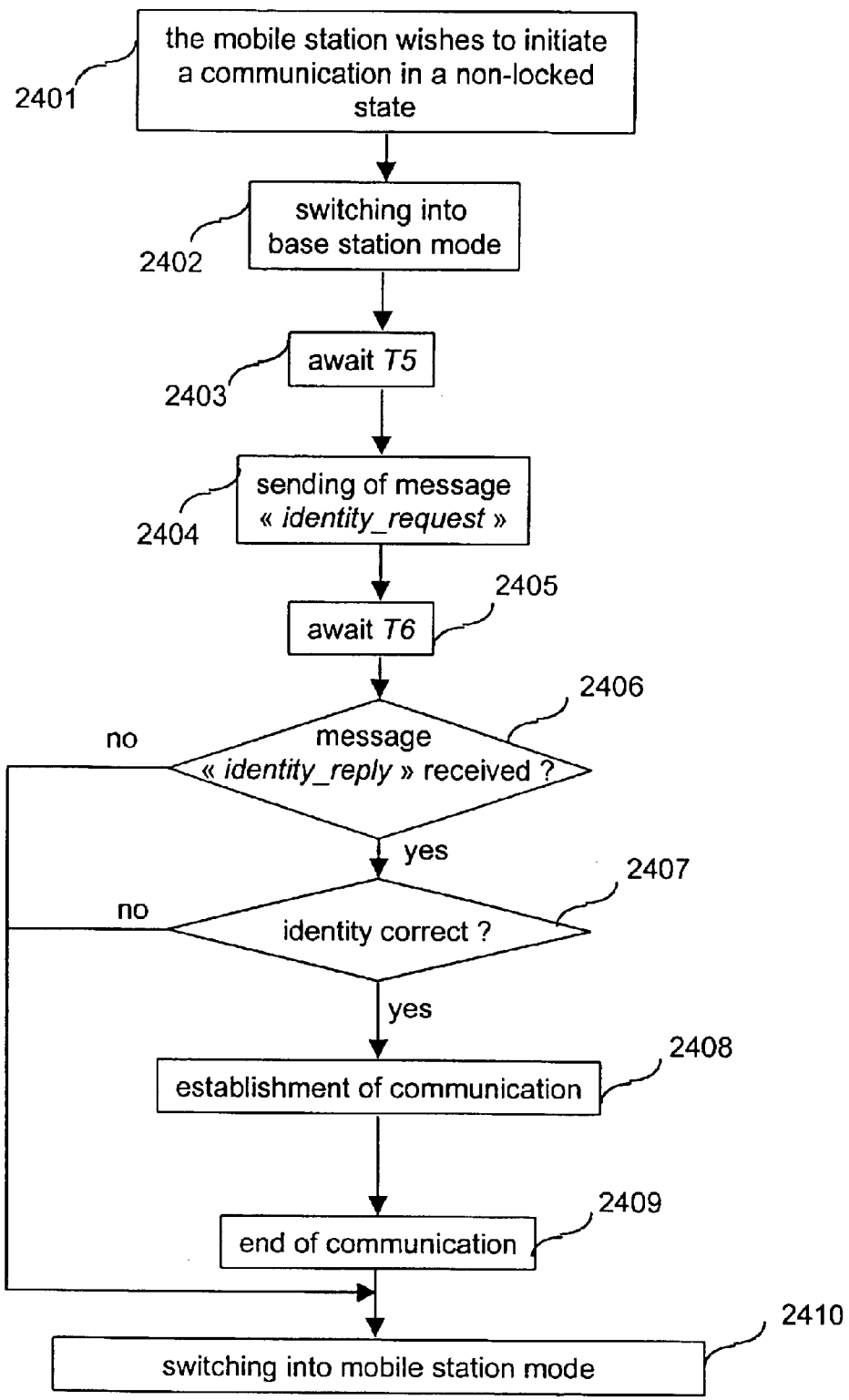
Figure 25:
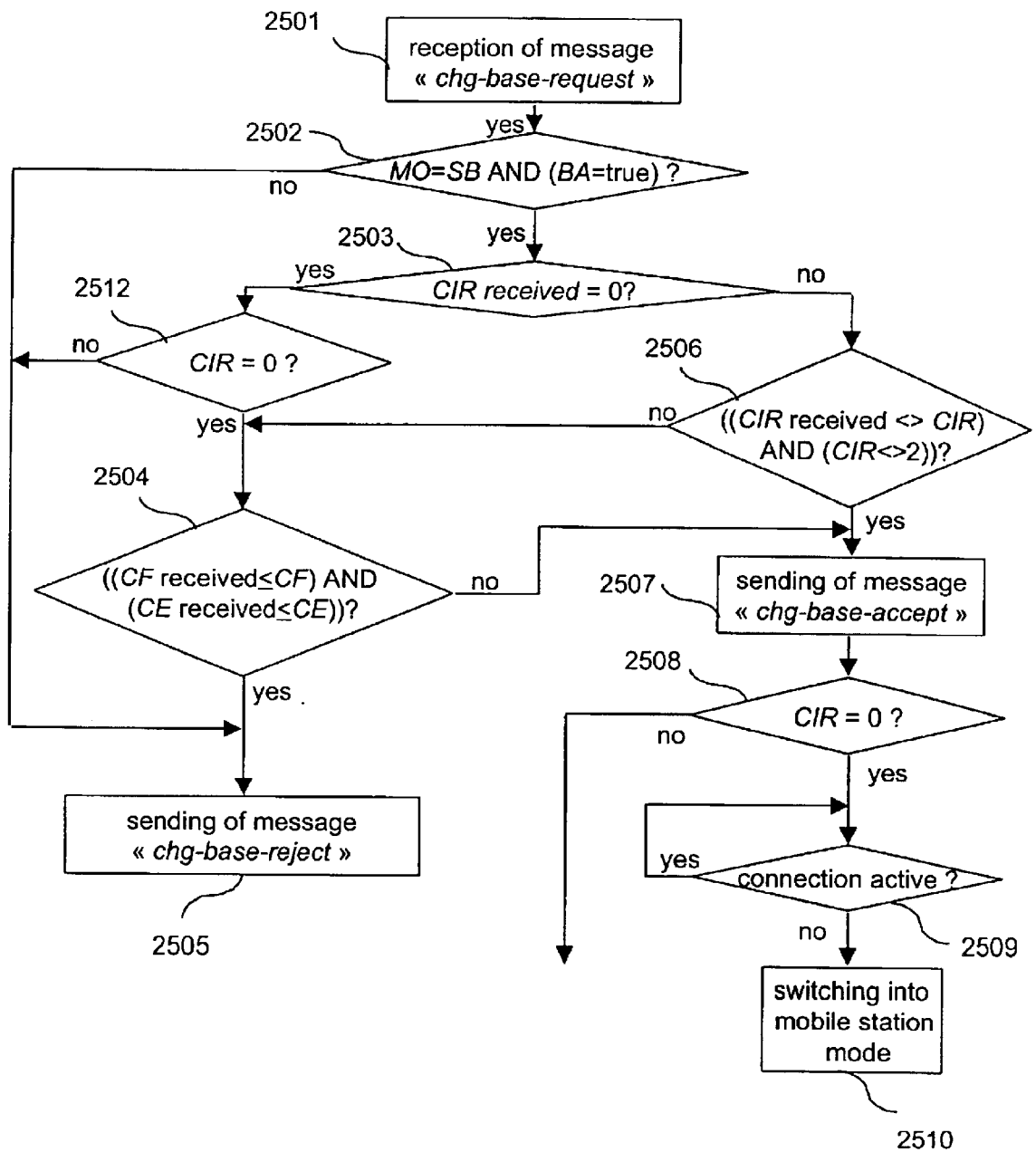
Figure 26:
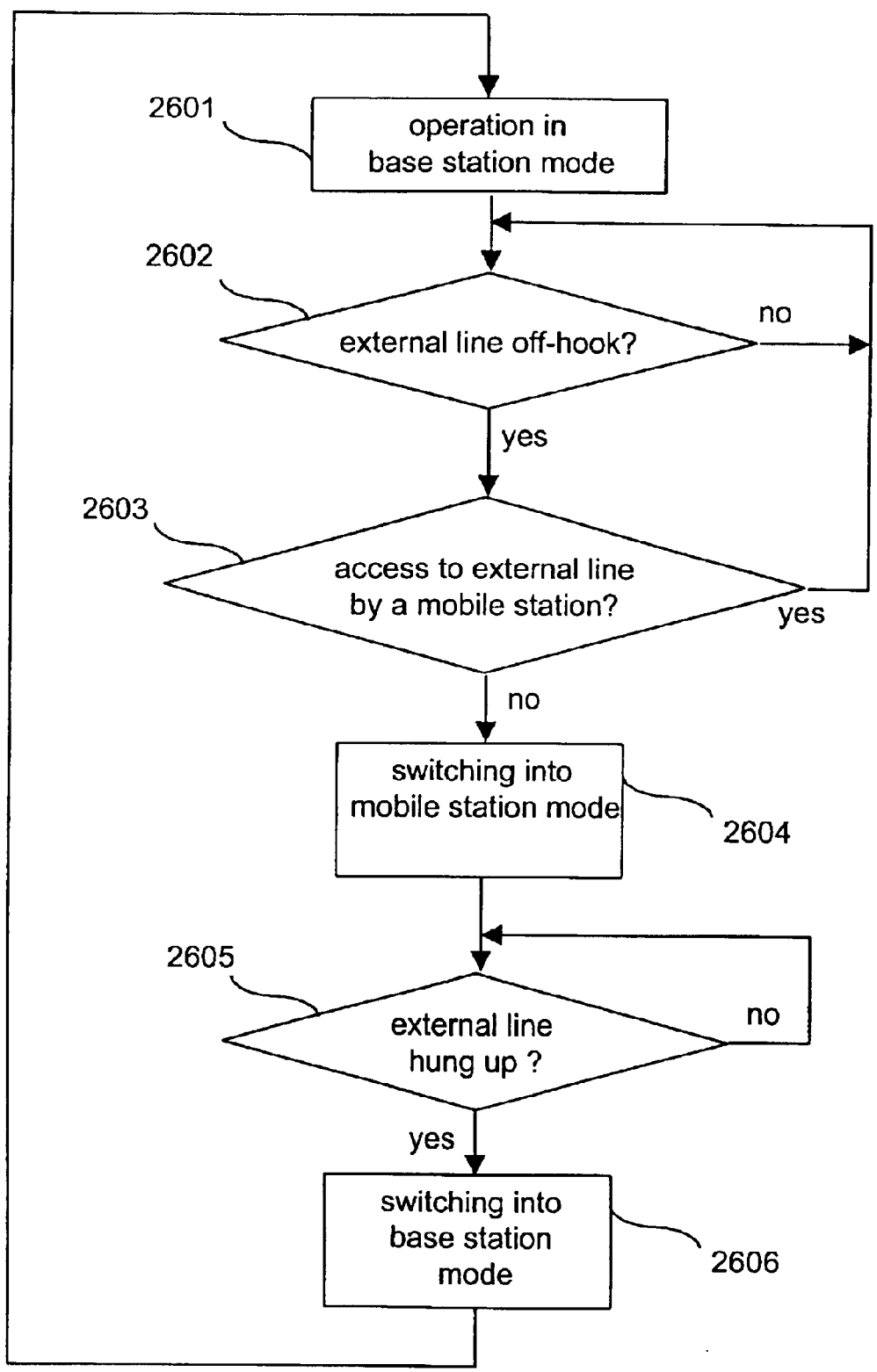
Figure 27:
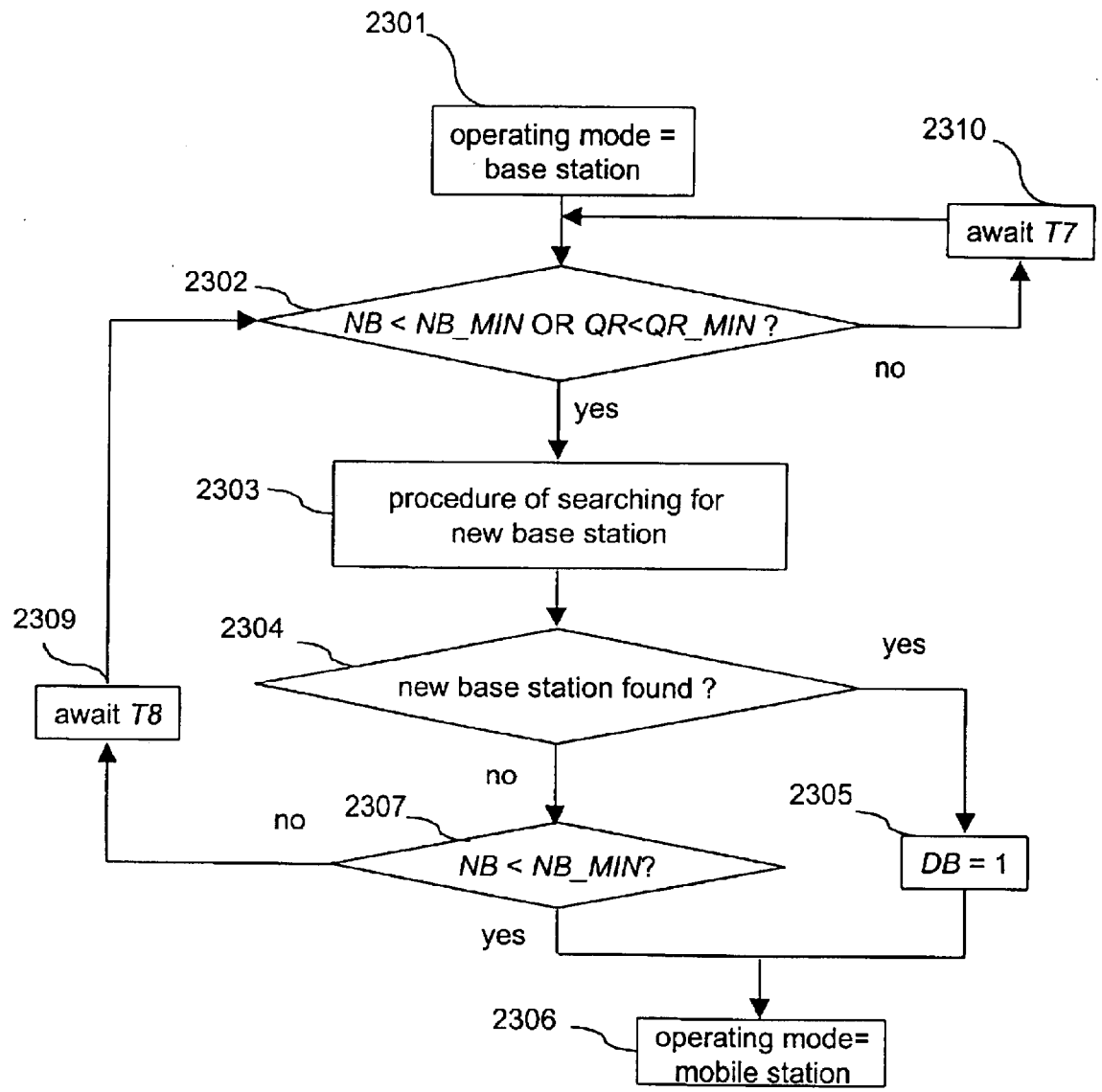
Figure 28:
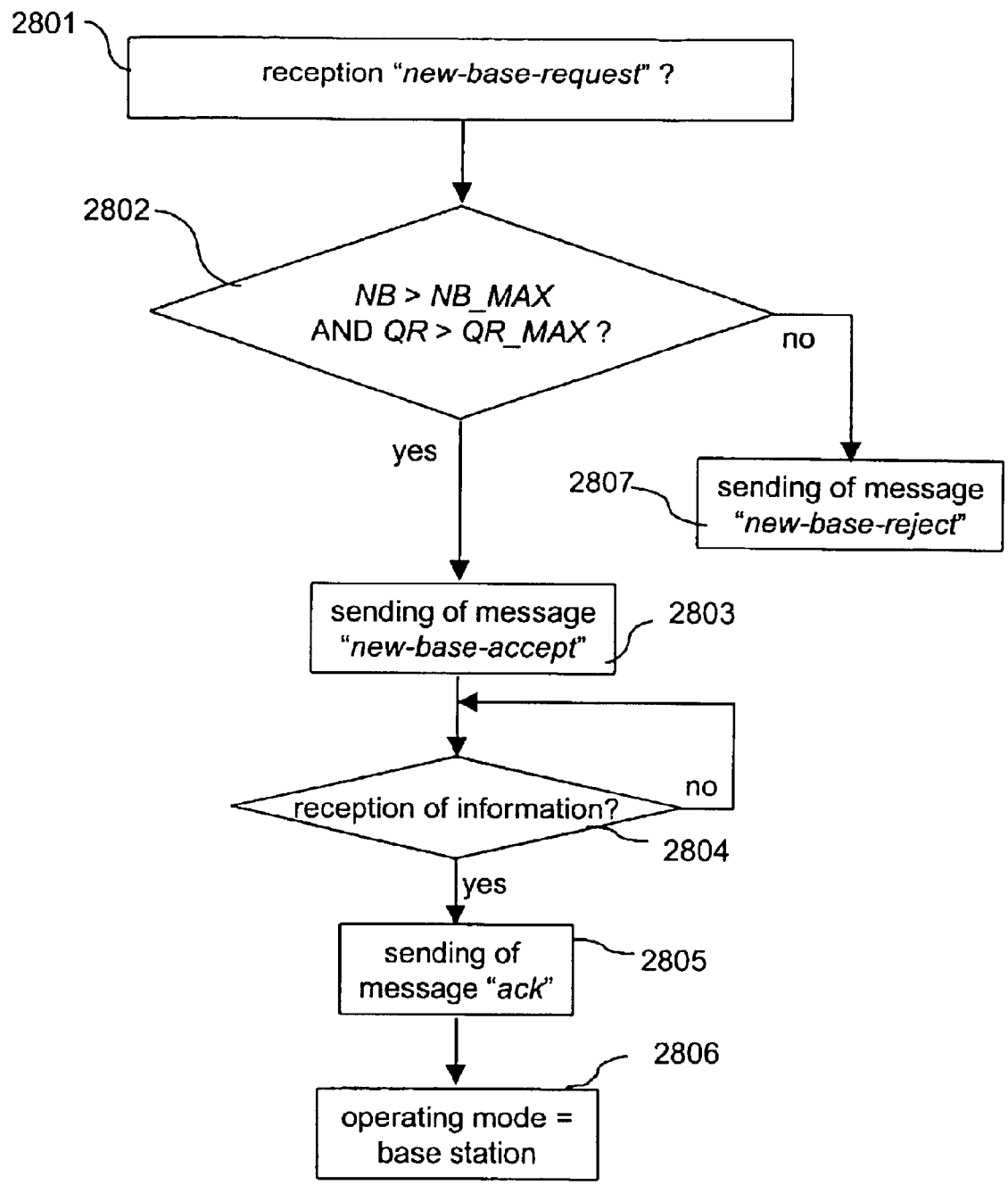
Figure 29:
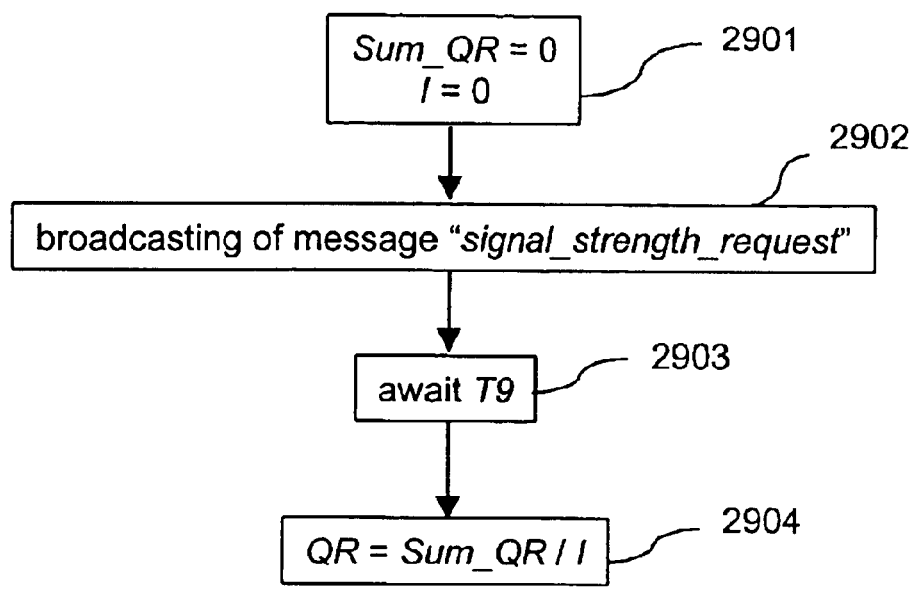
Figure 30:
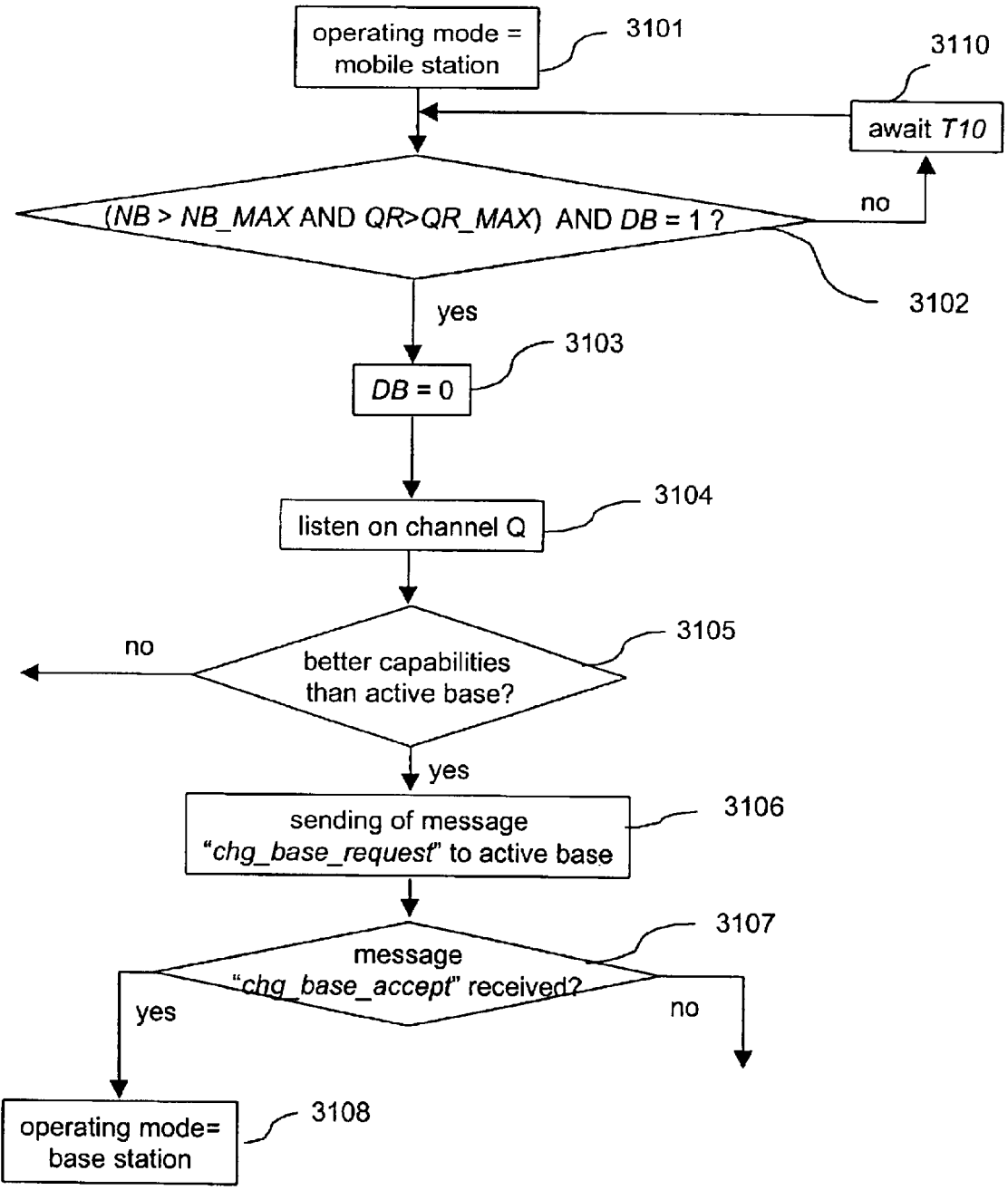

Other advantages, aims and characteristics of the present invention will emerge from the following description, given with reference to the accompanying drawings, in which:

FIG. 1 depicts, schematically, an operating flow diagram of a mobile station, with a view to its insertion in a network, in accordance with the prior art, FIG. 2 depicts schematically a network including communication devices according to the second, fourth, sixth and eighth aspects of the present invention, adapted to implement the communication method of the first, third, fifth and seventh aspects of the present invention, FIG. 3A depicts schematically the architecture of an electronic circuit incorporated in a communication device according to the second, fourth and sixth aspects of the present invention, FIG. 3B depicts schematically the architecture of an electronic circuit incorporated in a communication device according to the eighth aspect of the present invention, FIG. 4 depicts schematically an operating flow diagram: of a communication device according to the second, fourth, sixth and eighth aspects of the present invention, with a view to its insertion in a network, FIG. 5 details part of the flow diagram illustrated in FIG. 4, FIG. 6A depicts schematically the organisation of information sent by a communication device according to the second, fourth and sixth aspects of the present invention, with a view to informing a base station of the capabilities of this device related to functioning in base station mode, FIG. 6B depicts schematically the organisation of information sent by a communication device according to the eighth aspect of the present invention, with a view to informing a base station of the capabilities of this device related to functioning in base station mode, FIGS. 7, 8A and 8B depict schematically exchanges of information occurring between communication devices according to the second, fourth, sixth and eighth aspects of the present invention, when a mobile station joins or leaves a cell, FIGS. 9, 10, 11 and 12 depict schematically operating flow diagrams of communication devices according to the second, fourth, sixth and eighth aspects of the present invention, with a view to a change in base station, FIG. 13 is a schematic time representation of the messages exchanged between communication devices in accordance with the flow diagrams in FIGS. 9 to 12, FIGS. 14A and 14B depict schematically the organisation of information sent by communication devices according to the second, fourth, sixth and eighth aspects of the present invention, with a view to collecting information concerning the capability of mobile stations of functioning in base station mode, FIGS. 15 and 16 depict schematically messages exchanged between communication devices according to the second, fourth, sixth and eighth aspects of the present invention, with a view to collecting information concerning the capability of mobile stations of functioning in base station mode, FIG. 17 depicts schematically a physical frame structure known in the state of the art, FIG. 18A depicts schematically a communication internal to a cell according to the state of the art, FIGS. 18B and 18C depict schematically a cell split implemented by the device which is the object of the second, fourth, sixth and eighth aspects of the present invention, FIGS. 19 and 20 depict schematically operating flow diagrams of communication devices according to the second, fourth, sixth and eighth aspects of the present invention, with a view to splitting the cell during an internal communication, FIGS. 21A, 21B and 22 depict schematically information exchanges occurring between communication devices according to the second, fourth, sixth and eighth aspects of the present invention, with a view to splitting the cell during an internal communication, FIG. 23 depicts schematically a flow diagram of classification of mobile stations as a function of criteria defining their capability of functioning as a base station, FIG. 24 depicts schematically a flow diagram implemented by a communication station functioning initially as a mobile station, with a view to communication, in the absence of a base station, FIG. 25 depicts schematically a flow diagram implemented by a communication station functioning initially as a mobile station, on reception of a message requesting a change in base station in accordance with the message illustrated in FIG. 6B, FIG. 26 depicts schematically a flow diagram implemented by a communication station connected to an external network, FIG. 27 depicts schematically a flow diagram implemented by a communication station functioning initially as a base station, when its capability of pursuing this functioning mode decreases, FIG. 28 depicts schematically a flow diagram implemented by a communication station functioning initially in mobile station mode, on reception of a message requesting a change in base station, FIG. 29 depicts schematically a flow diagram implemented by a communication station, functioning in base station mode, in order to determine a radio transmission quality, and FIG. 30 depicts schematically a flow diagram implemented by a communication station functioning initially in mobile station mode, but having already functioned in base station mode, when its capabilities of functioning in base station mode have been restored.

In the description which follows, the term "communication device" designates a communication station able to behave, in a communication network, as a base station or as a mobile station, in accordance on the one hand with the DECT standard and on the other hand with the different functioning modes described in relation to the accompanying drawings.

FIG. 1 describes the procedure of locking a mobile station onto a signal transmitted by a base station, as known in the prior art.

When a mobile station is powered up, it goes into an internal initialisation state 101. Next, during an operation 102, the mobile station goes into reception mode on the next channel (there are ten of them) in the frequency band allocated for communications in accordance with the DECT standard (that is to say 1880 to 1900 MHz), seeking a signal transmitted by a base station which is suitable to it. When operation 102 is first iterated, it is the first channel which is chosen. When, before performing operation 102, the last channel is considered, it is the first channel which is chosen, during operation 102.

Next, during a test 103, the mobile station listens out on the radio channel under consideration, for a predetermined period, in order to detect a synchronisation pulse coming from a base station. The mobile station thus determines whether or not a base station is using the channel under consideration for sending a synchronisation signal.

When the result of test 103 is negative, during a test 104, the mobile station determines whether or not the channel under consideration is the last one. When the result of test 104 is negative, operation 102 is reiterated. When the result of test 104 is positive, during an operation 105, the mobile station goes into standby mode and then, during an operation 107, it waits for a predetermined period T0 (which can be a decreasing function of the energy resources of the mobile station), before reiterating operation 102.

When the result of test 103 is positive, during a test 108, the mobile station determines whether or not it has a right of access to the base station which sends the synchronisation signal.

To this end, when the result of test 103 is positive, the mobile station can obtain the information broadcast by the base station, every multi-frame (each multi-frame being composed of sixteen frames with a duration of ten milliseconds). Amongst the information broadcast by the base station, there is notably the so-called "ARI" parameter (initials of the words "Access Rights Identity") which defines the access rights to the base station under consideration. Each mobile station having at least one identity referred to as "PARK" (initials of the words "Portable Access Rights Key"), it is the correspondence between at least one of the "PARK" identities and the "ARI" parameter which is tested during test 108.

When the result of test 108 is negative, test 104 is performed. When the result of test 108 is positive, during an operation 109, the mobile station locks onto the base station which is sending the synchronisation signal detected on the channel under consideration.

At the end of operation 109, the mobile station can obtain the information broadcast by the base station whose ARI parameter corresponds with at least one of its "PARK" identities.

The mobile station can then initiate or accept a connection by means of the base station onto which the mobile station is locked. The mobile station can then communicate with the other mobile stations which are also locked onto the same base station and with the base station itself, in particular when the latter supplies an access point to another network, for example by telephone.

It should be noted here that, if there is no base station which is sending a synchronisation signal, no communication is possible between the mobile stations, in accordance with the prior art.

FIG. 2 depicts, in one and the same local area 200, different communication devices in accordance with the present invention:
- the communication devices 202 and 203 are telephones of a known type, complying, for example, with the DECT GAP standard (initials of the words "Generic Access Profile") and which is dedicated to portable telephone voice transmission,
- the communication devices 201, 204 and 205 are multimedia terminals able to behave, in the cell 200, as a base station or as a mobile station.

In the embodiment described and depicted, the communication devices 201, 204 and 205 support the DECT GAP standard, and comply with the type "A" data profile, relating to data transfers up to a rate of 24 kilobits per second. The communication device 201 also complies with the type "AB" data profile, relating to the transfer of data up to a rate of 552 kilobits per second, but can switch into base station mode only following a manual operation by the user.

Each device according to the present invention, 201, 204 and 205, operates, by default, in accordance with the description of FIG. 1, that is to say, at the time of initialisation, it goes into mobile station functioning mode.

In FIG. 3A, it can be seen that each communication device according to the second, fourth and sixth aspects of the present invention, 201, 204 or 205, has, connected together by a bus 301:
- a controller 306,
- a DECT base band unit 302,
- a DECT radio unit 303, itself connected in addition to a sending/receiving antenna 307,
- a random access memory 304,
- a read-only memory 305,
- a keyboard 307,
- a display 308,
- an energy level controller 309, itself connected in addition to an electrical power supply 310 (battery, accumulator or mains), and
- an input/output interface 311.

The controllers 306 and 309 and the DECT base band unit 302 consist in fact of a processor and an operating program stored in the read-only memory 305.

The DECT base band unit 302 is of a known type and is adapted to exploit all the capabilities of the DECT standard known up to the time of the present invention.

The controller 306 is adapted to implement the method of the invention and in particular the flow diagrams illustrated in the figures. The energy level controller 309 is intended to evaluate the available energy level, in a known fashion, in order to determine timing values (see below).

The random access memory 304 stores, in registers which, for convenience, each bear the same name as the data which they contain:
- temporary variables l and k,
- a variable "MO" representing the current operating mode, mobile station or base station,
- a variable "MD" representing the random access memory available,
- a variable "CMD" representing a value coefficient for the available memory which takes one of three values "0", "1" or "2" depending on whether the memory area available has a capacity less than two predetermined values MD_N1 and MD_N2, is between the two predetermined values or is greater than the two predetermined values,
- a memory area "Tx/Rx" reserved for the reception or transmission of data,
- a table "Table_SM" containing a list of the identities of the mobile stations (including the devices according to the present invention) declared to the base station, and the information associated with these mobile stations,
- a list "List_SM_auto" containing a list of the identities of the devices according to the present invention, that is to say those able to change operational mode automatically (for example stations 204 and 205),
- a list "List_SM_manual" containing a list of the identities of the mobile stations able to change operational mode, through the intervention of their user (for example station 201), and
- a list "List_SM_direct" containing a list of the identities of the mobile stations able to communicate directly with each other, without a base station.

The read-only memory 305 stores, in registers which, for convenience, each bear the same name as the data which they contain:
- an item of information "CM" on the memory capacity of the device,
- an item of information "CP" on the capacity of the processor of the device,
- an indicator "IP" representing profiles of the DECT standard supported by the device (in fact by its DECT base band unit 302),
- an item of information "TS" representing the types of time intervals (referred to as "slots" in the remainder of the description and, in particular, in FIG. 17, a term in accordance with the usage of persons skilled in the art of communications) which are DECT supported (single, double or half-slot),
- an item of information "DM" representing a maximum data rate supported by the device (for example between 24 and 552 kilobits per second),
- the memory area capacity values MD_N1 and MD_N2.
- an item of information representing its identity,
- a coefficient "CPR" representing the number of DECT profiles supported,
- an item of information "CO" representing the operational capability of the device. This information can take the following values:
  "SB": the device can operate only in base station mode,
  "SM": the device can operate only in mobile station mode,
  "SB/SM_manual": the device can change operating mode through the intervention of its user, "SB/SM_auto": the device can automatically change operating mode, "SM/SM_direct": the device can communicate directly with another mobile whose information "CO" takes the value "SM/SM_direct", and an item of information "BA" representing the automatic or manual switching capability from a base station functioning mode to a mobile station functioning mode and vice versa ("BA" being equal to "true", when this capability exists, and "false" otherwise).

The read-only memory 305 constitutes a means of storing information which can be read by a computer or a microprocessor, storing instructions of a computer program characterised in that it implements the method of the invention. According to a variant, the read-only memory 305 is removable, partially or totally, and has for example a magnetic strip, a flash memory, a diskette or a fixed-memory compact disc (CD-ROM).

In FIG. 3B, it can be seen that each communication device according to the eighth aspect of the present invention, 201, 204 or 205, has, connected together by a bus 301:

a controller 306,
a DECT base band unit 302,
a radio unit 303, itself connected in addition to a sending/receiving antenna 307,
a random access memory 304,
a read-only memory 305,
a keyboard 307,
a display 308,
an energy level controller 309, itself connected in addition to an electrical power supply 310 (battery, accumulator or mains),
an input/output interface 311, and
a communication quality controller 312.

The controllers 306 and 309 and the DECT base band unit 302 consist in fact of a processor and an operating program stored in the read-only memory 305.

The DECT base band unit 302 is of a known type and is adapted to exploit all the capabilities of the DECT standard known up to the time of the present invention.

The controller 306 is adapted to implement the method of the invention and, in particular, the flow diagrams illustrated in the figures. The energy level controller 309 is intended:

to recognise the type of electrical power supply (mains or battery), in a known fashion, and to evaluate the energy level available for the communication device, in order to determine:

time delay values (see below), and an ability to become a base station or to remain so.

The communication quality controller 312 is adapted to evaluate the quality of the radio signal and to supply a value QR representing this quality.

The random access memory 304 stores, in registers which, for convenience, each bear the same name as the data which they contain:

temporary variables l and k, a value "QR" representing the quality of the radio signal measured by the controller 312, a value "NB" representing an available energy quantity, a value "DB" representing the past functioning of the station, in base station mode, a variable "MO" representing the current operating mode, mobile station or base station, a variable "MD" representing the random access memory available, a variable "CMD" representing a value coefficient for the available memory which takes one of three values "0", "1" or "2" depending on whether the memory area available has a capability less than two predetermined values MD_N1 and MD_N2, is between the two predetermined values or is greater than the two predetermined values, a memory area "Tx/Rx" reserved for the reception or transmission of data, a table "Table_SM" containing a list of the identities of the mobile stations (including the devices according to the present invention) declared to the base station, and the information associated with these mobile stations, a list "List_SM_auto" containing a list of the identities of the devices according to the present invention, that is to say those able to change operational mode automatically (for example stations 204 and 205), a list "List_SM_manual" containing a list of the identities of the mobile stations able to change operational mode, through the intervention of their user (for example station 201), and a list "List_SM_direct" containing a list of the identities of the mobile stations able to communicate directly with each other, without a base station.

The read-only memory 305 stores, in registers which, for convenience, each bear the same name as the data which they contain:

an item of information "CM" on the memory capacity of the device, an item of information "CP" on the capacity of the processor of the device, a minimum communication quality value QR_min, a maximum communication quality value QR_max, a minimum available energy quantity value NB_min, a maximum available energy quantity value NB_max, an indicator "IP" representing the profiles of the DECT standard supported by the device (in fact by its DECT base band unit 302), an energy coefficient "CE" which represents the energy source of the station under consideration, according to three values: "CE_HIGH", equal to "2", for a printer, copier, facsimile machine or office computer, and more generally for any equipment which is generally connected to the mains or which has a means of detecting connection to the mains which indicates that the station is connected to the mains, "CE_MID", equal to "1", for a portable computer and more generally for a communication station which can operate either on the mains or on a battery, and "CE_LOW", equal to "0", for a pocket organiser or portable telephone, and more generally for a communication station which operates almost exclusively on a battery, a fixity coefficient "CF" which represents the normal mobility of the station under consideration, according to three values: "CF_HIGH", equal to "2", for a printer, copier, facsimile machine or office computer, and more generally for any equipment which generally fixed, "CF_MID", equal to "1", for a portable computer and more generally for a communication station which can be moved but which is generally not in movement during its operation, and "CF_LOW", equal to "0", for a pocket organiser or portable telephone, and more generally for a communication station which may be in movement during its use, an item of network interface information "IR" which represents the types of network which can be accessed by the station, equal to "0" when no other network can be accessed and being non-nil when another network can be accessed, the positions of the bits equalling "1" in the binary representation of "IR" indicating which types of network can be accessed:

xxxx xxx1 PSTN (Public Switched Telephone Network)
xxxx xx1x ISDN (Integrated Service Digital Network)
xxxx x1xx LAN (Local Area Network)
xxxx 1xxx ATM (Asynchronous Transfer Mode),
a network interface coefficient "CIR" which represents the number of external networks accessible,
an item of information "TS" representing the types of time intervals (referred to as "slots" in the remainder of the description and, in particular, in FIG. 17, a term in accordance with the usage of persons skilled in the art of communications) which are DECT supported (single, double or half-slot),
an item of information "DM" representing a maximum data rate supported by the device (for example between 24 and 552 kilobits per second),
the memory area capacity values MD_N1 and MD_N2,
an item of information representing its identity,
a coefficient "CPR" representing the number of DECT profiles supported,
an item of information "CO" representing the operational capability of the device. This information can take the following values:
  "SB": the device can operate only in base station mode,
  "SM": the device can operate only in mobile station mode,
  "SB/SM_manual": the device can change operating mode through the intervention of its user,
  "SB/SM_auto": the device can automatically change operating mode,
  "SM/SM_direct": the device can communicate directly with another mobile whose information "CO" takes the value "SM/SM_direct", and
an item of information "BA" representing the automatic or manual switching capability from a base station functioning mode to a mobile station functioning mode and vice versa ("BA" being equal to "true", when this capability exists, and "false" otherwise).

The read-only memory 305 constitutes a means of storing information which can be read by a computer or a microprocessor, storing instructions of a computer program characterised in that it implements the method of the invention. According to a variant, the read-only memory 305 is removable, partially or totally, and has for example a magnetic strip, a flash memory, a diskette or a fixed-memory compact disc (CD-ROM).

The procedure followed by the controller 306 for determining the operating mode (base station or mobile station) is detailed in FIG. 4. When a communication device according to the present invention is powered up, it goes into an internal initialisation state 401. Next, during an operation 402, the communication device goes into reception mode on the next channel of the frequency band allocated for communications in accordance with the DECT standard, as disclosed with regard to operation 102 (FIG. 1).

Next, during a test 403, the communication device listens to the radio channel under consideration, for a predetermined period, in order to detect a synchronisation pulse coming from a base station (including the case of another communication device behaving as a base station). The communication device thus determines whether or not a base station is using the channel under consideration for sending a synchronisation signal.

When the result of test 403 is negative, during a test 404, the communication device determines whether or not the channel under consideration is the last. When the result of test 404 is negative, operation 402 is reiterated.

When the result of test 403 is positive, during a test 405', the communication device determines whether or not it has a right of access to the base station which is sending the synchronisation signal, as described with regard to operation 108 (FIG. 1).

When the result of test 405 is negative, the communication device performs test 404. When the result of test 405 is positive, during an operation 406, identical to operation 109 (FIG. 1), the communication device locks onto the base station which is sending the synchronisation signal detected on the channel under consideration.

At the end of operation 406, the communication device can obtain the information broadcast by the base station whose ARI parameter corresponds with at least one of its "PARK" identities. The communication device can also initiate or accept a connection by means of the base station onto which the device is locked. The communication device can then communicate on the one hand with the other mobile stations and the communication devices according to the present invention which behave as a mobile station, and which are also locked onto the same base station, and on the other hand with the base station itself or with the communication device which is behaving as a base station.

When the result of test 404 is positive, during an operation 407, the controller 306 of the communication device causes this communication device to switch into base station mode.

In this base station functioning mode, it sends, at regular time slots, with a duration less than the predetermined duration of test 403, a synchronisation signal, on one of the DECT channels. The duration of the regular time slot is, according to the DECT standard, 160 milliseconds.

Next, the communication device allows a time T1 to pass (for example one minute), operation 408, whilst continuing its functioning as a base station, before performing a test 409, during which it determines whether mobile stations are synchronised with it (see detail of test 409 in FIG. 5).

When the result of test 409 is negative, during an operation 411, the controller 306 causes the functioning mode to switch into mobile station mode, and then the communication device allows a predetermined time T2 to pass (for example as a decreasing function of the available energy evaluated by the energy level controller 309), operation 412, before renewing operation 402.

When the result of test 409 is positive, during an operation 413, the communication device allows a predetermined time T3 to pass (for example as an increasing function of the available energy evaluated by the energy level controller 309), whilst continuing its functioning in base station mode, before performing a test 414, during which the communication device determines whether or not at least one communication with a mobile station is active. When the result of test 414 is positive, it is reiterated. When the result of test 414 is negative, during an operation 415, the controller 306 causes the communication device to switch from base station mode to mobile station mode. Next, the communication device reiterates operation 402.

It will be understood that, in accordance with the flow diagram of FIG. 4, two operating criteria are used:
  when, in mobile station functioning mode, the communication device detects no base station, it goes into base station functioning mode, and when, in base station functioning mode, the communication device detects no mobile station, it goes into mobile station functioning mode.

In addition, when, in base station functioning mode, the communication device does not detect any communication with a mobile station, it goes into mobile station functioning mode. The purpose of the latter arrangements is to cause the base station to return to mobile station mode before once again seeking whether another base station can be detected.

In order to detect the presence of mobile stations (including the case of communication devices according to the present invention which behave as a mobile station), the case is chosen, with regard to FIG. 5, in which each communication device able to function in base station mode is informed of the identity of each communication device and of each mobile station able to communicate with it.

In this case, the communication device first of all performs a test 501 (FIG. 5), during which the controller 306 determines whether or not the list of mobile stations able to communicate with the communication device is empty. When the result of test 501 is positive, the result of test 409 is negative, operation 502. When the result of test 501 is negative, during an operation 503, a temporary variable l, which serves as an indicator on said list, is initialised to the value "0". Then, during an operation 504, the communication device sends, to the network, a message requesting an answer to the device identified by the $l^{th}$ identifier of the list. Then the communication device allows a predetermined time T4 to pass, operation 505, before performing a test 506, during which it determines whether or not an answer message has been sent by a communication device. When the result of test 506 is positive, during a test 507, the device determines whether the identity of the device which sent the answer message corresponds to the identity of the device which was called during operation 504. When the result of test 507 is positive, the result of test 409 is positive, operation 510. When the result of test 507 is negative, or when the result of test 506 is negative, during an operation 508, the value of the variable l is incremented.

Next, during a test 509, the communication device determines whether or not the value of the variable l is less than or equal to the size of the list. When the result of test 509 is positive, operation 504 is reiterated. When the result of test 509 is negative, the result of test 409 is negative, operation 502.

As a variant, in order to detect the presence of mobile stations, the following procedure is used: when a mobile station detects a base station and locks onto this base station, the mobile station sends to the base station a message representing its identity and its capabilities (see below). The base station can then update a list of mobiles present in the cell. Conversely, when a mobile station leaves the cell (that is to say the area of coverage of the base station) or before switching off, it sends to the base station a message indicating that it is terminating its access rights.

It should be noted here that the procedure of detecting that a mobile station is leaving its cell is known from the prior art, by analysing the signal reception power.

FIG. 6A depicts the structure of information concerning the operational mode capability of a station in the network, according to the first to sixth aspects of the present invention. This information can be transmitted in DECT protocol messages using a field reserved for the transfer of non-standardised information, referred to in the standard as "escape-to-proprietary". According to the invention, the non-standardised information is used solely in the following messages in the standard:

"access-rights-request", and

"locate-request", which includes an attachment request.

The first octet 601 of the field described in FIG. 6A indicates that the information elements which follow are non-standardised information to be sent within a DECT protocol message. The second octet 602 contains the information octet number to be transmitted. The third octet 603 indicates that the octets 604 and 605 contain an EMC ("Equipment Manufacturer Code") parameter, which serves to identify the manufacturer using this proprietary information. Thus, if an item of equipment whose EMC parameter is different from that indicated by the octets 604 and 605, it does not process the information which follows.

Naturally, if the present invention were to be the subject of standardisation between different manufacturers, octets 601, 604 and 605 would no longer be used in the same way.

Octet 606 represents the operational capability CO (identical to its value, in the embodiment described and depicted) of the device which acts as a mobile station. The following octets, 607 to 611, whose number is equal to the number of information octets to be transmitted (number represented by octet 602) minus four, serve to transmit more precise information on the capabilities of the device of operating as a base station. For example, the following parameters can be transmitted:

memory capacity of the device (octet 607), degree of filling of the memory of the device (octet 608), power, speed of the processor of the device (octet 609), and maximum rate supported by the device (octet 610).

The position bit 8 (on the left) of the information octets 607 to 610 takes one of the values:

"1", when the information element is transmitted in this message, or

"0", when the value of the following bits of the octet has no meaning (the information element is not transmitted in the message).

FIG. 6B depicts the structure of information concerning the operational mode capability of a station in the network, according to the seventh and eighth aspects of the present invention. This information can be transmitted in DECT protocol messages using a field reserved for the transfer of non-standardised information, referred to in the standard as "escape-to-proprietary". According to the invention, the non-standardised information is used solely in the following messages in the standard:

"access-rights-request", and

"locate-request", which means "request for location" and which includes an attachment request.

The first octet 701 of the field described in FIG. 6B indicates that the information elements which follow are non-standardised information to be sent within a DECT protocol message. The second octet 702 contains the information octet number to be transmitted. The third octet 703 indicates that the octets 704 and 705 contain an EMC ("Equipment Manufacturer Code") parameter, which serves to identify the manufacturer using this proprietary information. Thus, if an item of equipment whose EMC parameter is different from that indicated by the octets 704 and 705, it does not process the information which follows.

Naturally, if the present invention were to be the subject of standardisation between different manufacturers, octets 701, 704 and 705 would no longer be used in the same way.

Octet 706 represents the operational capability CO (identical to its value, in the embodiment described and depicted) of the device which acts as a mobile station. The following octets, 707 to 711, whose number is equal to the number of information octets to be transmitted (number represented by octet 702) minus four, serve to transmit more precise information on the capabilities of the device for operating as a base station. For example, the following parameters can be transmitted:

memory capacity of the device (octet 707), degree of filling of the memory of the device (octet 708), power, speed of the processor of the device (octet 709), and maximum rate supported by the device (octet 710), fixity coefficient "CF" (octet 712), energy coefficient "CE" (octet 713), network interface "IR" (octet 714).

The position bit 8 (on the left) of the information octets 707 to 710 takes one of the values:

"1", when the information element is transmitted in this message, or

"0" when the value of the following bits of the octet has no meaning (the information element is not transmitted in the message).

FIG. 7 describes how a mobile station obtains rights of access to a base station and how it terminates its rights of access. The access rights procedure enables a base station and a mobile station to exchange their respective identities and information concerning the capabilities of the mobile station. The mobile station initiates the procedure by sending, to the base station, a message "access_rights_request" which contains notably the capabilities of the mobile station in the field "terminal capability". In this field, according to the invention, use is made of the profile indicator parameter ("profile indicator") and slot type parameter ("slot type capability") (see below).

The additional information necessary for the functioning of the device according to the present invention is transmitted in the field "escape to proprietary" of the message "access_rights_request" (FIGS. 6A and 6B).

When a base station receives a message "access_rights_request", if the mobile station is authorised to access the resources of the base station, the latter returns a message "access_rights_accept", and adds, in the table of the declared mobile stations, the information concerning the mobile station which sent the message "access_rights_request".

According to the first to sixth aspects of the present invention, the information thus collected is stored in the table_SM, of the random access memory 304, organised in the following fashion:

| No | Identity | CO | CM | RM | CP | IP | TS | DM | ... |
|----|----------|----|----|----|----|----|----|----|----|
| 1  |          |    |    |    |    |    |    |    |     |
| 2  |          |    |    |    |    |    |    |    |     |
| ...|          |    |    |    |    |    |    |    |     |

When a mobile station is added to the table_SM, the following information concerning it are stored therein:

its mobile identity, its operational capability (CO), its memory capacity (CM), the degree of filling of its memory (RM), its processor capacity (CP), its profile indicator (IP), its slot type capability (TS), its maximum throughput (DM), and possibly other information characterising it.

The parameters IP and TS are read in the field "Terminal Capability" of the message "access_rights_request", whilst the parameters CO, CM, RM, CP and DM are read in the field "escape to proprietary" described in FIG. 6A. When a mobile station wishes to terminate its access rights to a base station, it sends a message 803 "access_rights_terminate_request". The base station then erases the information concerning this mobile station in its table_SM and returns a message "access_rights_terminate_accept" 804. The mobile station can then no longer use the resources of the base station.

According to the seventh and eighth aspects of the present invention, the information thus collected is stored in the table_SM, of the random access memory 304, organised in the following fashion:

| No | Identity | CO | CM | RM | CP | IP | TS | DM | CE | CF | IR |
|----|----------|----|----|----|----|----|----|----|----|----|----|
| 1  |          |    |    |    |    |    |    |    |    |    |    |
| 2  |          |    |    |    |    |    |    |    |    |    |    |
| ...|          |    |    |    |    |    |    |    |    |    |    |

When a mobile station is added to the table_SM, the following information concerning it are stored therein:

its mobile identity, its operational capability (CO), its memory capacity (CM), the degree of filling of its memory (RM), its processor capacity (CP), its profile indicator (IP), its slot type capability (TS), its maximum throughput (DM), its energy coefficient (CE), its fixity coefficient (CF), its network interface information (IR), and, optionally, other information characterising it.

The parameters IP and TS are read in the field "Terminal Capability" of the message "access_rights_request", whilst the parameters CO, CM, RM, CP, DM, CF, CE and IR are read in the field "escape to proprietary" described in FIG. 6B. When a mobile station wishes to terminate its access rights to a base station, it sends a message 803 "access_rights_terminate_request". The base station then erases the information concerning this mobile station in its table_SM and returns a message "access_rights_terminate_accept" 804. The mobile station can then no longer use the resources of the base station.

FIG. 8A illustrates how a mobile station attaches itself to or detaches itself from a base station. When a mobile station enters the cell of a base station over which the mobile station has obtained access rights, it must initiate a procedure of attachment to the base station. By this procedure, the mobile station indicates to the base station that it is ready to receive calls. To attach itself, the mobile station sends to the base station a message "Locate_request" 811 which contains information concerning notably the identity and capabilities of the communication station and the possibility of sending non-standardised information. With the message "Locate_request" 811, it is possible to transfer to the base station the same information as with the message "access_rights_request". If a mobile station has important changes to its parameters (for example memory space still available) compared with the time of the access right procedure, it can use the field "escape to proprietary" as defined in FIGS. 6A and 6B, to inform the base station thereof.

When a base station receives a message "Locate_request" 811, it verifies that the mobile station is identified in its "table_SM and, in the affirmative, returns a message "Locate_accept" 812. The base station then uses the information contained in its "table_SM", the table of the declared mobile stations, in order to insert the mobile station under consideration in the appropriate list, List_SM_auto, if its operational capability CO is equal to SB/SM_auto, List_SM manual if its operational capability CO is equal to SB/SM_manual or List_SM_direct if its operational capability is equal to SM/SM_direct.

The reverse procedure to attachment is detachment. When a mobile station leaves the cell or is switched off, it sends a message "detach" 813 to the base station, which then withdraws the mobile station from the list corresponding to its operational capability.

However, the detachment procedure may not always be initiated by the mobile station which leaves the cell (because of breakdown or excessive speed for example). The last part, in FIG. 8B, illustrates how the base station can periodically check on the validity of the information which it is keeping in the list stored in its random access memory 304.

The base station then periodically sends a request for a procedure of updating its location (or its attachment), by means of a message "MM_info_suggest" 821, whose field "info_type" is equal to "locate_suggest". The procedure of updating the location of a mobile station is identical to the attachment procedure, the messages 822 and 823 being respectively identical to the messages 811 and 812.

By virtue of the provisions illustrated in FIGS. 7, 8A and 8B, the list list_SM_auto contains all the mobile stations present in the cell and having the capability of switching automatically between base station mode and mobile station mode.

As explained with regard to FIG. 23, the list_SM_auto is classified according to the decreasing capability of the mobile stations of becoming a base station: the first element in the list concerns the mobile station which has the best capability of becoming a base station. In order to classify this list, after each attachment, detachment or updating procedure, the base station takes into account all the parameters stored in the table_SM_auto (CM, RM, CP, IP, TS, DM, . . . according to the first to sixth aspects of the invention; CM, RM, CP, IP, TS, DM, CF, CE, IR, . . . according to the seventh and eighth aspects of the invention).

The list_SM_manual is sorted in the same way as the list_SM_auto. These lists can be used in the following situations:
the base station becomes inactive following a powering down or a switching into mobile station mode and it seeks a replacement base station amongst the mobile stations having a capability of becoming a base station,
the base station is excessively used (memory full, number of simultaneous communications greater than a predetermined value) and it seeks a second base station for taking over some of the traffic.

The base station then chooses the first mobile station in the list_SM_auto. If the list_SM_auto is empty, or if none of the stations in the list list_SM_auto is suitable, the base station can have recourse to the first mobile station represented in the list_SM_manual. It must then transmit a message which triggers the display or sending of a signal to the mobile station chosen in order to warn the user that a change of functioning mode at the mobile station under consideration is required.

The base station uses the list_SM_direct so that the communications internal to the cell each involving at least one station represented in this list are directly organised by this station.

Figure 9:
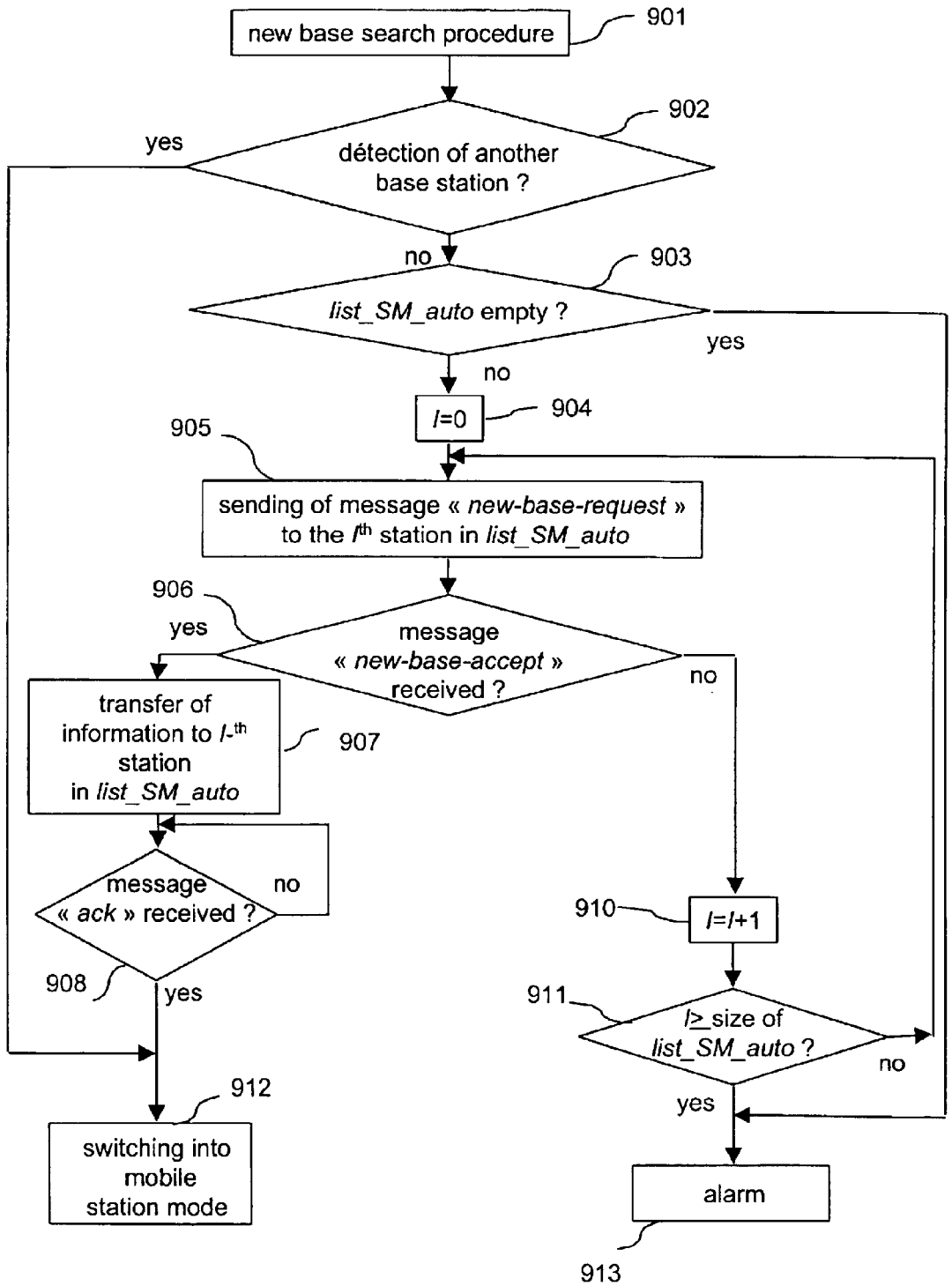
Figure 10:
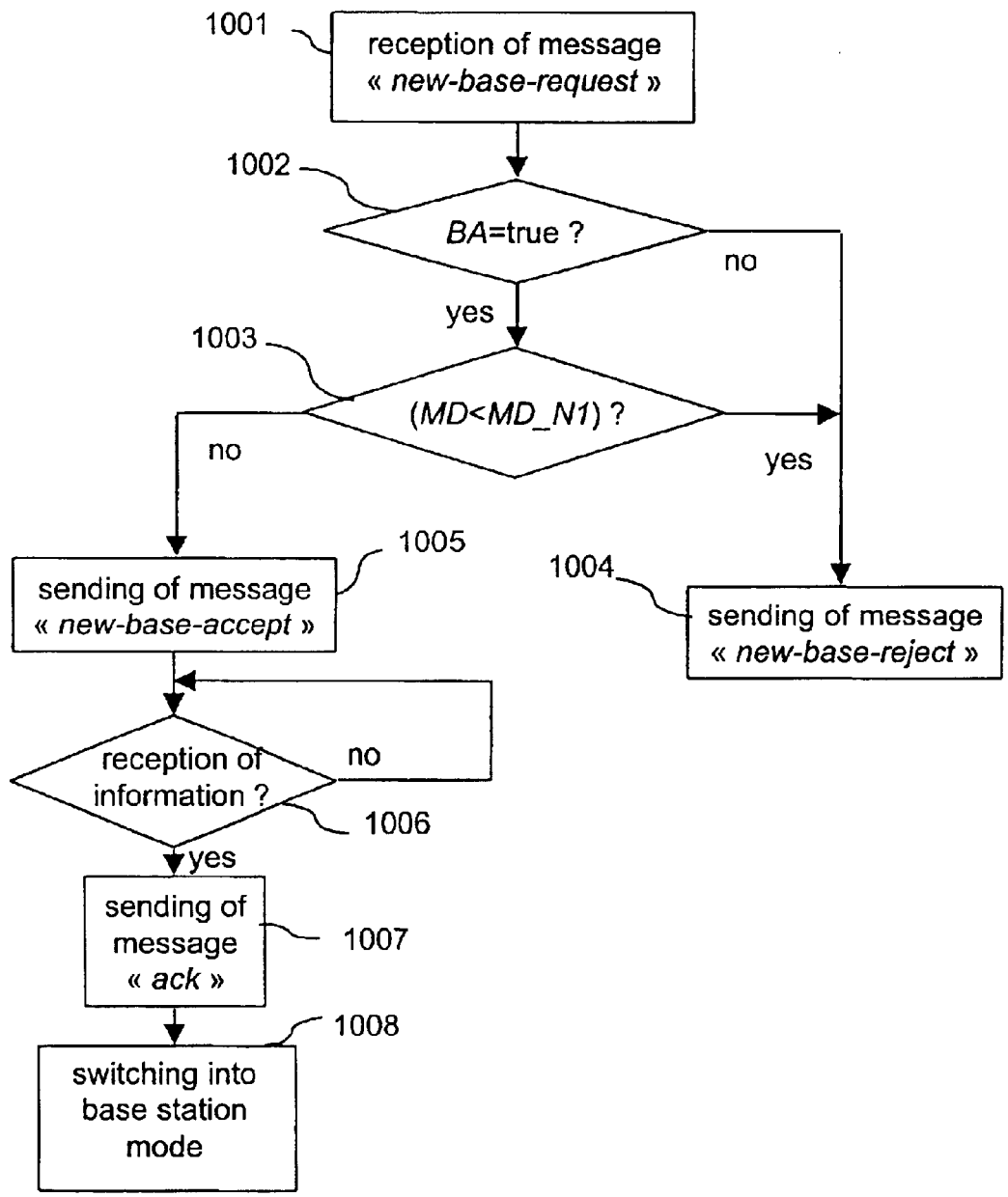

FIGS. 9 and 10 illustrate how a base station in activity (referred to as "initial") finds a replacement base station (referred to as "final"), for example when the initial base station can no longer fulfil its role as base station (switching off or automatic or manual switching to mobile station mode).

The procedure described in FIG. 9 can be implemented only when there is no active connection. In addition, any new connection request is refused during this procedure.

As illustrated in FIG. 9, the initial base station commences with a test 902 during which it determines whether or not another base station is present (as illustrated in FIG. 1). When the result of the test 902 is positive, the procedure is complete, with success, since the mobile stations which communicate with the initial base station will be able to replace the latter for their communications and the initial base station changes functioning mode and becomes a mobile station, operation 912.

When the result of test 902 is negative, during a test 903, the initial base station determines whether or not the list_SM_auto is empty. When the result of test 903 is positive, the procedure is ended, having failed, since no mobile station can take the role of base station. The user is then informed that, if the base station ceases its activity, all the communications will be suspended, operation 913.

When the result of test 903 is negative, during an operation 904, the variable l is initialised to the value "0". Then, during an operation 905, the initial base station sends a message "new_base_request" to the $l^{th}$ mobile station in the list_SM_auto. During operation 905, the initial base station waits for a sufficient period of time to enable a mobile station in accordance with the device which is the object of the present invention to reply, before performing a test 906. Next, during this test 906, the initial base station determines whether or not it has received, from the mobile station under consideration, a message "new_base_accept".

When the result of test 906 is positive, during an operation 907, the information stored in the table table_SM, and in the lists list_SM_auto, list_SM_manual and list_SM_direct, are transferred into the random access memory of the mobile station under consideration. Next, during a test 908, the initial base station determines whether or not it has received, from the mobile station under consideration, a data transfer acknowledgement message. When the result of test 908 is negative, it is reiterated. When the result of test 908 is positive, the initial base station changes operating mode, operation 912, and the base station change operation is ended, on the initial base station side, with success.

When the result of test 906 is negative; the initial base station considers that the allocation of the base station role has been refused by the $l^{th}$ station in the list list_SM_auto. Then, during an operation 910, the value of the variable l is incremented by 1. Then, during a test 911, the initial base station determines whether or not the value of the variable l is greater than or equal to the number of mobile stations represented in the list_SM_auto.

When the result of test 911 is negative, operation 905 is reiterated. When the result of test 911 is positive, the base station change procedure is ended, having failed, and the user is warned that the cessation of the activity of the initial base station will cause the suspension of all the communications, operation 913.

According to a variant, not shown, when, during test 911, it is determined that the list list_SM_auto has been entirely run through, the operations and tests 905 to 912 are reiterated, running through the list list_SM_manual. Operation 912 is then performed only after the mobile station which sent the message "new-base-accept" (test 906) has sent a message confirming change in functioning mode.

When the procedure has been ended with success, by the detection of another base station during test 902 or by the acknowledgment of an information transfer by a mobile station during a test 908, the base station has thus changed operating mode and has become a mobile station, unless the procedure illustrated in FIG. 9 has been brought about by a switching off of the initial base station, in which case the latter ceases its activity.

FIG. 10 illustrates the procedure of changing base station on the part of a mobile station, when, during a test 1001, it determines that a message "new_base_request" has been received from the base station and is intended for the mobile station under consideration. Next, during a test 1002, the mobile station determines whether or not its operating capability CO has one of the values SB/SM_auto or SB/SM_manual, determining whether or not the value of the information "BA" is "true". When the result of test 1002 is negative, during an operation 1004, a message "new_base_reject" is sent by the mobile station under consideration to the base station in order to indicate to it that the allocation of the base station role has been refused. Then the procedure is ended, without the mobile station having switched into base station functioning mode.

When the result of test 1002 is positive, during a test 1003, the mobile station determines whether its available memory capacity MD is strictly less than the value MD_N1 stored in the read-only memory 305. This value MD_N1 corresponds in fact to a minimum available memory capacity for taking the base station role.

When the result of test 1003 is positive, operation 1004 is performed. When the result of test 1003 is negative, during an operation 1005, the mobile station sends a message accepting the role of base station "new_base_accept", to the initial base station. Then, during a test 1006, the mobile station determines whether it has received, from the initial base station, the necessary information for taking the base station role, that is to say all the information stored in the lists list_SM_auto, list_SM_manual and list_SM_direct, and in the table table_SM.

When the result of test 1006 is negative, it is reiterated. When the result of test 1006 is positive, during an operation 1007, the mobile station sends, to the base station, an acknowledgement of receipt of the information. Then, during an operation 1008, the mobile station changes functioning mode and becomes a base station. The procedure is then ended.

Where the mobile station has an operating code value SB/SM_manual, the test 1003 is supplemented by:
- a triggering of a warning signal intended to warn the user that he must manually switch the operating mode of the communication station concerned,
- a wait for a sufficient period for the user to have the time to effect the manual switching, and
- a test of change of operating mode by the user (not shown) and, where the user has not effected the change in operating mode during a predetermined period which follows the test 1003, operation 1004 is performed.

It will be noted that, in accordance with the functioning mode illustrated in FIGS. 9 and 10, the initial base station uses static criteria, that is to say which do not immediately change value according to the change in the network or mobile stations, in order to choose a replacement base station, whilst the mobile station envisaged as the future base station can accept or refuse the role of new base station, using dynamic criteria, that is to say taking into account immediately any change in the state of the mobile station which would prevent its activity as a base station.

FIGS. 11 and 12 illustrate how, at the initiative of a station which is initially a mobile station, a change in base station can be effected. For example, when such a mobile station has locked onto the initial base station, following its being powered up, and when this mobile station is a candidate for being a base station (for example because it supports all the variants and the most extensive modes of the DECT standard), a test 1101 is positive. Otherwise, this procedure is ended. When the result of test 1101 is positive, during an operation 1102, the mobile station listens to the channel known, in the DECT standard, under the name of "Q". On this channel, in fact, the initial base station regularly broadcasts information which may be useful to mobile stations and, in particular, information concerning the DECT profiles which it supports.

Next, during a test 1103, the mobile station determines whether or not it has better capabilities of being a base station than the initial base station. When the result of test 1103 is negative, the procedure is ended. When the result of test 1103 is positive, during an operation 1104, the mobile station sends a message "chg_base_request", which means change in base required, to the initial base station, and then allows a sufficient period to pass for the base station to be able, if it is in accordance with the communication device of the present invention, to send a message in answer.

Then, during a test 1105, the mobile station determines whether or not it has received, in return, from the base station, a message "chg_base_accept", which means acceptance of change in base. When the result of test 1105 is negative, the mobile station considers that it has received a refusal to change base on the part of the initial base station, and the base change procedure is ended.

When the result of test 1105 is positive, the operations 1106, 1107 and 1108 are respectively identical to operations 1006, 1007 and 1008. Then the base station change procedure is ended.

On the initial base station side, when, during a test 1201, it determines that it has received a message "chg_base_request", from a mobile station which is locked, it performs a test 1202 during which it determines whether or not, both at the same time, the information "BA" representing its communication capability is equal to "true" and its operating mode MO corresponds to that of a base station.

When the result of test 1202 is negative, during an operation 1203, the initial base station sends, to the mobile station under consideration, a message "chg_base_reject". Then the procedure is ended. When the result of test 1202 is positive, during an operation 1204, the initial base station sends, to the mobile station under consideration, a message "chg_base_accept". Then, during a test 1205, the initial base station determines whether or not there is an active connection.

When the result of test 1205 is positive, it is reiterated. When the result of test 1205 is negative, during an operation 1206, the base station sends, to the mobile station under consideration, the information stored in the table table_SM, and in the lists list_SM_auto, list_SM_manual and list_SM_direct.

Next, during a test 1207, the initial base station determines whether or not it has received, from the mobile station under consideration, a message acknowledging the data transfer. When the result of test 1207 is negative, it is reiterated. When the result of test 1207 is positive, during an operation 1208, the initial base station changes operating mode and starts to function in mobile station mode, and the operation of changing base station is ended with success.

FIG. 13 depicts:

in the form of messages 1301 to 1304, the messages exchanged between the initial base station, on the left, and the mobile station which will become a base station, on the right, in the context of the procedure illustrated in FIGS. 9 and 10, and in the form of messages 1305 and 1306, the messages exchanged between a mobile station, on the left, and the base station, in the context of the procedure illustrated in FIGS. 11 and 12.

In order to collect information concerning the capability of the mobile stations present in the network of operating in base station mode, the base station according to the present invention uses a message of the broadcast type illustrated in FIG. 14A. The base station thus interrogates all the mobile stations in order to obtain the following information:

a list of the mobile stations which can switch automatically into base station mode, this same list sorted according to one or more parameters chosen by the base station, the identity of the mobile station which has the best overall capability of operating in base station mode, at a given instant, the identity of the mobile station which has the best capability of operating in base station mode, according to one or more criteria fixed by the base station.

A first type of message 1401 (in FIG. 14A) is a request from the base station broadcast to all the mobile stations, which includes the following fields:

a message code field 1402 "broadcast_SB_req", which means approximately "request broadcast by the base", a type field 1403 CT, defining the type of request concerned, a length field 1404 CL, which defines the number of parameters in the request, and parameter fields 1405 CP(0) to 1406 CP(CL-1), which contain the criteria with respect to which the answer is awaited.

The type field 1403 CT and length field 1404 CL can take different values, making it possible to specify to the different mobile stations how to respond to the request and according to which criteria, the latter being specified by the fields 1405 to 1406.

When the information transmitted in the field 1403 CT is equal to "0", each mobile station must without delay send its capability of acting as a base station and, if the value contained in the field 1404 CL is non-nil, each mobile station must return the value of the parameters specified in the request.

When the information transmitted in the field 1403 CT is equal to "1", each mobile station must send its capability of acting as a base station after a period whose value represents the value of the capability of the mobile station of becoming a base station, and, if the value contained in the field 1404 CL is non-nil, each mobile station must return the value of the parameters specified in the request.

The measurement of the capability of the mobile station of becoming a base station is determined in accordance with the answer time described below.

According to the first to sixth aspects of the invention, the parameters represented by the fields 1405 to 1406 include:

the operational capability CO, the available memory capacity, the DECT profiles supported, the DECT slot type supported (single, double or half-slot), and the computing capacity of the central unit.

According to the seventh and eighth aspects of the invention, the parameters represented by the fields 1405 to 1406 include:

the operational capability CO, the available memory capacity CM, its energy coefficient CE, its fixity coefficient CF, its network interface information IR, the DECT profiles supported, the DECT slot type supported (single, double or half-slot), and the computing capacity of the central unit.

The message 1411 "broadcast_SB_ans" (in FIG. 14B), which means approximately "answer to the message broadcast by the base station", concerns the answer of the different mobile stations to the base station. This message 1411 is sent using the oriented connection mode. It includes the following fields:

a message code field 1412, an identity field 1413, in which the mobile station specifies its identity, an answer field 1414 CR, stating the answer of the mobile station, a length field 1415 CL', representing the number of data in the answer, data fields 1416 to 1417, containing the data required by the base station.

The answer field 1414 CR can take the following values:

"accept" ("acceptance"), meaning that the communication station has the capability of acting as a base station, the data fields, if the field length 415 indicates a non-nil length, then give information concerning the parameters required by the base station, "reject" ("refusal"), meaning that, momentarily, the mobile station cannot act as a base station or does not have information relating to the parameters required by the base station. The data fields, if the field length 1415 indicates a non-nil length, can then give an explanation for the rejection.

An absence of answer to the message 1401, on the part of a mobile station, is considered to be an answer whose answer field CR would be "reject", when a predetermined period of time has elapsed.

By default, if in the message 1401 the operational capability is not required, only the mobile stations having the capability of switching automatically from one functioning mode to another can respond by means of a message 1411.

FIG. 15 represents an exchange of messages between the base station and each mobile station having the capability of becoming a base station. The message 1401 is broadcast by the base station at regular time slots, for example every minute.

In FIG. 15, the message 1401A is a message 1401 of the type without delay (CT=0) and the length field CL is also equal to "0". Each of the mobile stations according to the present invention then answers by return (that is to say without waiting), in the form of messages 1411A, 1411B or 1411C. In the example described the mobile stations 204, 205 and 201 answer, the first two with an answer field CR of the "accept" type and the last with an answer field CR of the "reject" type.

In order to determine the answer field, each mobile station according to the present invention determines whether or not its operating code is one of the codes "SB/SM_auto" or "SB/SM_manual", and, in the affirmative, whether its available memory capacity is greater than the predetermined value MD_N1.

In FIG. 16, the broadcast message 1401B is a message 1401 of the type with delay (CT=1) and with parameters (CL=1), the only parameter adopted being the operational capability. The mobile stations which have a capability of functioning as a base station answer whilst waiting for a period of time which is a function of the value of their operational capability: the first mobile stations which answer have an operational capability equal to "SB/SM_auto" (message 1411D and 1411E), whilst the last mobile station which responds has an operational capability equal to "SB/SM_manual" (message 1411F).

In general terms, in the embodiment of the first to sixth aspects of the present invention, the period of waiting before the answer is determined as from the instant of receiving the message 1401B. This period takes the value:

$$T_{answer} = CCO.t_{CO} + CPR.t_{CPR} + CMD.t_{CMD},$$

a formula in which:
  CCO is the operational capability coefficient (which is equal to "0" if the operational capability is "SB/SM_auto", "5" if the operational capability is "SB/SM_manual", "5" if the operational capability is "SM/SM_direct" and infinity if the operational capability is equal to "SM"),
  CPR is the supported profiles coefficient (which is equal to "0" if the profiles supported are B, MMAP and GAP, "1" if the profiles supported are A and GAP and "2" if the only profile supported is GAP),
  CMD is the available memory coefficient,
  $t_{CCO}$ is the period allocated to the operational capability coefficient,
  $t_{CPR}$ is the period allocated to the supported profile coefficient,
  $t_{CMD}$ is the period allocated to the available memory coefficient.

For example the above three periods are equal to 10 milliseconds (the period of a DECT frame for the answer period always to be a multiple of the period of a DECT frame).

In general terms, in the embodiment of the seventh and eighth aspects of the present invention, the period of waiting before the answer is determined as from the instant of receiving the message 1401B. This period takes the value:

$$T_{answer} = CCO.t_{CO} + CPR.t_{CPR} + CND.t_{CMD} + CE.t_{CE} + CF.t_{CF} + CIR.t_{CIR},$$

a formula in which:
  CCO is the operational capability coefficient (which is equal to "0" if the operational capability is "SB/SM_auto", "5" if the operational capability is "SB/SM_manual", "5" if the operational capability is "SM/SM_direct" and infinity if the operational capability is equal to "SM"),
  CPR is the supported profiles coefficient (which is equal to "0" if the profiles supported are B, MMAP and GAP, "1" if the profiles supported are A and GAP and "2" if the only profile supported is GAP),
  CMD is the available memory coefficient,
  $t_{CCO}$ is the period allocated to the operational capability coefficient,
  $t_{CPR}$ is the period allocated to the supported profile coefficient,
  $t_{CMD}$ is the period allocated to the available memory coefficient,
  $t_{CE}$ is the period allocated to the energy coefficient,
  $t_{CF}$ is the period allocated to the fixity coefficient,
  $t_{CIR}$ is the period allocated to the network interface coefficient.

For example the above six periods are equal to 10 milliseconds (the period of a DECT frame for which the answer period is always a multiple of the period of a DECT frame).

In FIG. 16, the formula for calculating the answer time is limited to $$T_{answer} = CCO.t_{CO},$$

since the only parameter represented in the message 1601 is the operational capability parameter.

FIG. 17 shows that the messages are transmitted according to a predetermined timing. Each communication cycle 1701, 1702 or 1703 lasts 10 milliseconds and is divided into twelve equal time slots. For a communication, one or more time slots for each cycle are allocated in a fixed manner.

FIG. 18A depicts the state of the art for establishing a connection internal to a cell. FIG. 18A shows the route of an internal communication between a mobile station 1802 and a mobile station 1803. This communication passes through a base station 1801. The information which pass at time t over the link between the mobile station 1802 and the base station 1801 next passes over the link between the base station 1801 and the mobile station 1803. There is therefore a duplication of the information and a dual occupation of the communication medium of the cell for two transmissions of the same information.

This dual occupation of the communication medium is not critical when the information transmitted is voice information. In the case of a data communication, the duplication of the links, of the information and of the occupation of the communication medium may saturate the cell and block a request for connection to the outside of the cell.

In FIGS. 18B and 18C, the functioning of the device which is the object of the present invention can be seen, a functioning intended to avoid such a duplication.

In this functioning:
  when at least one of the mobile stations which is to communicate, referenced 1805 and 1806, is capable of functioning in base station mode, or when the mobile stations 1805 and 1806 are both capable of communicating direct, the cell is organised so that communication between the two mobile stations is direct, without passing through another station,
  and, in the contrary case, a mobile station 1810 capable of functioning as a base station takes this role vis-à-vis the two mobile stations 1805 and 1806 which are to communicate and constitutes with them a new cell, in order to release the initial base station 1804 from the traffic concerning communication between the mobile stations 1805 and 1806.

FIG. 19 shows, in the form of a flow diagram, how the creation of a new cell is implemented or the mobile stations are put in direct communication.

When, during an operation 1901, the base station 1804 receives a call request internal to the cell, from a mobile station 1806 and intended for a mobile station 1805, it performs a test 1902 during which it determines:

whether the connection requested requires a number of slots greater than a predetermined value (for example four slots, a value beyond which the communication is necessarily other than a voice communication), or whether the number of slots necessary is greater than the number of slots available.

When the result of test 1902 is negative, during an operation 1903, the connection between the mobile stations 1805 and 1806 is established by means of the base station, in a fashion known in the state of the art prior to the present invention.

When the result of test 1902 is positive, during a test 1904, the base station determines whether or not at least one of the mobile stations 1805 or 1806 has a current connection.

When the result of test 1904 is positive, operation 1903 is performed. When the result of test 1904 is negative, during a test 1905, the base station determines whether or not the mobile stations 1805 and 1806 are both in the list SM_direct. When the result of test 1905 is positive, during an operation 1906, the base station sends, to each of the mobile stations 1805 and 1806, a message "switch-mode-request" in order to indicate to them to switch into direct communication mode, and to indicate to them the identity of the mobile station which constitutes their interlocutor (see FIG. 21B).

In the event of failure of the implementation of the direct communication between the mobile stations 1805 and 1806 (for example if one of the mobile stations rejects the switching into direct communication mode), a test 1907 is performed (see below).

In the event of success in putting the mobile stations 1805 and 1806 in direct communication, at the end of their direct communication, the two mobile stations synchronise themselves once again with the base station 1804.

When the result of test 1905 is negative, during a test 1907, the base station 1804 determines whether or not the mobile station 1805 is in the list_SM_auto. When the result of test 1907 is positive, during an operation 1908, the base station 1804 sends to the mobile station 1805 a message "switch-mode-request" 2101 (FIG. 21A) in order to indicate to it that it should switch into base station mode and sends it the identity of the mobile station 1806 so that the mobile station 1805 allocates access rights to it.

In addition, on reception of a message "switch-mode-accept" 2102 from the mobile station 1805, the base station 1804 sends to the mobile station 1806 a message "switch-base-request" 2103 containing the identity of the base station 1805, in order to indicate to the mobile station 1806 that it should synchronise itself with the new base station 1805 (see FIG. 21A).

In the event of failure of the switching of the mobile station 1805 into base station mode (for example if it rejects the switching), a test 1909 is performed (see below).

When the result of test 1907 is negative, during a test 1909, the base station 1804 determines whether or not the mobile station 1806 is in the list_SM_auto. When the result of test 1909 is positive, during an operation 1910, the base station 1804 sends to the mobile station 1806 a message switch-mode-request" 2101 in order to indicate to it that it should switch into base station mode and sends it the identity of the mobile station 1805 so that the mobile station 1806 allocates access rights to it.

In addition, on reception of a message "switch-mode-accept" 2102 from the mobile station 1806, the base station 1804 sends to the mobile station 1805 a message "switch-base-request" 2103 containing the identity of the base station 1806, in order to indicate to the mobile station 1805 that it should synchronise itself with the new base station 1806.

It will be seen, with regard to FIG. 21A, that, for the one of the mobile stations which switches into base station mode, as soon as the data communication 2104 between the stations 1805 and 1806 is ended, it returns to mobile station mode after having sent a message "switch-base-request" 2105 to the mobile station with which it was communicating data. The mobile station which receives this message 2105 then synchronises itself once again with the base station 1804.

In the event of failure of the switching of the mobile station 1806 into base station mode (for example if it rejects the switching), an operation 1911 is performed (see below).

When the result of test 1909 is negative, during an operation 1911 (FIG. 20), the base station determines whether or not the number of slots which remain available is strictly less than the number of slots necessary for the requested communication.

When the result of test 1911 is negative, operation 1903 is performed. When the result of test 1911 is positive, during an operation 1912, the temporary variable k is initialised to the value "0". Then, during a test 1913, the base station determines whether or not the value of the variable k is strictly less than the size of the list list_SM_auto. When the result of test 1913 is negative, operation 1903 is performed. It should be noted here that the performance of operation 1903 does not guarantee the setting up of the communication, rejection procedures being provided, in accordance with the known state of the an. When the result of test 1913 is positive, during a test 1914, the base station determines whether or not the $k^{th}$ station in the list list_SM_auto has a current connection.

When the result of test 1914 is positive, during an operation 1915, the value of the variable k is incremented by 1. Then test 1913 is reiterated. When the result of test 1914 is negative, during an operation 1916, the base station 1804 sends, to the mobile station identified at the $k^{th}$ position in the list list_SM_auto, here the mobile station 1810, a message "switch-mode-request", and then, if the mobile station under consideration 1810 agrees to take the role of the new base station, the initial base station 1804 sends, to each of the mobile stations 1805 and 1806, a message "switch-base-request", indicating the identity of the new base station 1810 so that each of the mobile stations 1805 and 1806 synchronises itself with the new base station 1810 (see FIG. 22).

At the end of the communication between the mobile stations 1805 and 1806, the new base station 1810 once again switches into mobile station functioning mode.

If, on reception of the message "switch-mode-request", the mobile station 1810 refuses to change communication mode, by sending a message "switch-mode-reject", or by not responding to the message "switch-mode-request", operation 1915 is performed by the base station 1804.

According to a variant, not shown, when the result of test 1913 is negative, the part of the flow diagram illustrated in FIGS. 19 and 20, starting from test 1907, is once again implemented, but considering the list "list_SM_manual" in place of the list "list_SM_auto".

In FIG. 21A it can be seen that, for the mobile station 1805 to switch into base station mode and for the mobile station 1806 to attach itself to the base station 1805, the initial base station 1804 sends first of all, to the mobile station 1805, a message "switch-mode-request" 2101 and awaits in return a message "switch-mode-accept" 2102. Then the initial base station 1804 sends, to the mobile station 1806, a message "switch-base-request" 2103, and awaits in return a message "switch-base-accept" 2106.

When the communication between the stations 1805 and 1806 is ended, the message "switch-base-request" 2105 is followed in return by a message "switch-base-accept" 2107.

In FIG. 21B it can be seen that, to establish direct communication between the mobile stations 1805 and 1806, during operation 1906, the base station 1804 first of all sends, to one of the mobile stations involved in the communication to be set up (for example the station 1805), a message 2111 "switch-mode-request", indicating the requested communication mode (direct communication mode) and indicating the identity of the other mobile station. On reception of a message "switch-mode-accept" 2112 from the mobile station (station 1805 in our example) for which the message "switch-mode-request" 2111 was intended, the base station 1804 sends, to the other mobile station involved in the communication (station 1806 in our example), a message "switch-mode-request" 2113 indicating the requested communication mode (direct communication mode) and indicating the identity of the other mobile station. On reception of a message "switch-mode-accept" 2114 from the mobile station (station 1806 in our example) for which the message "switch-mode-request" 2113 was intended, the two mobile stations switch into direct communication mode. At the end of the communication, the station 1805 sends, to the station 1806, a message "switch-mode-request" 2116 and receives in return a message "switch-mode-accept" 2117, and the two stations 1805 and 1806 then switch into mobile station mode.

In FIG. 22, it can be seen that, to establish a communication between the mobile stations 1805 and 1806 by means of a new base station 1810, during operation 1916, the base station 1804 first of all sends, to the mobile station 1810, a message "switch-mode-request" 2201 indicating the required communication mode, base station mode, and the two mobile stations 1805 and 1806 to which access rights are to be opened. On reception, from the mobile station 1810, of a message "switch-mode-accept" 2202, the base station 1804 sends, to the mobile station 1806, a message "switch-base-request" 2203.

On reception of a message "switch-base-accept" 2208 in return, the base station 1804 sends, to the mobile station 1805, a message "switch-base-request" 2204. Each of the messages 2203 and 2204 indicates, to each of the mobile stations, that the new base station which concerns them is station 1810.

After the mobile station 1805 has sent a message "switch-base-accept" 2209 to the base station 1804, mobile stations 1805 and 1806 attach themselves to the new base station 1810.

By means of communications 2205 and 2206, the mobile stations 1806 and 1805 then communicate data to each other, through the new base station 1810. At the end of the communication of the data, the new base station 1810 sends, to the mobile station 1806, a message "switch-base-request" 2207 and, to the mobile station 1805, a message "switch-base-request" 2208, indicating to each of the mobile stations that the new base station is the station 1804.

On reception, in return, of messages "switch-base-accept" 2210 and 2211, from the mobile stations 1805 and 1806, the base station 1810 switches into mobile station mode.

FIG. 23 describes a flow diagram for classifying mobile stations having a capability of switching automatically into base station mode, as a function of criteria defining this capability of becoming a base station.

Naturally, a similar procedure can be followed to classify the list of mobile stations having a capability of switching manually into base station mode.

The procedure illustrated in FIG. 23 is executed by a base station when a new mobile station (hereinafter designated SMk) joins itself to a cell and sends a message illustrated in FIGS. 6A and 6B.

When this event occurs, during an operation 3201, the controller 306 of the base station effects an initialisation of the temporary variable l to the value "0". Then, during a test 3202, the controller 306 determines whether or not the value of the temporary variable l is greater than or equal to the size of the list list_SM_auto. When the result of test 3202 is positive, during an operation 3207, the identity of the mobile station SMk is inserted at position l in the list list_SM_auto, and the classification procedure is terminated.

When the result of test 3202 is negative, during a test 3203, the controller 306 determines whether or not the maximum transmission rate of the station SMk is strictly greater than the maximum rate of the $l^{th}$ station of the list list_SM_auto.

When the result of test 3203 is positive, operation 3207 is performed. When the result of test 3203 is negative, during a test 3204, the controller 306 determines whether or not the maximum transmission rate of the station SMk is strictly less than the maximum rate of the $l^{th}$ station in the list list_SM_auto.

When the result of test 3204 is positive, during an operation 3208, the value of the temporary variable l is incremented by 1 and test 3202 is reiterated. When the result of test 3204 is negative, during a test 3205, the controller 306 determines whether or not the memory capacity of the station SMk is strictly greater than the memory capacity of the $l^{th}$ station in the list list_SM_auto.

When the result of test 3205 is positive, operation 3207 is performed. When the result of test 3205 is negative, during a test 3206, the controller 306 determines whether or not the memory capacity of the station SMk is strictly less than the memory capacity of the $l^{th}$ station in the list list_SM_auto.

When the result of test 3206 is positive, operation 3208 is performed. When the result of test 3206 is negative, a new parameter for the capability of becoming a base station is considered and tests similar to tests 3203 and 3204, or 3205 and 3206, are performed, considering this new parameter in place of the maximum transmission rate (tests 3203 and 3204) or memory capacity (tests 3205 and 3206). Naturally, the parameters tested are tested in decreasing order of importance. When the last parameter has been considered with once again a negative result for the two tests concerning it, operation 3207 is performed.

It will now be described how, when a station has determined that it has better capabilities of being a base station than the current station, it sends to it a message "chg-base-request", which includes information representing its fixity coefficient CF, its energy coefficient CE and its network interface coefficient CIR.

On reception of this message the initial base station then successively compares these coefficients, in decreasing order of their importance (the communication coefficient is of greater importance than the fixity coefficient, itself of greater importance than the energy coefficient): for each coefficient successively processed:

if the initial base station has a better coefficient than the mobile station, it rejects the change in base, by means of a message "chg-base-reject", if the initial base station has a lesser coefficient than the mobile station, it accepts the change in base, by means of a message "chg-base-accept", and in the latter case (equality for the coefficient under consideration) it goes to the following coefficient.

When all the coefficients have been processed, the base station returns an acceptance of change in base, in the form of a message "chg-base-accept".

For implementing this procedure, the mobile station follows the 1 flow diagram illustrated in FIG. 11, only operation 1104 being modified in order to transmit, in the message "chg-base-request", information representing the coefficients CF, CE and CIR.

The base station then performs the operations illustrated in FIG. 25. First of all, during an operation 2501, the base station receives a message "chg-base-request". Next, during a test 2502, the base station determines whether or not its operating mode is the base station mode (MO=SB) and at the same time it has the capability of changing functioning mode (BA=true). When the result of test 2502 is negative, the controller 306 of the base station performs an operation 2505, during which it sends a message "chg-base-reject" to the mobile station which sent the message "chg-base-request". The procedure is then ended (on a failure).

When the result of test 2502 is positive, during a test 2503, the controller 306 determines whether or not the coefficient CIR received is nil. When the result of test 2503 is positive, during a test 2512, the controller 306 determines whether or not the coefficient CIR stored in the read-only memory 305 is nil. When the result of test 2512 is negative, operation 2505 is performed. When the result of test 2512 is positive, during a test 2504, the controller 306 determines whether or not the coefficient CF received is less than or equal to the coefficient CF stored in the read-only memory 305 and at the same time the coefficient CE received is less than or equal to the coefficient CE stored in the read-only memory 305.

When the result of test 2504 is positive, operation 2505 is performed. When the result of test 2504 is negative, an operation 2507, described below, is performed.

When the result of test 2503 is negative, during a test 2506, the controller 306 determines whether or not the coefficient CIR received is different from the coefficient CIR stored in the read-only memory and at the same time the coefficient CIR stored in the read-only memory is different from "2".

When the result of test 2506 is negative, test 2504 is performed. When the result of test 2506 is positive, during operation 2507, the initial base station sends, to the mobile station which sent the message "chg-base-request", a message "chg-base-accept". Next, during a test 2508, the controller 306 determines whether or not the coefficient CIR stored in the read-only memory is nil.

When the result of test 2508 is negative, the procedure is completed and the initial base station remains in base station mode. When the result of test 2508 is positive, during a test 2509, the controller 306 determines whether or not a connection is active. When the result of test 2509 is positive, it is reiterated. When the result of test 2509 is negative, during an operation 2510, the initial base station switches into mobile station mode.

Where the communication station is combined with an access to an external network, the device illustrated in FIG. 3B also has:

an external communication means 314 accessing an external line 315 of an external network, and
a line controller 313.

The line controller 313 is adapted to detect the taking of the external line 315 by the external communication means 314.

In this case, it functions by implementing the flow diagram illustrated in FIG. 26. It will be seen there that initially such a device functions in base station mode, operation 2601. It then performs a test 2602, during which it determines whether or not the external line is taken, using the line controller 313.

When the result of test 2602 is negative, it is reiterated. When the result of test 2602 is positive, during a test 2603, it determines whether or not access to the external line is effected by a mobile station. When the result of test 2603 is positive, test 2602 is reiterated. When the result of test 2603 is negative, during an operation 2604, the controller 306 causes the operating mode to switch into mobile station mode. Then, during a test 2605, the controller 306 determines whether or not the external line is busy, using the line controller 313. When the result of test 2605 is negative, it is reiterated. When the result of test 2605 is positive, during an operation 2606, the operating mode is switched into base station mode.

The procedure followed by the base station for requesting a new base station when its communication quality is too low, is illustrated in FIG. 27.

The station under consideration operating in base station mode, operation 2301, its controller 306 performs a test 2302 during which it determines whether or not:

the quantity of energy NB available is less than the quantity NB_min, or the quality of the radio signal QR is less than the value QR_min.

When the result of test 2302 is negative, during an operation 2310, the controller 306 waits for a time T7, and then the test 2302 is reiterated. When the result of test 2302 is positive, during an operation 2303, the controller 306 performs a procedure of seeking a new base station.

Following the operation 2303, during a test 2304, the controller 306 determines whether or not a new base station has been found. When the result of test 2304 is positive, during an operation 2305, the value DB is set to the value "1" and then, during an operation 2306, the operating mode of the base station under consideration is switched into mobile station mode.

When the result of test 2304 is negative, during a test 2307, the controller 306 determines whether or not the quantity of available energy NB is less than the value NB_min.

When the result of test 2307 is positive, operation 2306 is performed. When the result of test 2307 is negative, during an operation 2309, the central unit waits for a time T8, and then test 2302 is reiterated.

Naturally, the procedure illustrated in FIG. 27 can be followed only when no connection is active. Otherwise it is necessary to add a connection deactivation operation, before operation 2306.

For a mobile station (see FIG. 28), when it receives a message "new-base-request" which designates it, operation 2801, its controller 306 performs first of all a test 2802, during which it determines whether or not on the one hand the quantity of energy NB available is greater than the quantity NB_max and on the other hand, at the same time, the quality of the radio signal QR is higher than the value QR_max.

When the result of test 2802 is negative, during an operation 2807, the controller 306 sends a message "new-base-reject" to the base station, and thus ends the procedure of changing its operating mode. When the result of test 2802 is positive, during an operation 2803, the central unit 306 sends, to the base station, a message "new-base-accept".

Following operation 2803, the controller 306 determines, during a test 2804, whether or not it has received the information necessary for its functioning in base station mode.

When the result of test 2804 is negative, it is reiterated. When the result of test 2804 is positive, during an operation 2805, the controller 306 of the mobile station under consideration sends an acknowledgement message "ack" to the initial base station. Then, during an operation 2806, the controller 306 switches into base station operating mode. The procedure of switching operating mode because of failure of the initial base station is then ended.

In order to evaluate the communication quality, a first method consists of determining a transmission error rate.

A second method is illustrated in FIG. 29. It is intended to be executed at regular time slots. First of all, during an operation 2901, the controller 306 of the base station effects an initialisation of the variables which are used in the flow diagram of FIG. 29. Next, during operation 2902, the controller 306 causes a message "signal-strength-request" to be broadcast to all the mobile stations in the cell.

Each mobile station then returns a message representing the power of the message "signal-strength-request" which it has received (see in this regard, in the DECT standard, the use of the primitive "PL_ME_SIG_STR_req").

So that all the answers have the time to reach it, the base station waits for a time T9, operation 2903, before performing an operation 2904, during which the variable QR is determined as being the mean of the values of the answers obtained during operation 2903.

FIG. 30 illustrates a procedure followed by a mobile station which has previously been a base station and which has recovered the capabilities of functioning correctly in base station mode.

This station being in mobile station operating mode, operation 3101, its controller 306 performs a test 3102, during which it determines whether or not, all at the same time:

the quantity of energy NB available is greater than the quantity NB_max,
the quality of the radio signal QR is higher than the value QR_max, and
the value of the variable DB is equal to "1".

When the result of test 3102 is negative, the controller 306 performs an operation 3110, during which it waits for a time T10. Then it reiterates test 3102.

When the result of test 3102 is positive, during an operation 3103, the controller 306 gives the value "0" to the variable DB. Then, during an operation 3104, the controller 306 listens out on the channel Q. Next, during a test 3105, the controller 306 determines whether its capabilities of being a base station are better than those of the base station currently active.

When the result of test 3105 is negative, the procedure is ended (by a failure). When the result of test 3105 is positive, during an operation 3106, the controller 306 sends a message "chg-base-request" to the active base station. During operation 3106, the mobile station under consideration waits for a sufficient period to enable a communication station according to the present invention and functioning in base station mode to answer, before performing a test 3107.

Then, during test 3107, the controller 306 determines whether or not it has received a message "chg-base-accept" from the active base station. When the result of test 3107 is negative, the controller 306 considers that the request to change base station has failed and the procedure is ended (on a failure). When the result of test 3107 is positive, during operation 3108, the controller 306 switches the operating mode into base station mode. Then the procedure is ended (with success).

FIG. 24 shows a second functioning mode of a communication device according to the eighth aspect of the present invention. When such a communication device has not detected any base station (in accordance with the prior art or after having performed all the operations and tests illustrated in FIG. 4, including one of operations 411 or 415, but without reproducing operation 402), and it has an information transmission to effect, it takes the role of base station throughout the transmission.

To this end, during an operation 2401, the station under consideration determines that it has an information transmission to effect. It then reproduces operations 401 to 403 in FIG. 4, and if a base station which provides it with a right of access is detected, it locks onto this base station, but if no base station is detected, it performs operation 2402 during which the controller 306 causes the operating mode of the device to switch into base station mode.

Next, during an operation 2403, the device waits for a predetermined period T5, whilst regularly transmitting synchronisation signals. This period is intended to leave time for the mobile station with which the device wishes to communicate to lock onto it. Then, during an operation 2404, the device transmits an identification request to the mobile station with which it wishes to communicate. Next, during an operation 2405, it allows a predetermined period T6 to pass, which must be sufficient for the mobile station called to be able to respond.

Then, during a test 2406, the device determines whether or not it has received, from at least one mobile station, an answer to the identification request. When the result of test 2406 is negative, during an operation 2410, the controller 306 causes the functioning mode of the device to switch into mobile station mode. When the result of test 2406 is positive, during a test 2407, the device determines whether or not the identity of one of the mobile stations corresponds to the identity of the station with which it must communicate.

When the result of test 2407 is negative, the operation 2410 is performed. When the result of test 2407 is positive, during an operation 2408, the transmission which the device is to make is effected. Then, at the end of the transmission, during an operation 2409, the transmission is ended. Finally, operation 2410 is performed.

According to a first variant, all the communication requests issuing from the other mobile stations are refused, the base station testing the identity of each mobile station requesting communication and accepting only the communications coming from the mobile station with which it: has communicated during operation 2408 and which are intended for it. According to this first variant, the other mobile stations therefore do not then benefit from the capability of the device of changing operating mode.

According to a second variant, if, whilst the device is acting as a base station, a mobile station locks onto it and attempts to establish a communication, the device behaves as a base station, until the attempt is abandoned or, if the attempt succeeds, until the end of the communication, or else until another base station substitutes itself for it (see FIGS. 9 to 13). To implement this second variant, after the operation 2409 and before performing operation 2410, the controller 306 of the communication station determines, during a test (not shown), whether or not a connection with it is active, and in the affirmative reiterates this test, at regular time slots. If this test determines that no connection is active, operation 2410 is performed.

What is claimed is:

1. A method of communicating between communication stations adapted to communicate with each other when at least one of said communication stations supplies a control signal, said station then functioning in base station mode, and the stations not supplying the control signal then functioning in mobile station mode, the method comprising the steps of:

performing a request operation in which a first communication station functioning in mobile station mode transmits to a second communication station functioning in base station mode a message representing a request to retrieve the function of base station; and if the second communication station accepts the request, switching the functioning of the first communication station from mobile station mode to base station mode.

2. The method according to claim 1, further comprising a step of determining whether the first communication station has better capabilities of being a base station than the second communication station, this step being executed prior to the step of performing the request operation.

3. The method according to claim 2, wherein the capabilities of being a base station represent the number of supported variants of a communication standard to which the communication stations are compliant.

4. The method according to claim 2, wherein the second communication station accepts the request of the first communication station if the capabilities of the first communication station for being a base station are better than those of the second communication station and if the second communication station does have active connections.

5. The method according any one of claims 1 to 3, further comprising a step of switching the functioning mode of the second communication station from base station to mobile station mode.

6. A method of communicating between communication stations adapted to communicate with each other when at least one of said communication stations supplies a control signal, said station then functioning in base station mode, and the stations not supplying the control signal then functioning in mobile station mode, the method comprising the steps of:

determining whether the capabilities of a first communication station functioning in base station mode are sufficient to support a communication between two communication stations functioning in mobile station mode; and if the capabilities of the first communication station are not sufficient, performing a request operation in which the first communication station transmits to a second communication station functioning in mobile station mode a message representing a request to switch its function to base station mode and to temporarily handle the communication between the two communication stations.

7. A device for communicating between communication stations adapted to communicate with each other when at least one of said communication stations supplies a control signal, said station then functioning in base station mode and the stations not supplying the control signal then functioning in mobile station mode, the device comprising:

means for performing a request operation in which a first communication station functioning in mobile station mode transmits to a second communication station functioning in base station mode a message representing a request to retrieve the function of base station; and means for switching the functioning of the first communication station from mobile station mode to base station mode if the second communication station accepts the request.

8. The device according to claim 7, further comprising means for determining whether the first communication station has better capabilities of being a base station than the second communication station.

9. The device according to claim 8, wherein the capabilities of being a base station represent the number of supported variants of a communication standard to which the communication stations are compliant.

10. The device according to claim 8, wherein the second communication station accepts the request of the first communication station if the capabilities of the first communication station of being a base station are better than those of the second communication station and if the second communication station does have active connections.

11. The device according to any one of claims 7 to 9, further comprising means for switching the functioning mode of the second communication station from base station to mobile station mode.

12. A device for communicating between communication stations adapted to communicate with each other when at least one of said communication stations supplies a control signal, said station then functioning in base station mode, and the stations not supplying the control signal then functioning in mobile station mode, the device comprising:

means for determining whether the capabilities of a first communication station functioning in base station mode are sufficient to support a communication between two communication stations functioning in mobile station mode; and means for performing a request operation in which the first communication station transmits to a second communication station functioning in mobile station mode a message representing a request to switch its function to base station mode and to temporarily handle the communication between the two communication stations if the capabilities of the first communication station are not sufficient.

13. An information storage means, which can be read by a computer or a microprocessor, storing instructions of a computer program, said computer program implementing a communication method according to claim 1.

14. An information storage means, which is partially or totally removable and can be read by a computer or a microprocessor, storing instructions of a computer program implementing a communication method according to claim 1.

* * * * *

UNITED STATES PATENT AND TRADEMARK OFFICE
CERTIFICATE OF CORRECTION

PATENT NO. : 6,894,992 B1
APPLICATION NO. : 09/357813
DATED : May 17, 2005
INVENTOR(S) : Morvan et al.

It is certified that error appears in the above-identified patent and that said Letters Patent is hereby corrected as shown below:

COLUMN 1
Line 23, "communication" should read --communicate--.

COLUMN 24
Line 57, "negative;" should read --negative,--.

COLUMN 31
Line 62, "switch-mode-request"" should read --"switch-mode-request"--.

COLUMN 32
Line 32, "an." should read --art.--.

COLUMN 38
Line 52, "it:" should read --it--.

COLUMN 39
Line 34, "according" should read --according to--.

Signed and Sealed this

Tenth Day of October, 2006

JON W. DUDAS
*Director of the United States Patent and Trademark Office*